US007965693B2

(12) United States Patent
Jiang et al.

(10) Patent No.: US 7,965,693 B2
(45) Date of Patent: Jun. 21, 2011

(54) INTERWORKING MECHANISM BETWEEN WIRELESS WIDE AREA NETWORK AND WIRELESS LOCAL AREA NETWORK

(75) Inventors: James Jiang, Richardson, TX (US);
Yonggang Fang, San Diego, CA (US);
Rajesh Bhalla, Westmont, IL (US);
Mary Chion, Belle Mead, NJ (US)

(73) Assignee: ZTE (USA) Inc., Iselin, NJ (US)

( * ) Notice: Subject to any disclaimer, the term of this patent is extended or adjusted under 35 U.S.C. 154(b) by 768 days.

(21) Appl. No.: 11/835,414

(22) Filed: Aug. 7, 2007

(65) Prior Publication Data
US 2008/0101291 A1    May 1, 2008

Related U.S. Application Data

(63) Continuation-in-part of application No. 10/447,654, filed on May 28, 2003, now Pat. No. 7,254,119.

(60) Provisional application No. 60/383,938, filed on May 28, 2002.

(51) Int. Cl.
*H04W 4/00* (2009.01)
*H04L 12/28* (2006.01)
(52) U.S. Cl. ......................... 370/338; 370/401
(58) Field of Classification Search ................. None
See application file for complete search history.

(56) References Cited

U.S. PATENT DOCUMENTS

| | | |
|---|---|---|
| 5,711,011 A | 1/1998 | Urs et al. |
| 5,815,799 A | 9/1998 | Barnes et al. |
| 5,867,491 A | 2/1999 | Derango et al. |
| 5,917,823 A | 6/1999 | Benning et al. |
| 6,049,528 A | 4/2000 | Hendel et al. |
| 6,115,370 A | 9/2000 | Struhsaker et al. |
| 6,128,301 A | 10/2000 | Bernstein |
| 6,131,012 A | 10/2000 | Struhsaker et al. |
| 6,138,011 A | 10/2000 | Sanders, III et al. |
| 6,178,327 B1 | 1/2001 | Gomez |
| 6,243,581 B1 * | 6/2001 | Jawanda ............. 455/432.2 |
| 6,263,368 B1 | 7/2001 | Martin |
| 6,292,671 B1 | 9/2001 | Mansour |
| 6,373,829 B1 | 4/2002 | Vilmur |
| 6,421,335 B1 | 7/2002 | Kilkki et al. |
| 6,510,315 B1 | 1/2003 | Arnson |

(Continued)

FOREIGN PATENT DOCUMENTS

EP    1 377 099 A1    1/2004

(Continued)

OTHER PUBLICATIONS

Electromagnetic compatibility and Radio spectrum Matters (ERM); Code Division Multiple Access Public Access Mobile Radio (CDMA-PAMR); System reference document; ETSI TR 102 260 v1.1.1 (Dec. 2003), Technical Report, ETSI Standards, LIS, Sophia Antipolis Cedex, France, 58 pages.

(Continued)

*Primary Examiner* — Ricky Ngo
*Assistant Examiner* — Clemence Han
(74) *Attorney, Agent, or Firm* — Perkins Coie LLP

(57) ABSTRACT

Interconnection and integration of a WWAN and a WLAN to provide continuous packet data services to mobile users where each mobile access terminal is configured to support both air links with the WWAN and WLAN. The WWAN may be a CDMA2000 system and the WLAN may be an IEEE 802.11 system.

20 Claims, 33 Drawing Sheets

U.S. PATENT DOCUMENTS

| | | | |
|---|---|---|---|
| 6,538,606 | B2 | 3/2003 | Quinn et al. |
| 6,553,234 | B1 | 4/2003 | Florea |
| 6,628,946 | B1 | 9/2003 | Wiberg et al. |
| 6,650,905 | B1 | 11/2003 | Toskala et al. |
| 6,738,617 | B2 | 5/2004 | Rosen et al. |
| 6,788,946 | B2 | 9/2004 | Winchell et al. |
| 6,862,453 | B2 | 3/2005 | Collins |
| 6,882,856 | B1 | 4/2005 | Alterman et al. |
| 6,898,436 | B2 | 5/2005 | Crockett et al. |
| 6,917,819 | B2 | 7/2005 | Collins |
| 6,947,752 | B2 | 9/2005 | Collins |
| 7,035,664 | B2 | 4/2006 | Kim |
| 7,254,119 | B2 | 8/2007 | Jiang et al. |
| 7,343,163 | B1 | 3/2008 | Perkins et al. |
| 7,453,837 | B2 | 11/2008 | Jiang et al. |
| 7,474,895 | B1 | 1/2009 | Jiang et al. |
| 7,492,788 | B2 | 2/2009 | Zhang et al. |
| 2001/0018342 | A1 | 8/2001 | Vialen et al. |
| 2002/0085516 | A1* | 7/2002 | Bridgelall ............... 370/329 |
| 2002/0152342 | A1 | 10/2002 | Das et al. |
| 2003/0050067 | A1 | 3/2003 | Rozmaryn |
| 2003/0050097 | A1 | 3/2003 | Amirijoo et al. |
| 2003/0065805 | A1 | 4/2003 | Barnes, Jr. |
| 2003/0133421 | A1 | 7/2003 | Sundar et al. |
| 2003/0134650 | A1* | 7/2003 | Sundar et al. ............ 455/465 |
| 2003/0134655 | A1 | 7/2003 | Chen et al. |
| 2003/0174714 | A1* | 9/2003 | Manik et al. ............. 370/396 |
| 2003/0210664 | A1 | 11/2003 | Achour et al. |
| 2004/0042438 | A1 | 3/2004 | Jiang et al. |
| 2004/0100940 | A1 | 5/2004 | Kuure et al. |
| 2004/0116139 | A1 | 6/2004 | Yi et al. |
| 2004/0156340 | A1 | 8/2004 | Madour |
| 2004/0259556 | A1 | 12/2004 | Czys |
| 2005/0096062 | A1 | 5/2005 | Ji et al. |
| 2005/0117553 | A1 | 6/2005 | Wang et al. |
| 2005/0213530 | A1 | 9/2005 | Kuure et al. |
| 2006/0003784 | A1 | 1/2006 | Chion et al. |
| 2006/0056361 | A1 | 3/2006 | Jiang et al. |
| 2009/0092116 | A1 | 4/2009 | Jiang et al. |

FOREIGN PATENT DOCUMENTS

| | | |
|---|---|---|
| WO | WO 00/74311 | 12/2000 |
| WO | WO 02/098073 | 12/2002 |
| WO | WO 03/101025 | 5/2003 |
| WO | WO 2004/017525 | 2/2004 |
| WO | WO 2005/101695 | 10/2005 |

OTHER PUBLICATIONS

Dahlman et al., "WCDMA—The Radio Interface for Future Mobile Multimedia Communications," IEEE Transactions on Vehicular Technology, vol. 47, No. 4, pp. 1105-1118, Nov. 1998.

Examination Report dated Apr. 24, 2009 for European Patent Application No. 05 746 265.7 (7 pages).

International Preliminary Report on Patentability issued on Oct. 25, 2006 for PCT/US2005/013303, filed Apr. 19, 2005 (5 pages).

International Search Report and Written Opinion dated Aug. 16, 2005 for PCT/US2005/013303, filed Apr. 19, 2005 (13 pages).

International Search Report dated May 10, 2004 for PCT/US03/25003, filed Aug. 7, 2003, now WO 2004/17525, entitled "Trunking System for CDMA Wireless Communication," 3 pages.

IEEE 802.16-2004, "IEEE Standard for Local and Metropolitan Area Networks, Part 16: Air Interface for Fixed Broadband Wireless Access Systems", Oct. 1, 2004, 895 pages.

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006, (864 pages).

* cited by examiner

AT

INTERWORKING MECHANISM BETWEEN WIRELESS WIDE AREA NETWORK AND WIRELESS LOCAL AREA NETWORK

This application is a continuation-in-part application of U.S. patent application Ser. No. 10/447,654 entitled "INTERWORKING MECHANISM BETWEEN CDMA2000 AND WLAN" and filed on May 28, 2003, published as U.S. Patent Publication No. US-2004-0114553-A1 and granted as U.S. Pat. No. 7,254,119.

The co-pending U.S. application Ser. No. 10/447,654 claims the benefit of U.S. Provisional Application No. 60/383,938, entitled "Dynamic WWAN and WLAN interface and System" and filed on May 28, 2002.

The entire disclosures of the above-referenced patent applications, patents and patent publications are incorporated herein by reference as part of the specification of this application.

BACKGROUND

This application relates to wireless communication systems and techniques.

Wireless communication systems use electromagnetic radio waves to provide communication with and between mobile communication devices known as access terminals (ATs), such as mobile phones and portable computers equipped with wireless communication ports. Different types of wireless communication systems have been developed to provide different wireless communication applications. A wireless wide area network (WWAN), for example, may be designed to provide both voice and data services for mobile communication devices in a large geographical area, e.g., a nationwide network. One example of such a WWAN is a code division multiple access (CDMA) communication system that includes a regular voice or data call handling mechanism and a packet data handling mechanism for handling data packet services. The regular voice or data call handling mechanism includes base transceiver stations (BTSs) distributed in spatially divided cells and a network of base station controllers (BSCs) each connected to control multiple BTSs. A mobile switching center (MSC) is coupled between BSCs and a carrier public switched telephone network (PSTN) to handle the regular voice or data calls. Under the CDMA2000 standards, the packet data handling mechanism in a CDMA WWAN may include packet control function (PCF) modules and a packet data service node (PDSN) that are coupled between a BSC and the packet data network for transmitting the data packets. The packet data network may be configured to operate based on a proper packet data protocol, such as a carrier network based on the Internet Protocol (IP).

Different from the above CDMA WWAN or other WWANs, a wireless local area network (WLAN) is a wireless network that covers a small geographic area to provide packet data services for mobile communication devices. The WLAN can be better configured and optimized than a WWAN to provide faster and reliable data links for mobile users. Currently, the IEEE 802.11 standards have been widely adopted as one of the communication protocols for WLANs. Many high-speed WLAN services are usually provided locally in selected buildings or limited local areas called "hot spots" or "hot zones."

SUMMARY

This application includes hardware and software interfaces and associated features for unified access to both WWANs and WLANs without service interruption as a mobile user roams across such different networks. In one implementation, one or more WLANs may be integrated or interconnected with one or more WWANs through communication nodes called access point gateways (APGWs). A radio transceiver called access point (AP), which is analogous to the BTS in a CDMA WWAN to a certain extent, is connected to a APGW and provides a local radio hot spot or zone to provide high-speed packet data services for mobile communication devices. An APGW, analogous to a BSC and a PCF in a CDMA WWAN in certain functions, connects and integrates one or more connected APs to a packet data network so that an authorized AT may continue a packet data service when the AT switches between a WLAN and a WWAN to remain connected with either of the WLAN and WWAN as the AT moves from one location to another. Such an AT is configured to include a WLAN-WWAN communication card or two separate network cards for accessing WLAN and WWAN, respectively, with two different air interfaces. A suitable WWAN may operate under one of the CDMA2000 standards such as the CDMA2000 1xEV-DO and the CDMA2000 1x. The WLAN may operate under one of the IEEE 802.11 protocols.

The interfaces described here include solutions for system acquiring and releasing mechanisms, handoff between WWAN and WLAN, mobility management, and unified mechanisms for authentication, authorization, and accounting (AAA) for both WWAN and WLAN.

In one implementation, a communication system may include a CDMA network as a WWAN and a WLAN. The WWAN is coupled to an IP network to provide packet data service to mobile communication devices. The WLAN includes at least one access point (AP) that communicates with a mobile communication device located in an access area of the AP, and an access point gateway (APGW) connected between the AP and one packet data serving node in the CDMA network to allow for continuity of a packet data service to the mobile communication device by switching a packet data service connection for the mobile communication device between the WLAN and the CDMA network.

In another implementation, an access point gateway is provided between an access point in a WLAN and a packet data service node in a CDMA2000 WWAN to interconnect the WLAN and the WWAN. An access terminal that has both a WLAN interface and a WWAN interface is used to communicate with the WLAN and the WWAN. In addition, a control mechanism in the access terminal is used to determine which of the WLAN and the WWAN is to be used for a packet data service according to a signal parameter detected by the access terminal. The switching between a communication between the WLAN and the WWAN is controlled to allow for the access terminal to roam in the WLAN and the WWAN without an interruption to the packet data service.

In yet another implementation, a wireless communication system can include a CDMA network coupled to an IP network to provide packet data service to mobile communication devices; and a wireless local area network (WLAN) having at least one access point (AP) that communicates with a mobile communication device located in an access area of the AP, and an access point gateway (APGW) connected between the AP and one packet data serving node in the CDMA network to allow for continuity of a packet data service to the mobile communication device by switching a packet data service connection for the mobile communication device between the WLAN and the CDMA network. The CDMA network and WLAN enable a handoff module in the mobile communication device to switch the packet data service connection.

These and other features, system configurations, control techniques, associated advantages, and implementation variations are described in detail in the following drawings, detailed description, and claims.

BRIEF DESCRIPTION OF THE DRAWINGS

FIG. 7 illustrates different control modules in the AT.

DETAILED DESCRIPTION

The techniques and systems described here in general are based on hardware devices and software control in both the network system and the access terminals that are designed to allow for accessing the interconnected WWAN and WLAN. Each access terminal is designed to include either two network access cards for accessing WLAN and WWAN, respectively, or a single network card with two ports for accessing WLAN and WWAN, respectively. The access terminals may be any mobile communication devices including mobile phones, Personal Digital Assistants (PDAs), and mobile computers and may be designed to handle either both voice and data communications, or only data communications. The network access card or the access port for the WWAN may be configured based on various CDMA2000 standards. Applicable CDMA2000 standards include, but are not limited to, CDMA2000 1X, CDMA2000 1xEV-DO, and CDMA2000 1xEV-DV. In the following sections, CDMA2000 1xEV-DO is used as an example in various implementations and may be replaced by another suitable CDMA2000 or its compatible standard. A control mechanism is implemented to switch an access terminal (AT) between the WWAN and WLAN links so that a packet data service can be maintained without interruption. The network access card or the access port for the WLAN may operate under one of the IEEE 802.11 protocols.

At the network system level, one or more access points are implemented to provide radio access hot spots or zones within the WLAN. One or more AP gateways are used to interconnect the WLAN and the WWAN, where each APGW is connected between one or more APs in the WLAN and a PDSN in the WWAN. APGWs allow for the operations and services in the WWAN and WLAN to be controlled and managed through a unified system. When properly implemented, such interconnected or interworked WWAN and WLAN systems allow the WWAN operators to provide WLAN services and a WLAN operator to have access to WWAN operated by another operator.

Figure 1:
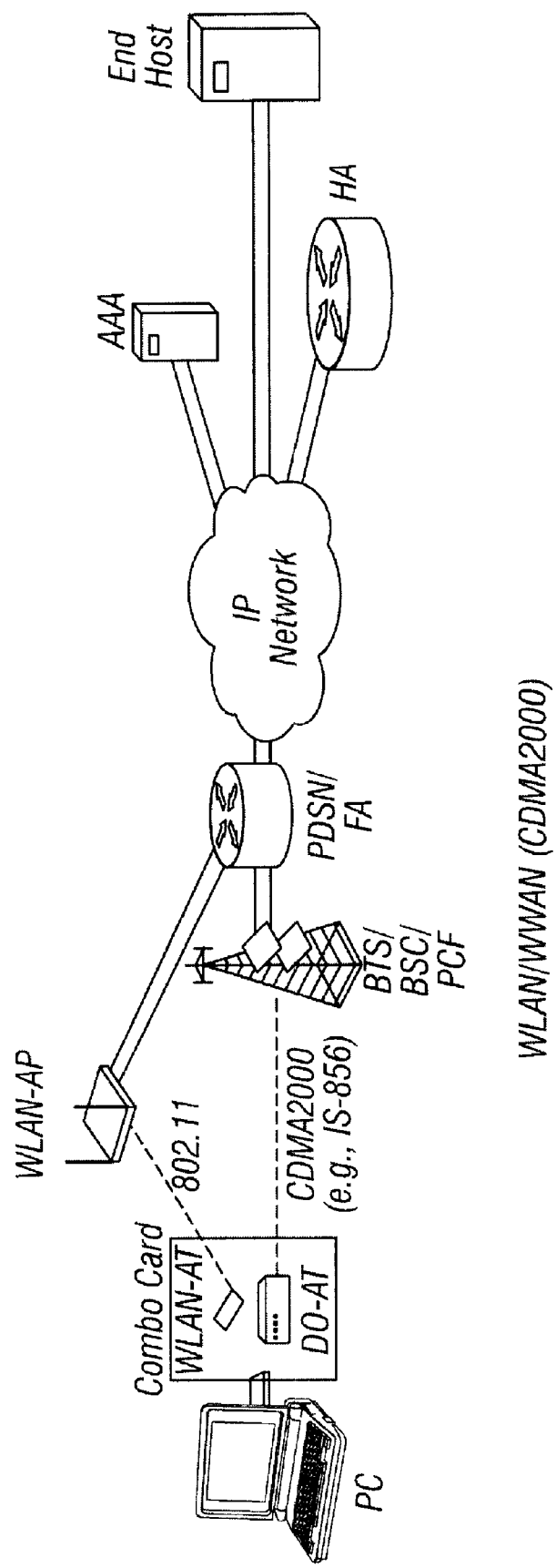
FIGS. 1 and 2 illustrate interworking of WWAN and WLAN.
Figure 2:
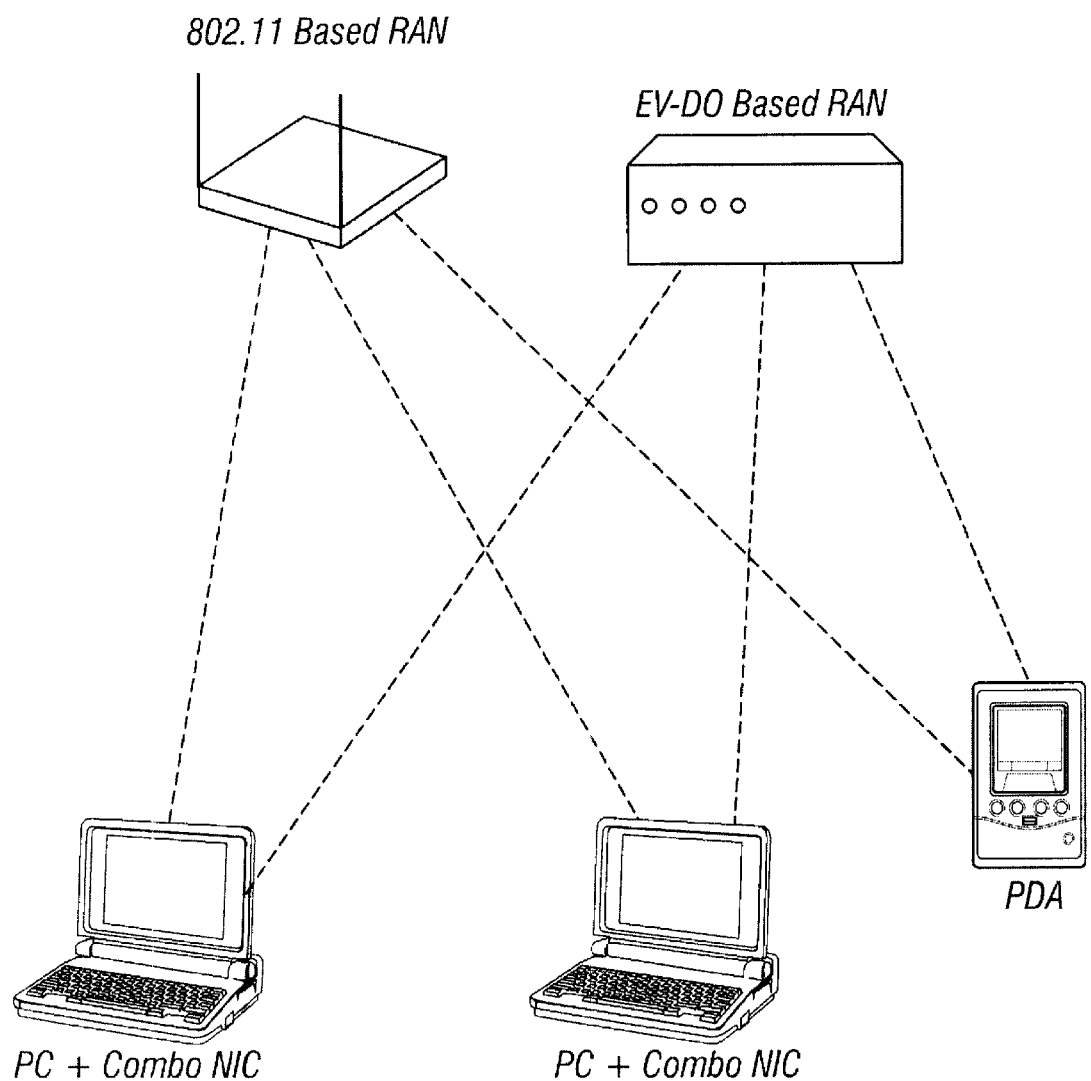

FIGS. 1, 2, 3, and 4 illustrate exemplary system architectures for interconnecting WLAN and WWAN. FIG. 1 shows a PC with a combination network interface card (NIC) with a WLAN access terminal for communications with the WLAN under IEEE 802.11 and a WWAN access terminal (DO-AT) for communications with the WWAN under IS-856 (CDMA2000 1xEV-DO). FIG. 2 shows multiple ATs with dual access capability, such as PCs and PDAs, may access the IEEE 802.11-based radio access network through one common AP, or access the EV-DO based radio access network through one common BTS.

Figure 3:
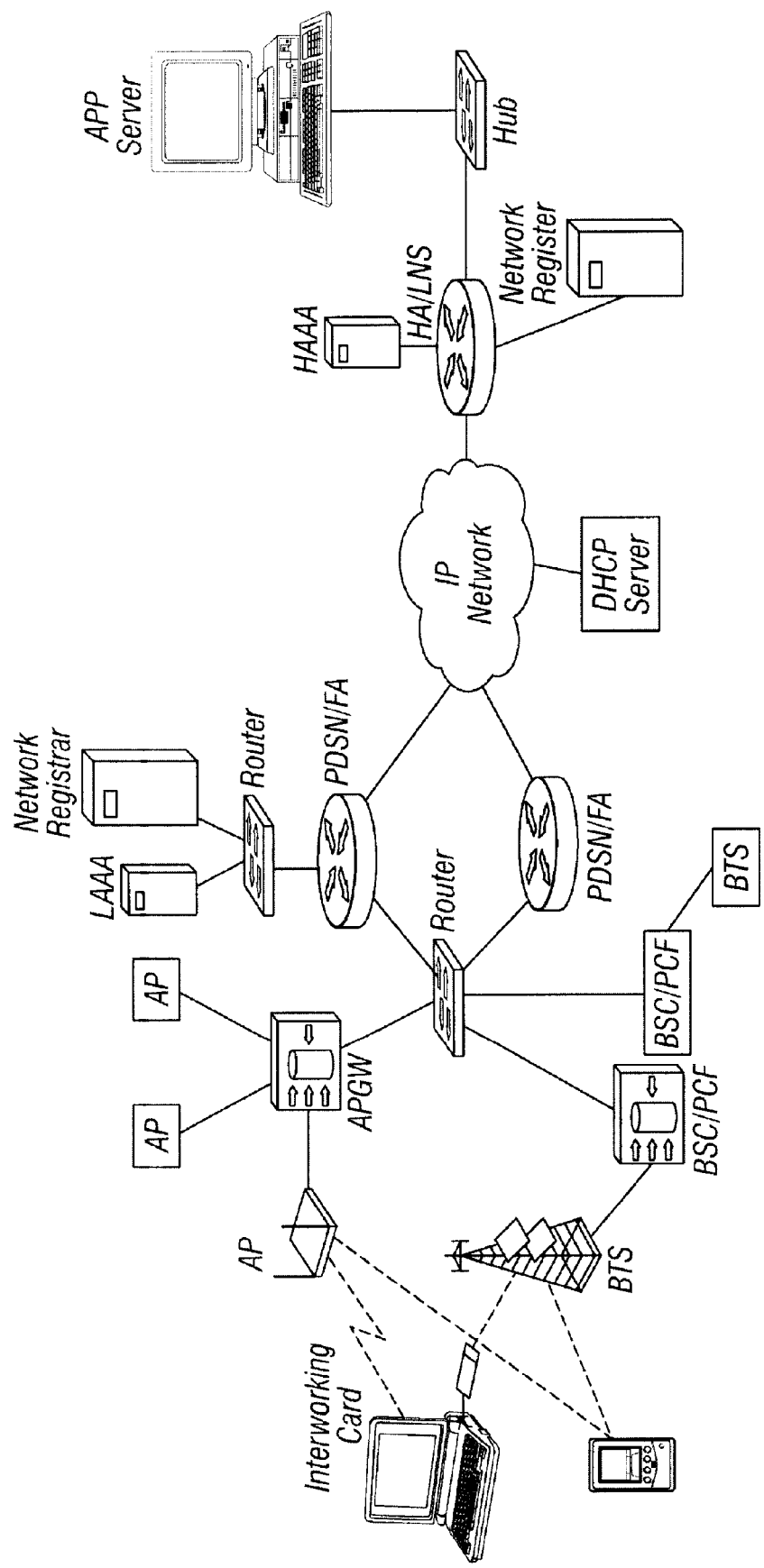
FIGS. 3 and 4 show two examples of the WWAN-WLAN system architecture.
Figure 4:
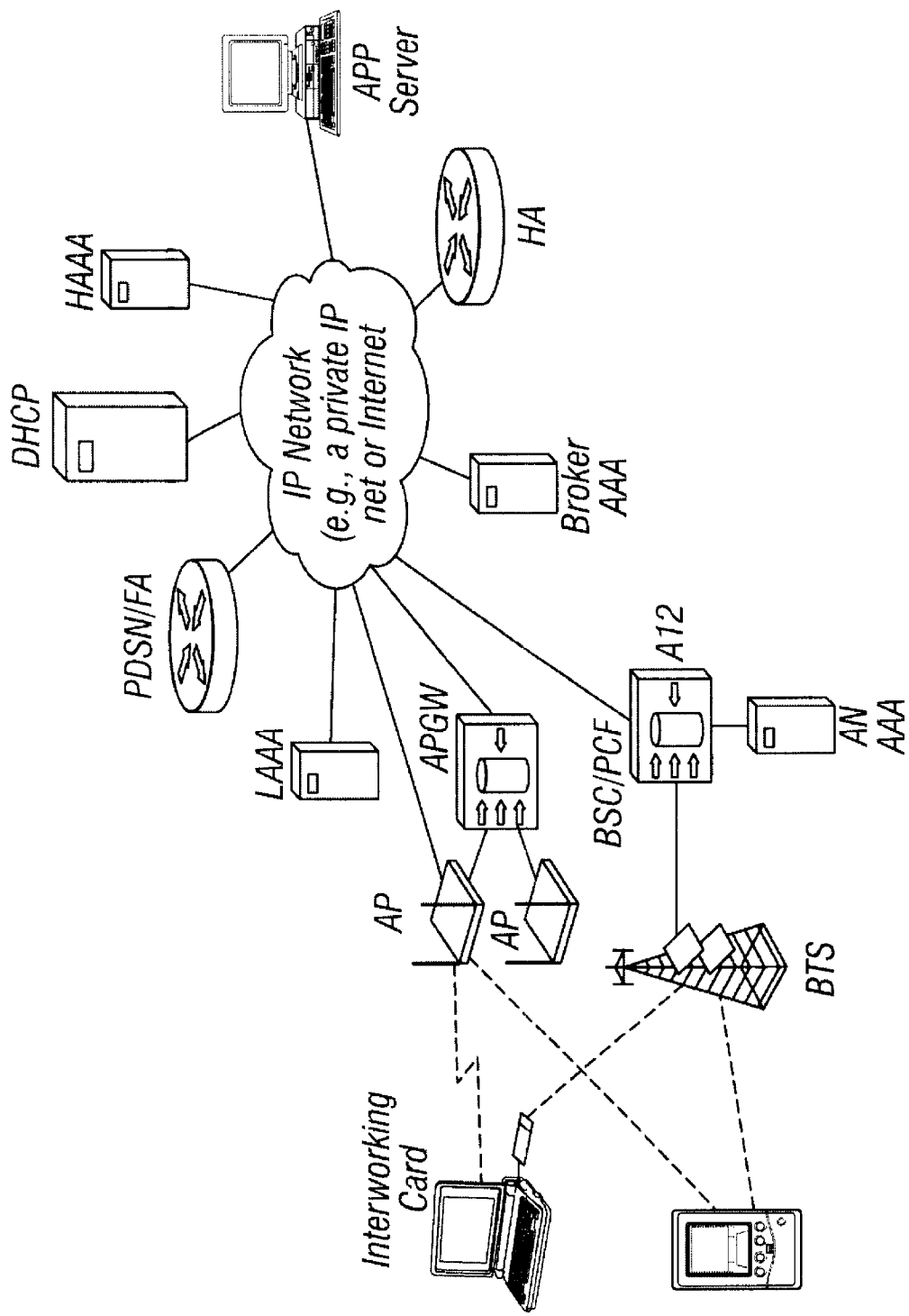

FIGS. 3 and 4 show two examples of the WWAN-WLAN system architectures. Wireless ATs may receive and send communication signals through base transceiver stations (BTSs) over electromagnetic waves in the air, e.g., WWAN radio links. Air links for the WWAN are generally different from air links for the WLAN. Hence, as discussed above, each AT may be configured to have either a WWAN network card and a WLAN network card, or a single network card with a WWAN interface and a WLAN interface. The base transceiver stations are distributed in a service area with multiple spatially divided cells to form a radio access network for the WWAN. Each cell may have one base transceiver station. Alternatively and more commonly for some CDMA systems, each base transceiver station may be designed to have directional antennas and may be placed at a location on edges of multiple cells in a sectorized arrangement to cover these cells. A network of base station controllers (BSCs) are connected, usually with wires or cables, to BTSs for controlling the BTSs. Each BSC may be connected to one or more designated BTSs.

The WWAN-WLAN system in FIG. 3 or 4 connects to two types of communication networks: one or more public switched telephone network (PSTN) and one or more packet data networks (e.g., IP network such as a private IP network or the Internet). The basic wireless system hardware for the WWAN includes at least one mobile switching center (MSC) as a control interface between the BSCs and the PSTN. The MSC essentially manages regular voice or data calls to and from the ATs of subscribed users. The Short Message Service (SMS) may also be provided through the MSC. The packet data services are provided through the IP network. This part of the WWAN system as illustrated includes packet control function (PCF) devices and packet data serving nodes (PDSNs) that are coupled to the basic CDMA network. Each PCF can be connected between the BSC and the PDSN in general and may be integrated with the BSC as a single device. The PDSN may be generally configured to provide packet data communications over the radio access network and through the packet data network, and to execute functions for authentication, authorization, and accounting (AAA) through one or more connected AAA servers such as a home AAA (HAAA) and a local AAA (LAAA). The basic functions of these WWAN components are specified by CDMA2000 standards.

The WLAN includes at least one and generally multiple APs to form the WLAN radio access network in selected hot spots or zones. Each AP communicates with one or more ATs that are located in its access area via WLAN radio links. Notably, an access point gateway (APGW) is connected between one or more APs and one of the PDSNs in packet data network connected to the WWAN to allow for continuity of a packet data service to an AT by switching a packet data service connection for the AT between the WLAN and WWAN. A network router may be used to connect different devices or modules such as AAAs, APGWs and BSCs to a PDSN as shown in FIG. 3. Alternatively, the routers may be eliminated by connections through the IP network as shown in FIG. 4. The switching may be accomplished automatically according to pre-set operating conditions in the control mechanism as the AT moves from one location to another. For example, if the AT is initially connected to an AP but is moving out of the hot spot for that AP, the connection may then switch to the WWAN to continue the packet data service to the AT when the initial AP becomes unavailable. When another AP is available, the AT may be switched to the new AP for faster data link. Hence, the switching may be used to roam from one AP to another AP within the WWAN without losing the packet data service.

FIGS. 3 and 4 further show home agents (HAs) and foreign agents (FAs) in handling IP addresses for the ATs. A foreign agent is generally a router serving as a mobility agent for a mobile AT and works in conjunction with the home agent to support Internet traffic forwarding for a device connecting to the Internet from any location other than its home network. These features, AAA features and others are described in greater detail in later sections of this application. A HA or FA may be integrated as part of a PDSN in various implementations.

Different from other ATs in WWANs, each AT in the WWAN-WLAN interworked system is designed to maintain two individual air interfaces to WWAN (e.g., EV-DO) and WLAN (e.g., IEEE 802.11) and provides protocol stacks for the EV-DO and WLAN networks. Both Simple IP and Mobile IP based services are supported in each AT. A switching control mechanism may be implemented in ATs to control the interworking handoff between WWAN and WLAN, e.g., based on signal strengths, user data rates, a suitable error rate, and other parameters. Each AT may also support either PPPoE or DHCP protocols to act as a PPPoE client to communicate with a PPPoE server, or a DHCP client to communicate with a DHCP server, respectively. For example, ATs may be MT0-type or the TE2/MT2 type of mobile devices with an additional WLAN-CDMA interworking card. ATs without the WWAN-WLAN interface card may also operate in systems shown in FIGS. 3 and 4 to obtain services from either the WLAN or the WWAN, but not from both.

The APGWs may be configured to provide a layer 2 control function similar to the PCF. More specifically, an A11-like interface, such as the A11 interface and another suitable interface similar to the A11, is used in APGWs to inform PDSN to establish a data link to APGW and an A10-like interface is used to provide tunneling function between APGW and PDSN. The interface from an APGW to APs may use a standard interface supported by IEEE 802 specifications, ATM based interfaces, or other suitable interfaces. Both PPPoE and DHCP may be supported so that an APGW may act as the Access Concentrator (server) of PPPoE or a Relay Agent to the DHCP server. The APGWs can also provide PPPoHDLC framing on the PPP packets to PDSN.

The PDSN in FIGS. 3 and 4 is an access gateway to the Internet, intranets and applications servers for ATs. The PDSN may also operate as a foreign agent to support Mobile IP, or a client for AAA servers, or a tunnel to DHCP servers. The A10/A11 interface is used to connect the PDSN to a PCF in the WWAN and A10/A11-like interface is used for connecting to an APGW in the WLAN. The PDSN also maintains a single protocol stack for an AT in both networks and records and sends the billing information to AAA servers.

Figure 5:
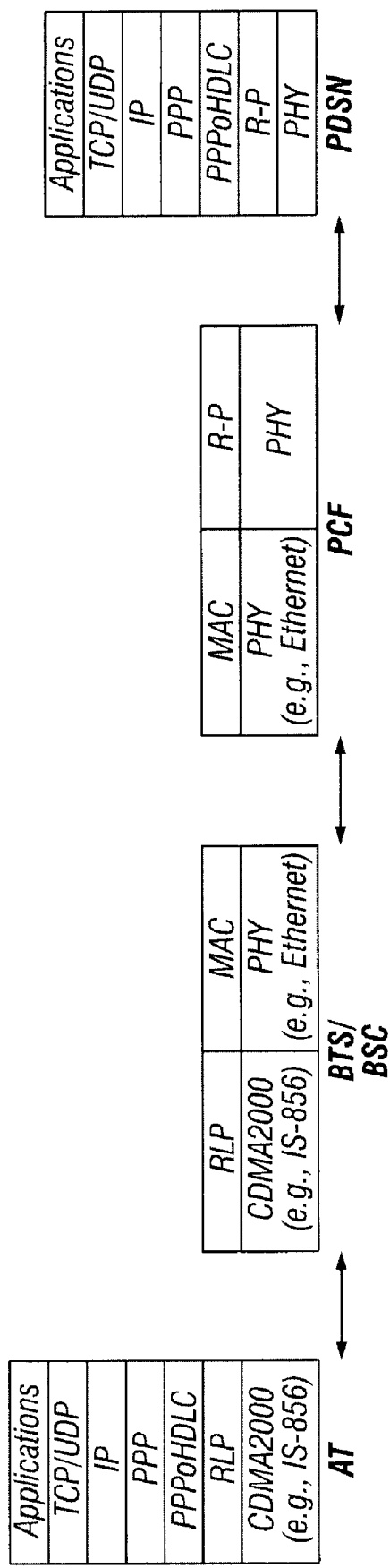
FIG. 5 illustrates WWAN protocol stacks for different network components for the WWAN-WLAN system in FIG. 4 where the WWAN is assumed to be a CDMA2000 1xEV-DO system.
Figure 6A:
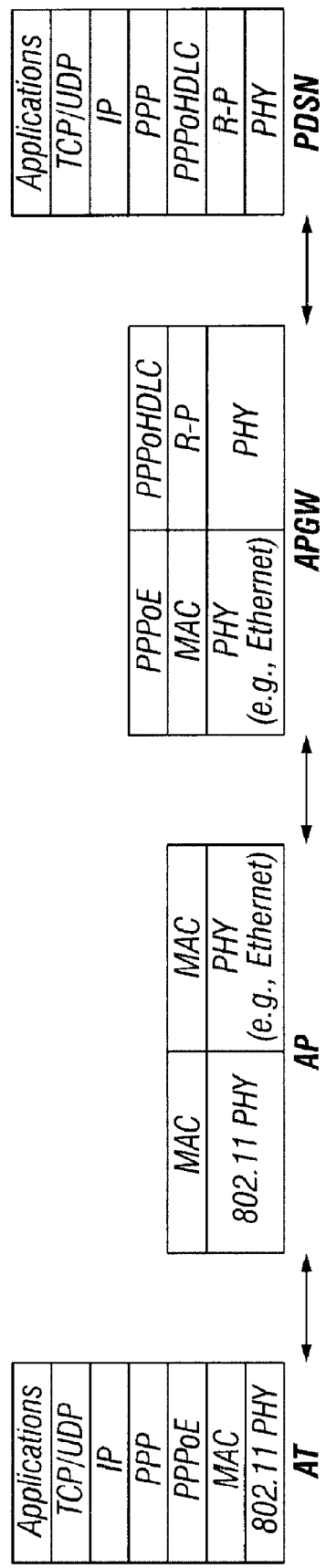
FIGS. 6A and 6B show corresponding protocol stacks for the IEEE 802.11 based WLAN for the PPPoE and DHCP, respectively, in the system in FIG. 4.
Figure 6B:
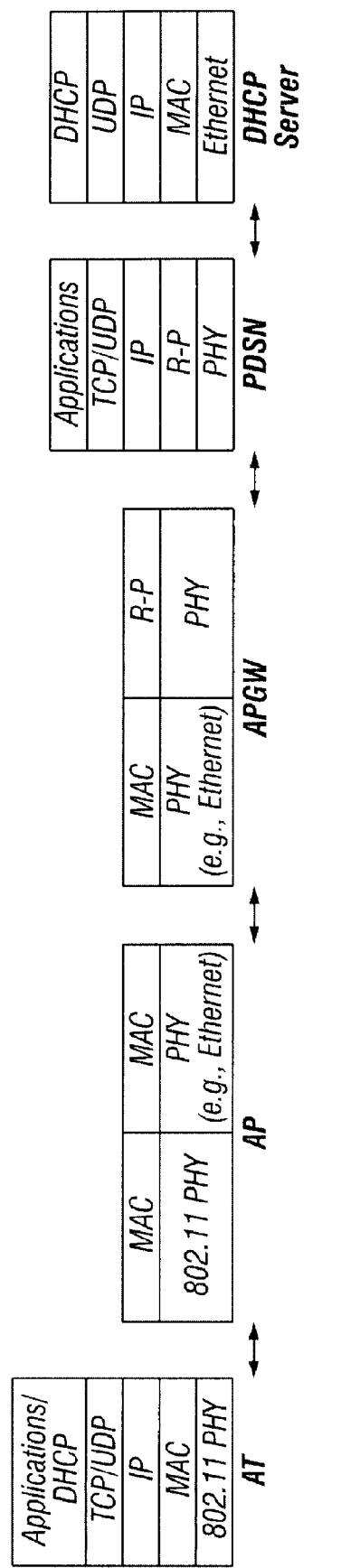

FIG. 5 illustrates WWAN protocol stacks for different network components for the WWAN-WLAN interworked system in FIG. 4 where the WWAN is assumed to be a CDMA2000 1xEV-DO system. FIGS. 6A and 6B are the corresponding protocol stacks for the IEEE 802.11 based WLAN for the PPPoE and DHCP, respectively. As an example, the protocols for AT in the WWAN (EV-DO) are Services in the Application Layer, TCP/UDP in the Transport Layer, IP in the Network Layer, PPP/PPPoHDLC in the Data Link Layer, and IS-856 in the Physical Layer. For the WLAN under 802.11, the protocol stacks for AT are Services or DHCP client in the Application Layer, TCP/UDP in the Transport Layer, IP in the Network Layer, PPP/PPPoE client in the Data Link Layer and IEEE 802.11 based Physical Layer.

As another example, APGW uses A10/A11-like interface where A11-like provides the R-P link control, and the A10-like interface uses GRE to provide tunneling to PDSN. As a further example, the physical layer for the APGW is T1, fiber or other suitable transmission media; and in PCF, the A11 is used for providing the radio packet (R-P) link control, A10 uses GRE to provide tunneling to PDSN, and A/8/A9 interface is used to connect to the access network (AN) formed by the BTSs and BSCs.

The AAA mechanism in the systems in FIGS. 3 and 4 provides several functions. The AAA in the service provider network, i.e., a local AAA, provides IP addresses for mobiles using Simple IP and the route between PDSN and home AAA (HAAA) for mobiles' authentication and authorization, and provides a root for the user profile received from the home AAA to the PDSN. The AAA in the home IP network performs the mobiles' authentication and authorization requested from local AAA, and provides the user profile to PDSN via the local AAA. The AAA also keeps billing record received from the PDSN for the network use by the AT user.

Figure 7:
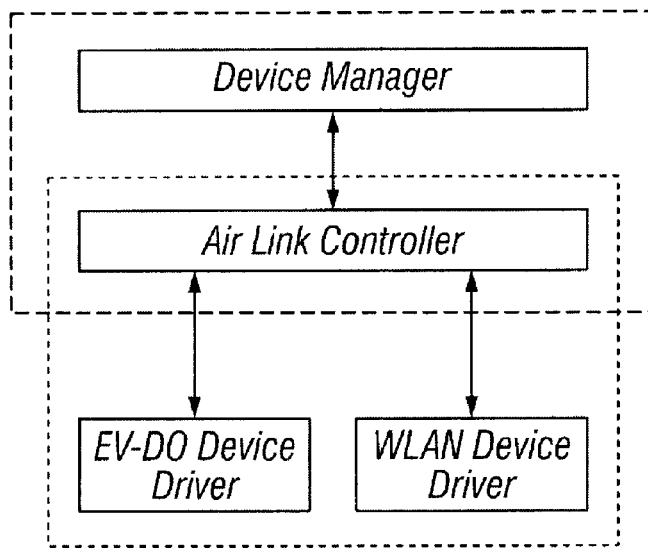

In one implementation, each AT is programmed with control modules to control the system acquiring and releasing in the WWAN-WLAN system. FIG. 7 illustrates different control modules in the AT. In operation, the AT determines whether to enter WWAN EV-DO system or WLAN based on the Air Link Status maintained in an air link driver installed in the AT. The Air Link Status may include the following three different states, Acquiring, Acquired, and Lost. In the Acquiring status, the NIC in the AT has found an RF signal of the CDMA2000 WWAN or WLAN network, and is establishing the connection with the selected network. In the Acquired status, the NIC is connected to the selected network. In the Lost status, the NIC does not find the RF signal of CDMA2000 WWAN or the WLAN network.

Both CDMA2000 WWAN (e.g., EV-DO) and WLAN air link device drivers may work independently to monitor the air link conditions. In one exemplary implementation, when the monitored RF signal strength exceeds a given threshold, the device driver declares that it is acquiring the network, and it sends a signal to the air link controller about the existence of the network. When the monitored RF signal strength is below a given threshold, the device driver declares a loss of the connection to the network, and it sends a signal to the air link controller about the absence of the network. The air link driver should have the ability to enable and disable the air link device. The device driver may have the ability to enable or disable the air link transmitter only in some implementations.

The air interface controller should control the CDMA 2000 (e.g., EV-DO) and WLAN devices to enter and leave networks based on the air link conditions. The air link interface controller may be implemented as a part of device manager of a suitable operating system such as the MS Windows, or a super device driver of the air interface drivers.

The conditions for connecting the AT to the WWAN and WLAN may be preset to the preferred network such as the WLAN. For example, the conditions to enter WLAN may include the following. Once the WLAN device driver reports acquiring WLAN, the air interface controller permits the device to enter WLAN network and notifies the upper layer software to establish a connection to the AT. If the AT is connected to CDMA2000 WWAN (e.g., EV-DO), the air interface controller performs the handoff procedure to handoff the service to the AT from the WWAN to WLAN.

The conditions to leave WLAN may be set as following. For example, when the AT is connected to WLAN in the lowest supported data rate and an error rate for monitoring, such as the frame error rate (FER) or the bit error rate (BER), is higher than the given threshold, the WLAN device driver notifies the air interface controller. The air interface controller controls the AT to leave WLAN and handoff to CDMA2000 EV-DO network if the EV-DO NIC device reports acquiring CDMA2000 EV-DO network. The air interface controller may force the AT to continue its connection to WLAN if the EV-DO device driver does not report acquiring CDMA2000 EV-DO until AT loses the connection to WLAN.

The conditions to enter the CDMA2000 WWAN (e.g, EV-DO) may be set as following. The air interface controller permits the EV-DO device to enter WWAN network if CDMA2000 EV-DO device driver reports acquiring network status and WLAN device driver reports the lost network status. Once CDMA2000 EV-DO device is allowed to enter its network, AT creates a session such as the HRPD session in EV-DO on the AN and establish a new PPP or bind with existing PPP connection with PDSN.

Two conditions may be set to cause the AT to leave the CDMA2000 EV-DO network. First, the CDMA2000 EV-DO device reports a lost network status. When this occurs, the AT may drop the connection. Second, the WLAN device reports the acquiring network status. When this occurs, the AT is controlled to hand off to the WLAN.

The handoff process in the WWAN-WLAN interworked system may use the "hard" handoff to switch air links between the WWAN and WLAN. This handoff may be designed to be seamless with proper handoff mechanism. Since the CDMA2000 (e.g., IS-856 for the EV-DO) and 802.11 are two independent interfaces on the air links, the handoff between IS-856 and 802.11 may cause a discontinuity on the air link and thus lead to discontinuity on the data-link layer. However, the handoff can keep the connectivity above the data-link layers by maintaining the same IP stack in AT and PDSN with switching between the WLAN and WWAN systems.

If it is assumed that the WLAN offers higher data rate at lower cost than the WWAN, then the system may be set to maintain an access to the WLAN whenever possible. Under this assumption, the following sections describe one exemplary handoff strategy. Conversely, the opposite strategy or other handoff strategies may be used based on the specific requirements of the applications.

Hence, when the air link interface reports acquiring both CDMA2000 WWAN and WLAN networks, the AT will make a connection to the WLAN network and remain in the WLAN network until the air link interface reports a loss of the connection to the WLAN. The AT is used to initiate the handoff from one network to another. Such handoff may be implemented either by using the PPPoE or the DHCP.

In the PPPoE implementation, the handoff may occur in the following manner: a dormant session handoff to WLAN, an active session handoff to WLAN, a dormant session handoff to the WWAN (e.g., EV-DO), and an active session handoff to the WWAN (e.g., EV-DO). The dormant handoff and active hand off to the WWAN (e.g., EV-DO) may use the existing WWAN (e.g., EV-DO) handoff procedures and hence are omitted in this application.

The dormant session handoff to WLAN under PPPoE may be configured as follows. First, the AT is triggered to initiate the dormant session handoff to WLAN by the condition for entering the WLAN. The APGW may be triggered to establish an A10/A11-like connection to PDSN when PPPoE Access Concentrator in APGW receives PADR message from AT. Next, the APGW sends PADS with SessionID (Key) back to AT. With the SessionID (Key) in PADS, AT then binds the PPP session to APGW A10 tunneling and transmits the user application data. The PPP session terminates between the AT and the PDSN.

The R-P-like links can be established between the APGW and PDSN as follows. The APGW initiates the R-P-like link establishment to PDSN when receiving PADR message. The APGW sends an A11 Registration Request to PDSN. Next, the PDSN sends an A11 Registration Reply to APGW.

The R-P link between the PCF and PDSN may be terminated according the CDMA2000 specifications. The PDSN initiates the R-P link termination on PCF-PDSN when PDSN has established the R-P-like link to APGW.

In one implementation, the PPP session including authentication should be established only on the first time to connect to the PDSN. For intra-PDSN handoff, re-establishment of PPP layer should be avoided in order to reduce data link breaking time. To prevent establishing a new PPP session during the interworking handoff, the APGW should use the same user information as is used during the setup of the A10/A11 interface for the PCF. Prior to a new PPP session, the PDSN checks its own PPP session list for the existence of the session with the AT and the session lists of all the PDSNs within its cluster to determine the best PDSN to handle the new session request and response. In the PADR message to APGW, AT should use the Vendor-Specific Tag to include the users specific information which may include the encrypted mobile IMSI number and other information related to A11 Registration Request to maintain the interworking handoff connectivity.

Figure 8A:
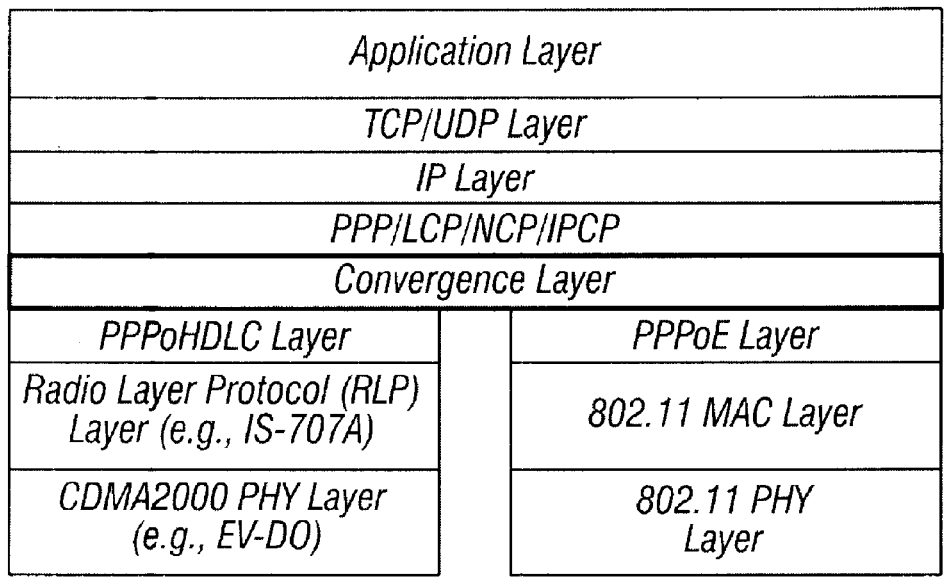
FIGS. 8A and 8B show the protocol stacks for AT and PDSN for the seamless dormant handoff to WLAN under the PPPoE.
Figure 8B:
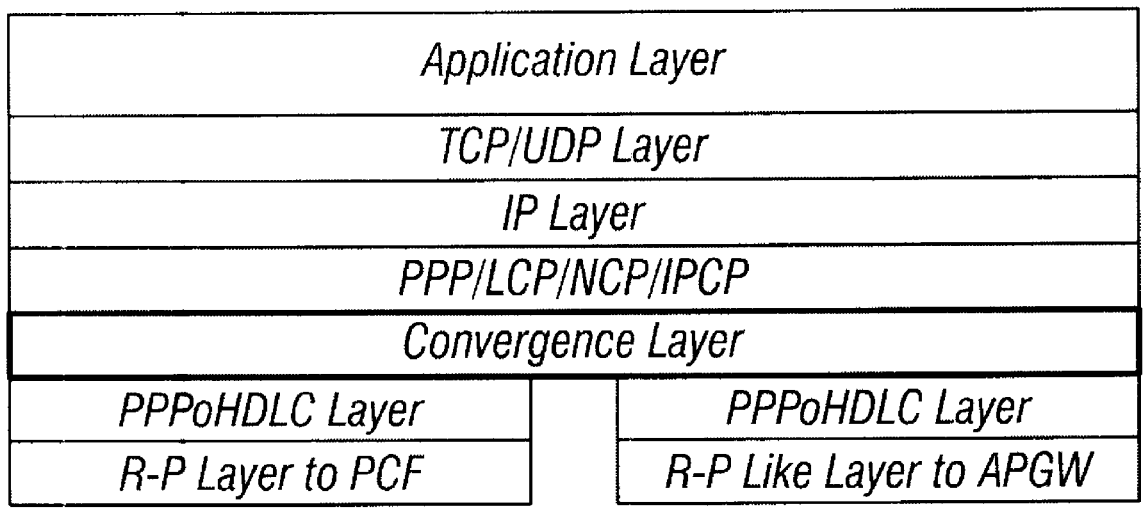

FIGS. 8A and 8B show the protocol stacks for AT and PDSN for performing handoff from the WWAN to WLAN under the PPPoE. A convergence layer is implemented in both the AT and PDSN as an intermediate layer between the PPP layer and PPPoHDLC layer. This convergence layer provides a switching function between data link layers during the interworking handoff. One function of the convergence layer is to hide the change of lower layers from PPP layer during handoff. This layer may be a virtual and transparent layer in some implementations.

Figure 9A:
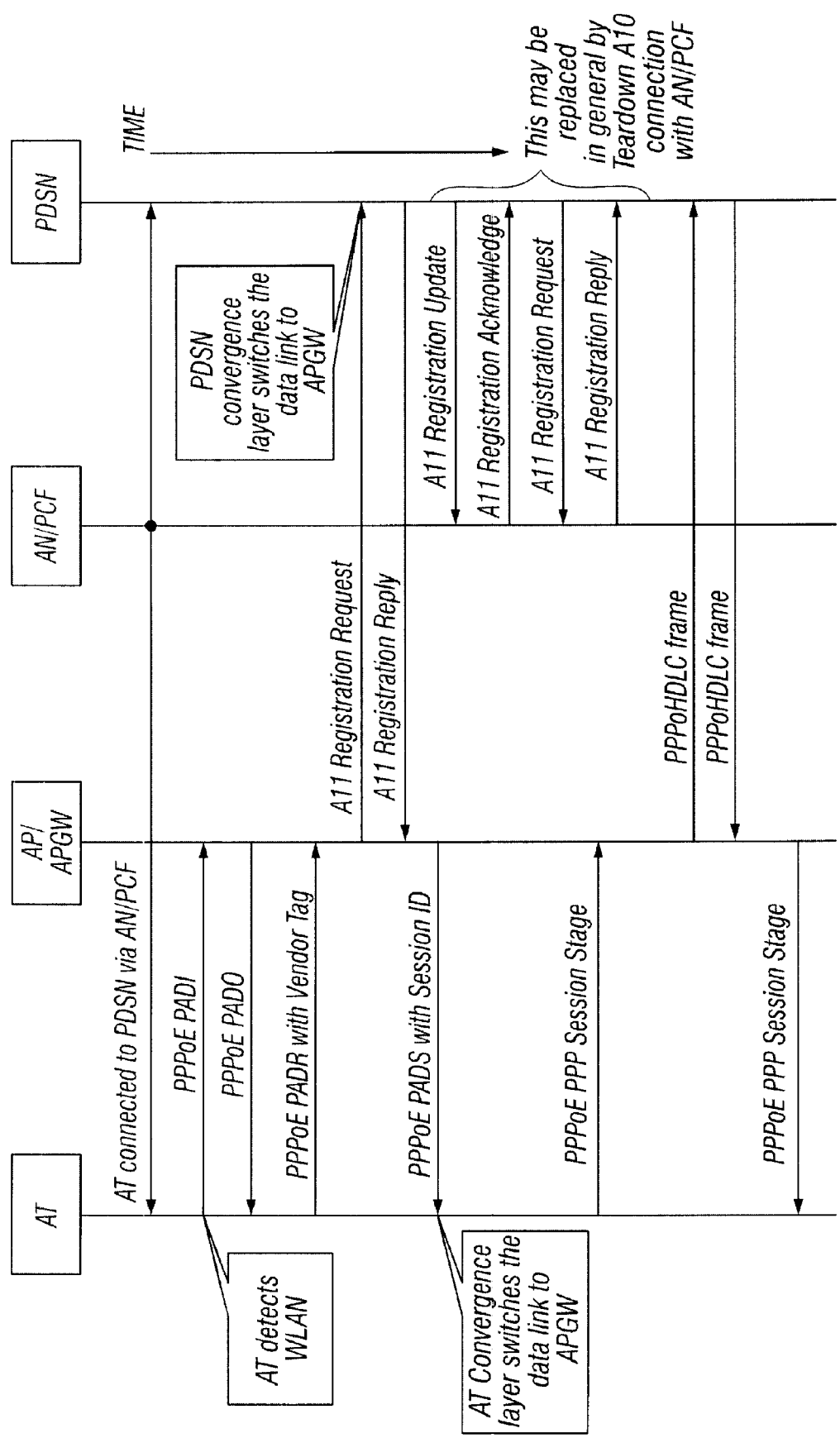
FIGS. 9A and 9B show the operation steps for intro-PDSN and inter-PDSN dormant handoff to WLAN, respectively, under the PPPoE.
Figure 9B:
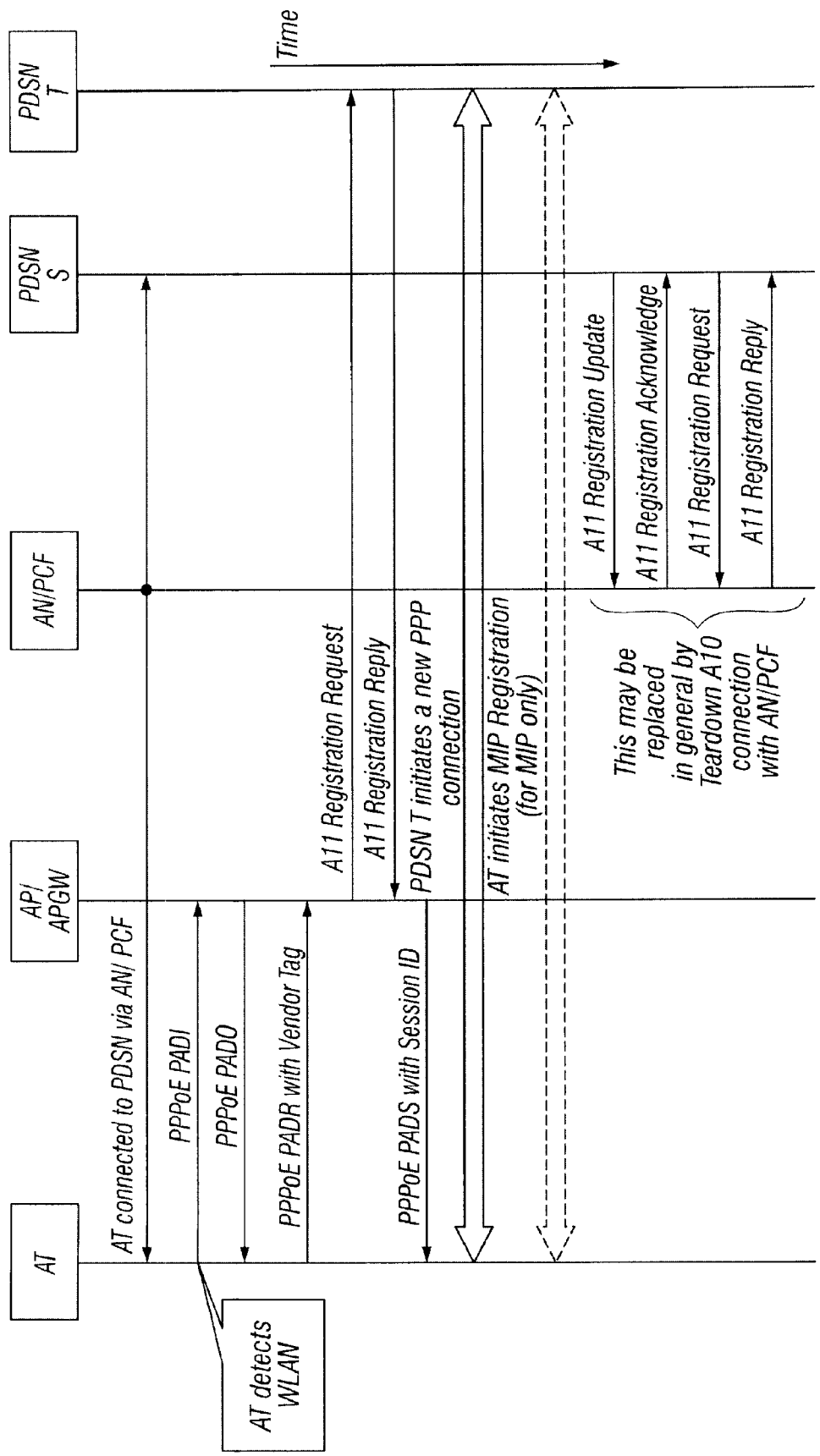
Figure 9C:
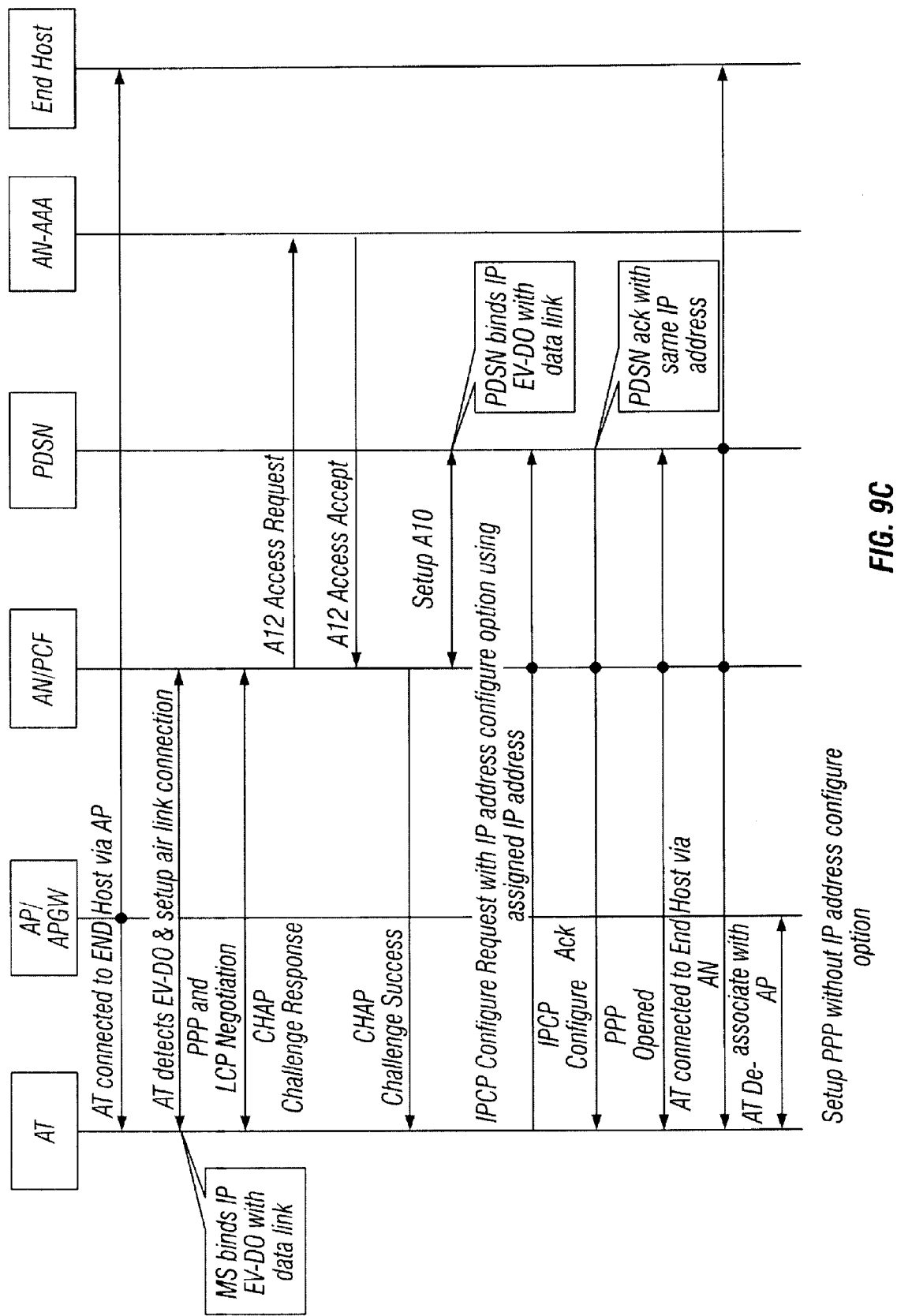
FIGS. 9C and 9D further show the operation steps for handoff from the WLAN to the WWAN under the Simple IP and the Mobile IP, respectively, where the EV-DO is used as an example for the WWAN.
Figure 9D:
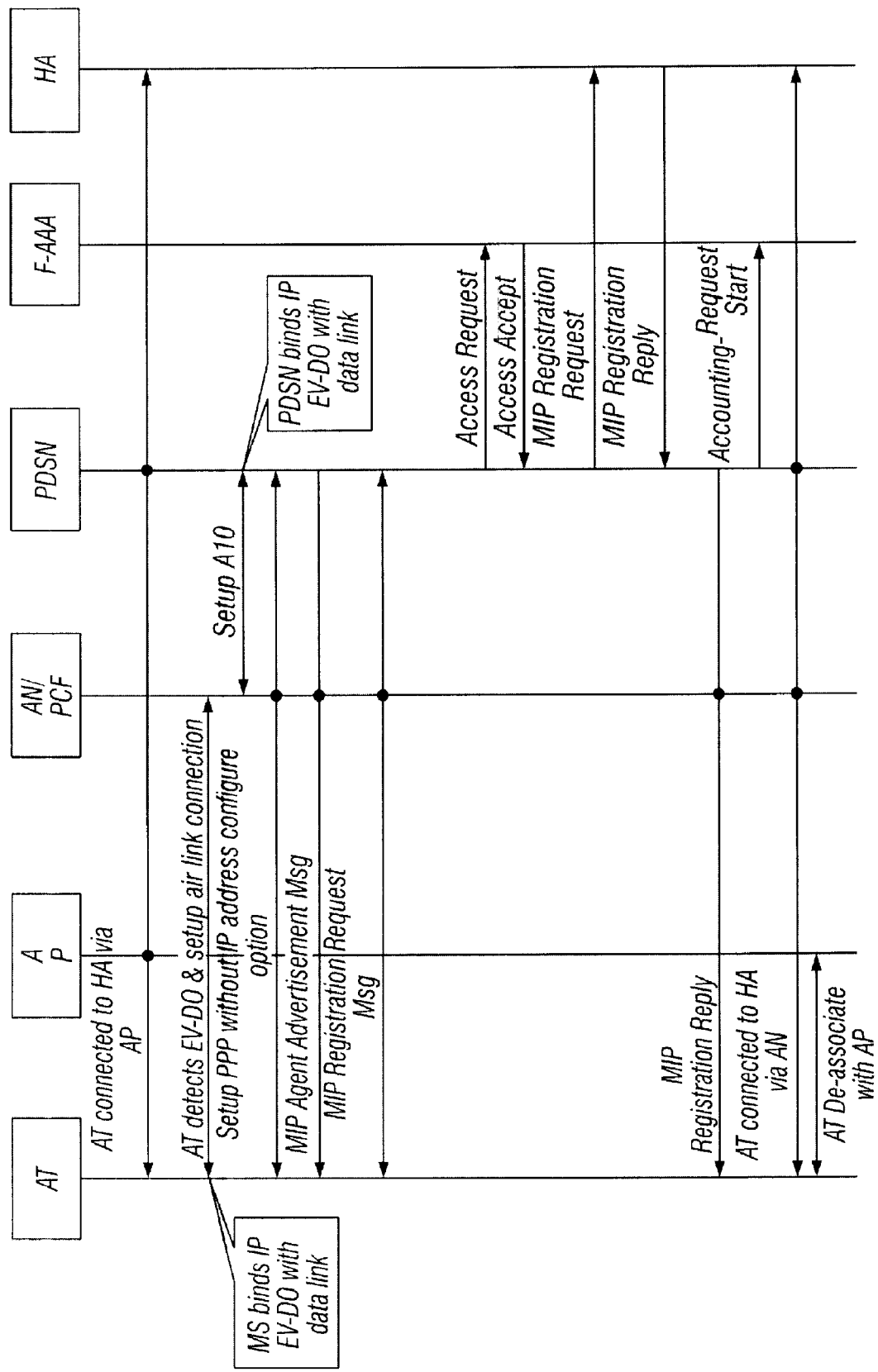

FIGS. 9A and 9B show the operation steps for intra-PDSN and inter-PDSN dormant handoff to WLAN, respectively, under the PPPoE. The A11 registration messages between AN/PCF and PDSN may be generally implemented by teardown A10 connection with AN/PCF. FIGS. 9C and 9D further show the operation steps for handoff from the WLAN to the WWAN under the Simple IP and the Mobile IP, respectively, where the EV-DO is used as an example for the WWAN.

In the active handoff to WLAN under the PPPoE, the operations for triggering the AT to initiate the active handoff and the APGW to establish A10/A11-like interface are similar to those for the dormant handoff to WLAN. The active handoff to WLAN may be implemented with the following three steps. First, the active state is changed to the dormant state. Second, the dormant handoff to WLAN is performed. Third, the dormant state is changed to the active state. Notably, this active handoff via dormant state can prevent loss of data buffered in BTS/BSC during the data link switching.

Turning to the handoff to WLAN under the DHCP, DHCP provides a protocol for delivering host-specific configuration parameters from a DHCP server to a host in Internet and uses a mechanism to allocate a network addresses to the host. The DHCP client is a module inside the AT and the DHCP server is connected in the network behind the PDSN in the WWAN-WLAN interworked system. The IP address allocation may be implemented by automatic allocation which provides permanent assignment of IP address, dynamic allocation which assigns a temporary IP address for a limited period, and manual allocation by a network administrator. The DHCP Messages used in the handoff include the following: DHCP-Discover, DHCP-Offer, DHCP-Request, DHCP-Ack, DHCP-Nack, DHCP-Decline, and DHCP-Release. Similar to the handoff for PPPoE, four different handoffs under the DHCP are dormant session handoff to WLAN, active session handoff to WLAN, dormant session handoff to WWAN (e.g., EV-DO), and active session handoff to WWAN (e.g., EV-DO).

Figure 10:
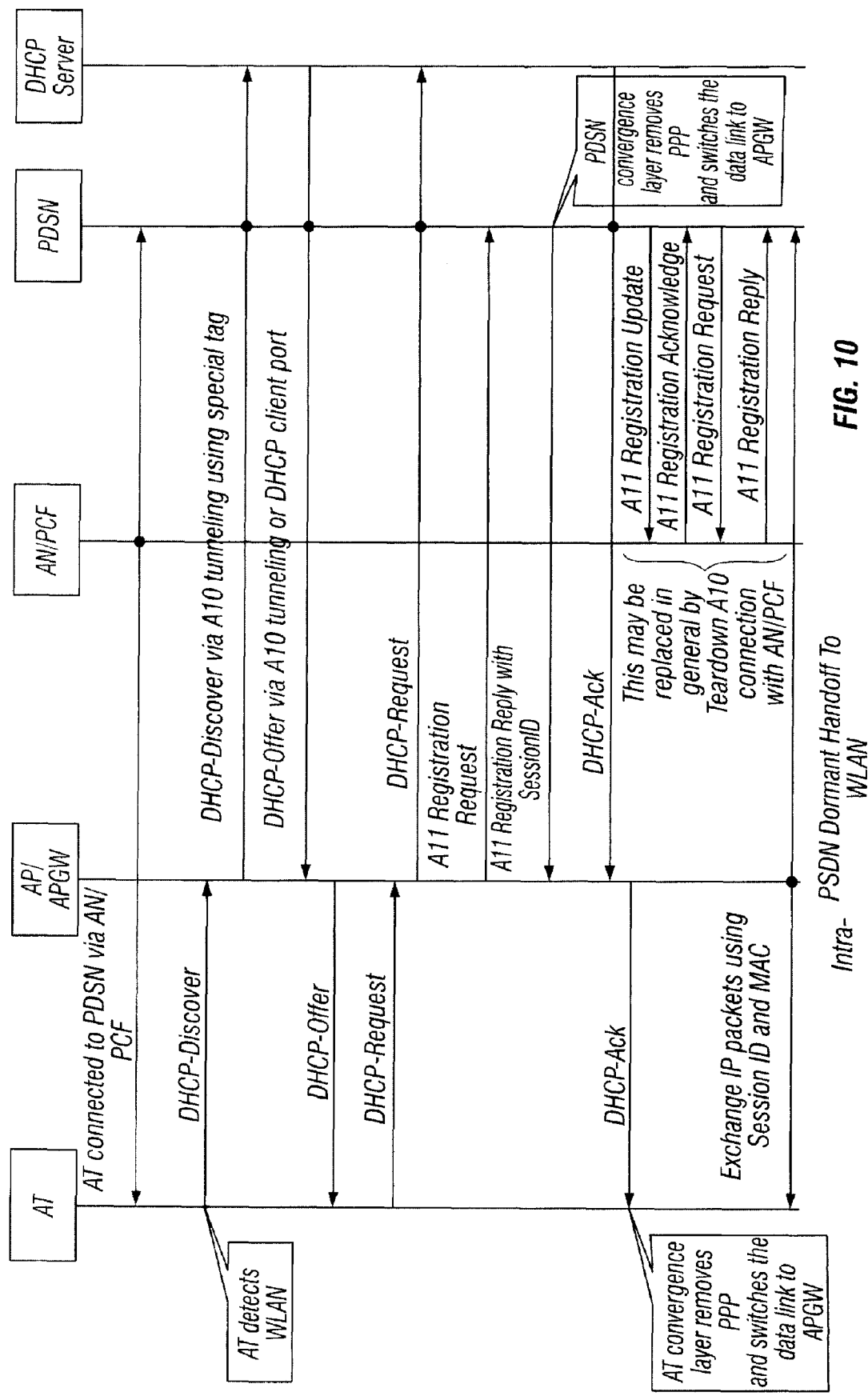
FIG. 10 illustrates operation steps in an intro-PDSN dormant handoff to WLAN under the DCHP.

In the dormant handoff to WLAN under DHCP, the triggering of AT to initiate dormant handoff to WLAN is the same as the case in PPPoE. Next, APGW is used as a DHCP Relay Agent to carry out the following operations. The DHCP Relay Agent checks DHCP port 67 to identify DHCP messages for the DHCP server. FIG. 10 illustrates operation steps in an intra-PDSN dormant handoff from the WWAN to the WLAN under the DCHP.

The following sections describe implementations of mobility management in the WWAN-WLAN systems. As mentioned above, both Simple IP and Mobile IP are supported. In the Simple IP, the IP address of AT is assigned dynamically by the local AAA of the serving network the first time that AT connects to PDSN and AT keeps its assigned IP address until the session closes. Within the same PDSN serving area, it is not necessary for AT to change its IP address when AT changes its serving radio access networks. Once an AT moves out the current PDSN serving area, it requests for a new IP address.

In the Mobile IP, the IP address of AT is assigned by the home AAA of its home network. The AT always keeps this IP address regardless whether it handoffs to a new serving area. The mobile node can roam out of its home IP network using the fixed IP address. The PDSN essentially acts as an access gateway to IP network for both EV-DO and WLAN.

In the Simple IP, the IP address is assigned to the AT by using the IPCP to get an IP address from the serving PDSN if the AT supports PPP. If the AT supports DHCP, the DHCP can be used to get an IP address from the DHCP server on serving PDSN under the Simple IP. In the Mobile IP, the MIP Registration Request/Reply is used to inform PDSN and the AT of the assigned home address.

Figure 11:
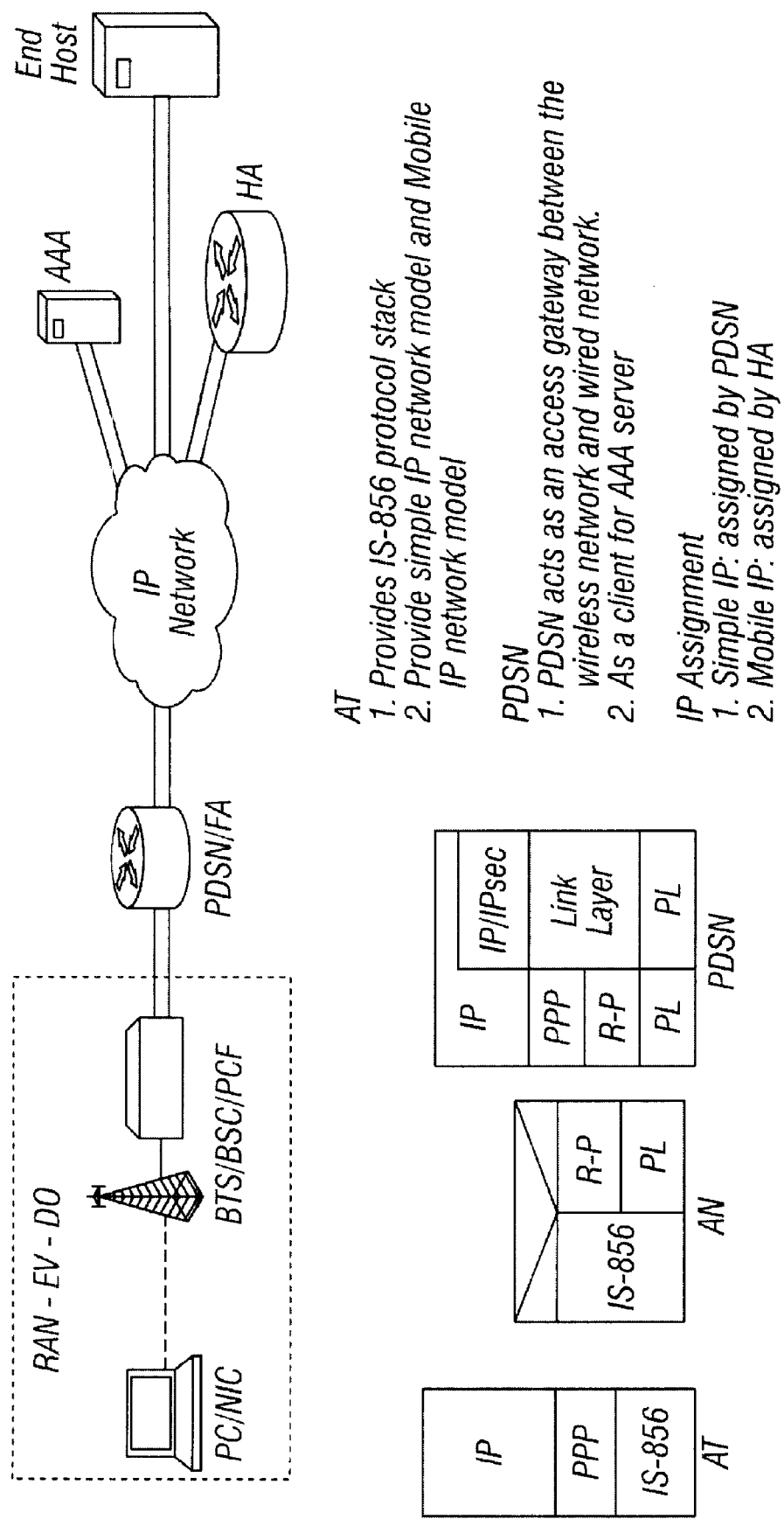
FIGS. 11 and 12 illustrate, under one implementation, the system hardware components and the corresponding protocol stacks in both the WWAN (EV-DO) and the WLAN for mobility management, respectively.
Figure 12:
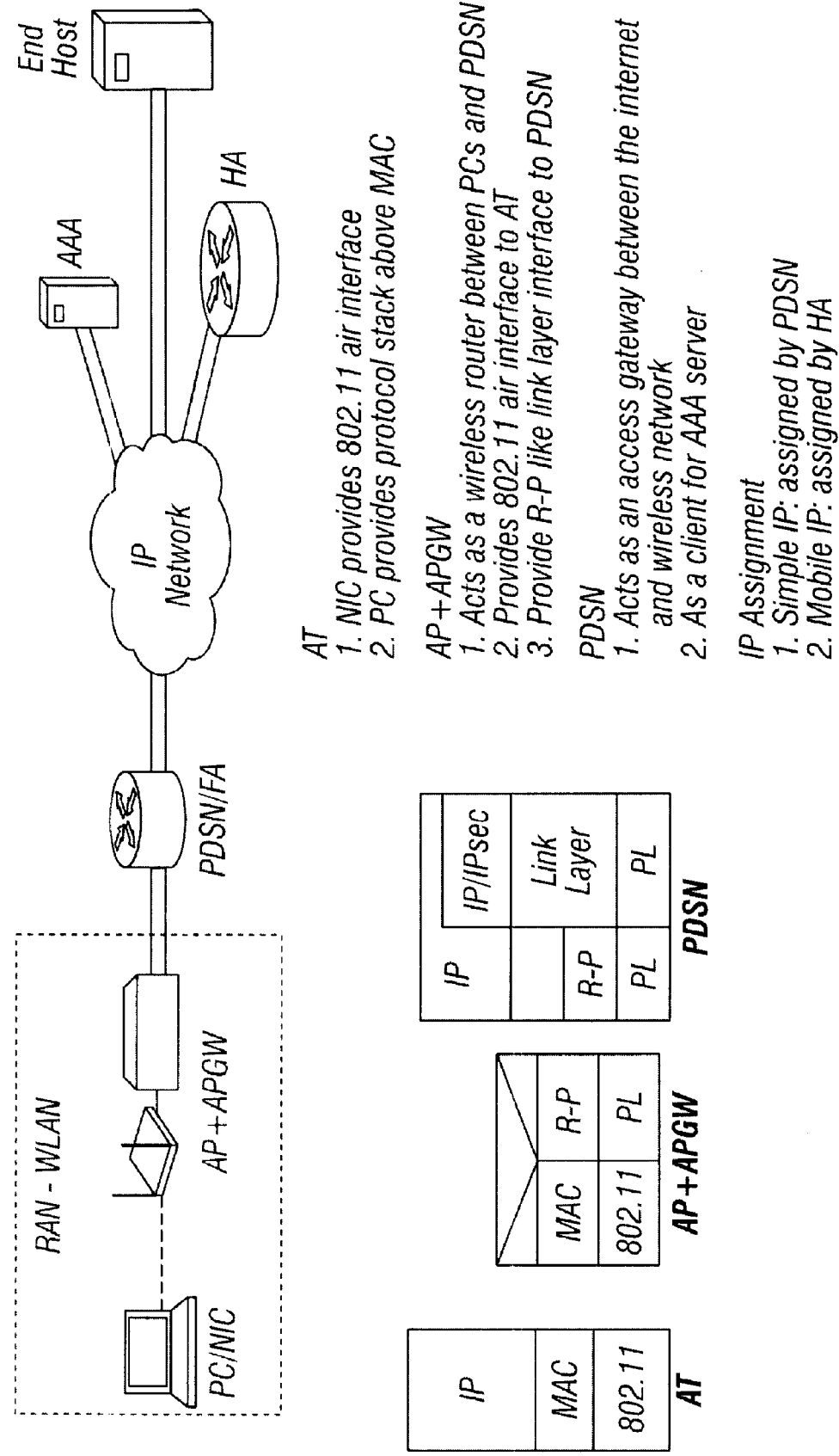

FIGS. 11 and 12 illustrate, under one implementation, the system hardware components and the corresponding protocol stacks in both the WWAN (EV-DO) and the WLAN for mobility management, respectively. The mobile node can roam out of its home IP network using a fixed IP address for a mobile node. The HA and AAA in the mobile home IP network are accessible for the WWAN (e.g., EV-DO) and WLAN service provider. The PDSN acts as an access gateway to IP network for both the WWAN and WLAN. This mobility management has simple architecture for both networks and reuses the network components in the CDMA2000 network, such as AAA and HA. In particular, the system is able to provide seamless connectivity on the above data-link layers.

The AAA for the WWAN-WLAN interworked systems described here provides a unified and integrated approach to various AAA functions. The system architecture in FIG. 4 may be used for implementing the unified AAA. For the CDMA2000 system, the radio access network authenticates the mobile during CDMA2000 system access. An AP may be directly linked to the LAAA via either a router or the IP network. When the mobile user registers for packet data services, the RADIUS protocol may be used for providing packet data AAA services. The AAA-client function at the PDSN and the AAA server located in the home network provides RADIUS capabilities conforming to RFC 2865, 2866 and 2868. Enhanced AAA capabilities conforming to 3GPP2 P.S0001 are also supported. Proxy/Local and broker-AAA servers also conform to the above stated specifications.

For the WLAN access, the IEEE 802.1x framework may be used for authentication during WLAN access. The Access Point provides Authenticator functions conforming to IEEE 802.1x specifications. The AAA server located in the home network provides RADIUS based Authentication Server functions. The Proxy/Local and broker-AAA servers forward RADIUS messages between the Authenticator and the Authentication Server. Similar to the cdma2000 type of access, RADIUS protocol between the AAA-client at the PDSN and the AAA server in the home network, are used for authentication, authorization and accounting for packet data services.

In one implementation, the WWAN-WLAN system supports authentication services at four functional levels: during wireless link access, during PPP link establishment, during MoIP based service access, and during initiation of an application instance.

Authentication during wireless link access includes authentication based on home location register (HLR) for the CDMA type of system access and IEEE 802.1x based authentication for WLAN type of system access. The IEEE 802.1x authentication is based on Extensible Authentication Protocol (EAP) as specified in RFC 2284 which specifies support for multiple authentication algorithms. The IEEE 802.1x specification defines encapsulation format used for transmission of EAP messages over WLAN air interface. This encapsulation format, known as EAPOL used for communication between the AT and the authenticator. The Access Point provides authenticator functions per the IEEE 802.1x specification. The authenticator (AP) re-packages EAP frames in RADIUS format for onward transmission to the Authentication Server/home-AAA, via the proxy/local broker-AAA entities, and vice versa. The AT uses PPP Vendor-Specific Option (RFC 2153) to pass implementation specific information (e.g. IMSI) to the Authentication Server.

Authentication during PPP link establishment uses PPP services, as specified in 3GPP2 P.S0001 specifications supported at the AT/mobile and the PDSN for both the cdma and WLAN type of system access. The PPPoE framework is supported at the AT and the AP Gateway for WLAN access. The AP Gateway provides RFC 2516 compliant Access Concentrator functions. The Vendor Specific Tag, as specified in RFC 2516, is used for transfer of implementation specific information (e.g. IMSI) between the AT and the Access Concentrator. The AT and the AP Gateway negotiate a Session_ID during PPPoE Discovery stage. The AP Gateway establishes A10 connection with the selected PDSN upon receiving the PADR packet and before returning the PADS response. The PDSN selection at AP Gateway may be based on algorithms similar to the one's used by the PCF for selecting a PDSN. During the PPPoE Session stage, the AP Gateway performs transparent mapping of PPP frames between the AT and the PDSN based on the PPPoE negotiated Session_ID and the Key field used for the A10-like connection. The CHAP/PAP based authentication may be supported during the PPP link establishment. The PDSN provides AAA-client functions and forwards RADIUS Access-Request message to the AAA server in the home network. On successful authentication, the AAA-Server returns user service profile information in the RADIUS Access-Accept message.

Authentication during MoIP type of service access may be implemented using the Foreign Agent Challenge (RFC 3012) during the registration of MoIP sessions. The PDSN sends the MoIP agent Advertisement messages to the mobile AT when the PPP connection is established. The mobile AT's challenge response received in the MoIP Registration Request message is forwarded to the home-AAA for authentication before allowing MoIP to proceed. The challenge response related information is also forwarded to the home agent which can be configured to authenticate the mobile AT again via the home-AAA before allowing the MoIP registration. On successful authentication, an IP address is assigned to the session and the PDSN creates a MoIP service instance for the AT user. Failed registration attempts may be logged and un-trusted users remain blocked from accessing the network.

Authentication during initiation of an application instance can be implemented using the SSL/TLS mechanisms for Web based applications. Each service access by the mobile user is identified by a unique Network Address Identifier (NAI). The FA function at the PDSN may register an entry of such access in the visitor list, thereby associating mobile's home address with the session NAI, care-of-address, home agent, and other identifying information.

The AAA mechanisms also provide unified authorization services framework for both the WLAN and WWAN service accesses. An instance of user service profile is maintained at the AAA-server in subscriber's home network. Successful authentication during PPP establishment results in user service profile being forwarded by the AAA server to the PDSN in RADIUS Access Accept message. Information in the user service profile is used to determine and enforce subscriber service capabilities.

In authentication during wireless link access to the CDMA WWAN, HLR performs mobile/AT authentication based on subscription to different type of services etc. For the WLAN type of system access, the IEEE 802.1x based authentication results in the authenticator (AP) authenticating the AT via the authentication server in the home network. Successful authentication results in the AT being allowed to associate with the AP. No service specific authorization information is available to the AP via the AAA framework.

Authentication and authorization during PPP link establishment are based on the PPP supported by the mobile/AT and the PDSN. Successful authentication during PPP establishment results in the mobile/AT being authorized services by the AAA server in the home network. The Home AAA server returns a configured user service profile to the PDSN in the RADIUS Access Accept message. The user service profile includes information that enables the PDSN to enforce service capabilities. The service profile is applicable irrespective of the type of system access and mobility across different access networks.

Authentication during the MoIP type of service access may use the MoIP Challenge/Response Extension (RFC 3012) supported for MoIP based service access, where the authorization profile may already be made available to the PDSN during PPP link establishment. Authorization during initiation of an application instance uses the SSL/TLS mechanisms for Web based applications.

With respect to the accounting part of the AAA, the 3GPP2 P-S0001 accounting model may be used for both the WLAN and CDMA type of service access. For the CDMA type of service access, the RN/PCF and the PDSN together manage accounting parameters. The AP Gateway and the PDSN manage accounting parameters for WLAN type of system access.

Accounting parameters are divided into radio specific parameters and IP network specific parameters. The RN/PCF and the AP Gateway collect and report radio specific parameters to the PDSN. The PDSN collects IP network specific parameters including the volume of data transfer for each user session. The PDSN merges the IP network specific parameters with the radio specific parameters to form one or more Usage Data Records (UDR). The PDSN forwards the merged UDR to the AAA server at configured trigger events by using RADIUS Accounting messages. The PDSN maintains the UDR information until it receives a positive acknowledgment from the RADIUS server. Likewise, the RADIUS server maintains the UDR until the record is delivered to a home RADIUS server, or removed by the operator billing system.

For the WWAN type of service access, the radio specific parameters may include: Mobile Identification information in the form of MSID and ESN, BS and PCF identification information in the form of PCF ID and BSS ID, radio channel capability information in the form of traffic channel type/mux options/airlink QoS etc., and air time usage information. For WLAN type of service access, the radio specific parameters may include: mobile identification information in the form of MAC address and the MSID, AP and AP Gateway identification information in the form of AP ID and the APGW ID, and AT-AP association time information.

In some implementations, the WWAN system may support four types of Airlink Records for communicating radio specific parameters over the PCF-PDSN interface. These records are the R-P Connection Setup Record used when the PCF establishes an R-P connection with the PDSN, the active Start Airlink Record used when the MS has started the use of traffic channel(s), the Active Stop Airlink Record used when the MS has stopped the use of traffic channel(s), and Short Data Burst (SDB) Airlink Record used when a forward or reverse short data burst is exchanged with the MS.

The WLAN system may be configured to support three types of WLANlink records for communicating radio specific parameters over the APGateway-PDSN interface. These records are the R-P-like connection Setup WLANlink Record used when the AP Gateway establishes an R-P connection with the PDSN, the active Start WLANlink Record used when the AT associates with an AP and starts the use of the WLAN airlink, and the Active Stop WLANlink Record used when the AT de-associates with the AP and stops the use of the WLAN airlink. The R-P Connection Setup WLANlink Record includes the WLANLink Record Type=1 (Connection Setup), the R-P Session ID, the WLANLink Sequence Number, and the Serving AP Gateway ID. The active Start WLANlink Record includes the WLANLink Record Type=2 (Active Start), the R-P Session ID, the WLANLink Sequence Number, the Extended Service Set Identifier (ESSID), the BSSID, and the Frequency Channel. The Active Stop WLANlink Record includes the WLANLink Record Type=3 (Active Stop), the R-P Session ID, and the WLANLink Sequence Number.

As part of the accounting function, the PDSN monitors data traffic for the usage byte count, both on the uplink and the downlink separately. The PDSN merges data traffic usage parameters with radio specific parameters and forwards the merged UDR to the AAA server via Accounting-Request messages at appropriate trigger events such as establishment of a user service instance, termination of a user service instance, occurrence of interim accounting record trigger, occurrence of the time-of-day trigger, and when the UDR size crosses a configured value, and other triggers as configured by the service provider.

In the above description of the WWAN-WLAN interworked systems, certain features and functions from various technical standards and specifications are mentioned. Some of such standards and specifications include are:

[1] 3GPP2 C.S0001 Introduction to CDMA2000 Spread Spectrum Systems, Release 0.

[2] 3GPP2 C.S0002 Physical Layer Standard for CDMA2000 Spread Spectrum Systems, Release 0.

[3] 3GPP2 C.S0003 Medium Access Control Standard for CDMA2000 Spread Spectrum Systems, Release 0.

[4] 3GPP2 C.S0004 Signaling Link Access Control Specification for CDMA2000 Spread Spectrum Systems, Release 0.

[5] 3GPP2 C.S0005 Upper Layer Signaling Standard for CDMA2000 Spread Spectrum Systems, Release 0.

[6] 3GPP2 C.S0024_0_v4.0 cdma2000 High Rate Packet Data Air Interface (IS-856).

[7] 3GPP2.C.S0017-0-2 v2.0 Data Service Option for Spread Spectrum System—Addendum 2 (IS-707-A-2).

[8] 3GPP2 A.S0001 3GPP2 Access Network Interface Interoperability Specification.

[9] 3GPP2 A.S0017-0 Interoperability Specification (IOS) for CDMA 2000 Access Network Interfaces ☐ Part 7 (A10 and A11 Interfaces) 15.

[10] 3GPP2 A.S0007-A v1.0 3GPP2 Interoperability Specification (IOS) for High Rate Packet Data (HRPD) Access Network Interface Rev. A.

[11] 3GPP2 P.R0001 Wireless IP Architecture Based on IETF Protocols.

[12] 3GPP2 P.S0001-A Wireless IP Network Standard.

[13] RFC0768 User Datagram Protocol, August 1980.

[14] RFC0791 INTERNET PROTOCOL, September 1981.

[15] RFC0792 INTERNET CONTROL MESSAGE PROTOCOL, September 1981.

[16] RFC 0793 TRANSMISSION CONTROL PROTOCOL, September 1981.

[17] RFC0826 An Ethernet Address Resolution Protocol (ARP), 1982.

[18] RFC0925 Multi-LAN Address Resolution, October 1984.

[19] RFC 1661 The Point-to-Point Protocol (PPP).

[20] RFC 1662 PPP in HDLC-like Framing.

[21] RFC 1701-1702 Generic Routing Encapsulation (GRE).

[22] RFC 1812 Requirements for IP Version 4 Routers, June 1995.

[23] RFC 2002-2006 Mobile IP Related Documents.

[24] RFC 2865 Remote Authentication Dial In User Service (RADIUS).

[25] RFC 2866 RADIUS Accounting.

[26] RFC 2344 Reverse Tunneling for Mobile IP, May 1998.

[27] RFC 2661 Layer Two Tunneling Protocol "L2TP", August 1999.

[28]. RFC 2794 Mobile NAI Extension, March 2000.

[29] RFC 2868 RADIUS Attributes for Tunnel Protocol Support.

[20] RFC 2869 RADIUS Extensions.

[31]. RFC 2888 Secure Remote Access with L2TP, August 2000.

[32] RFC 3012 Mobile IPv4 Challenge/Response Extensions.

[33] RFC 2131 Dynamic Host Configuration Protocol.

[34]. RFC 2153 PPP Vendor Extensions.

[35]. RFC 2284 PPP Extensible Authentication Protocol (EAP).

[36] RFC 2516 A Method for Transmitting PPP Over Ethernet (PPPoE).

[37] IEEE Std. 802.11-1999 Wireless LAN Medium Access Control (MAC) and Physical Layer (PHY) Specifications.

[38] IEEE Std. 802.11b-1999 Wireless LAN Medium Access Control (MAC) and Physical Layer (PHY) Specifications: Higher-Speed Physical Layer Extension in the 2.4 GHz Band.

[39] IEEE Std. 802.11a-1999 Wireless LAN Medium Access Control (MAC) and Physical Layer (PHY) Specifications: High Speed Physical Layer in the 5 GHz Band.

[40] IEEE P802.1x Draft Standards for Local and Metropolitan Area Networks: Standard for Port Based Network Access Control.

In the described examples for interworking between cdma2000 based (WWAN) and IEEE 802.11 based Wireless-LAN (WLAN) wireless communications networks, a wireless access terminal, which can be implemented in various communication device configurations such as a mobile computer terminal, is designed to support wireless adaptors for both the WWAN and WLAN communication networks and thus is a dual-mode AT. Such a dual mode AT can be configured to use Internet PPP protocol for the seamless transport of user data packets over the WWAN and/or the WLAN, depending on the availability, signal strength or such other capabilities of the underlying communication network. While connected to the WWAN network, the dual-mode AT can use PPP-over-HDLC framing for the transport of user data packets via the Internet PPP protocol. This application discloses a method wherein the dual-mode AT, while connected to the WLAN network, can be operated to use the Internet PPPoE protocol as the underlying adaptation layer for the transport of user data packets via the Internet PPP protocol. In another aspect, unified Authentication, Authorization and Accounting (AAA) can be provided while obtaining data services from the cdma2000 WWAN or the and IEEE 802.11 WLAN communication networks.

The following sections and associated drawings describe additional features for techniques, apparatus and systems for interworking between WWAN and WLAN, including features on hardware devices and software control in both the network system and the access terminals (AT) that are designed to allow for accessing the interconnected WWAN and WLAN networks.

Each AT is designed to include either two network access adaptors for accessing WLAN and WWAN networks, respectively, or a single network adaptor with two ports for accessing the WLAN and WWAN, respectively. An AT may be any of the mobile communications devices including but not limited to mobile phones, Personal Digital Assistants (PDAs), mobile computers, mobile TVs, and mobile media players. An AT may be designed to handle (1) both voice and data communications, or (2) only data communications. The network access adaptor or access port for the WWAN may be configured based on various CDMA2000 standards. In the following sections and the accompanying drawings, CDMA2000 EV-DO is used as an example in various implementations and may be replaced by another suitable CDMA2000 compatible standard. The network adaptor or the access port for the WLAN may operate under one of the IEEE 802.11 protocols. A control mechanism is implemented to switch an AT between the WWAN and WLAN links so that a packet data service can be maintained without interruption.

Figure 13:
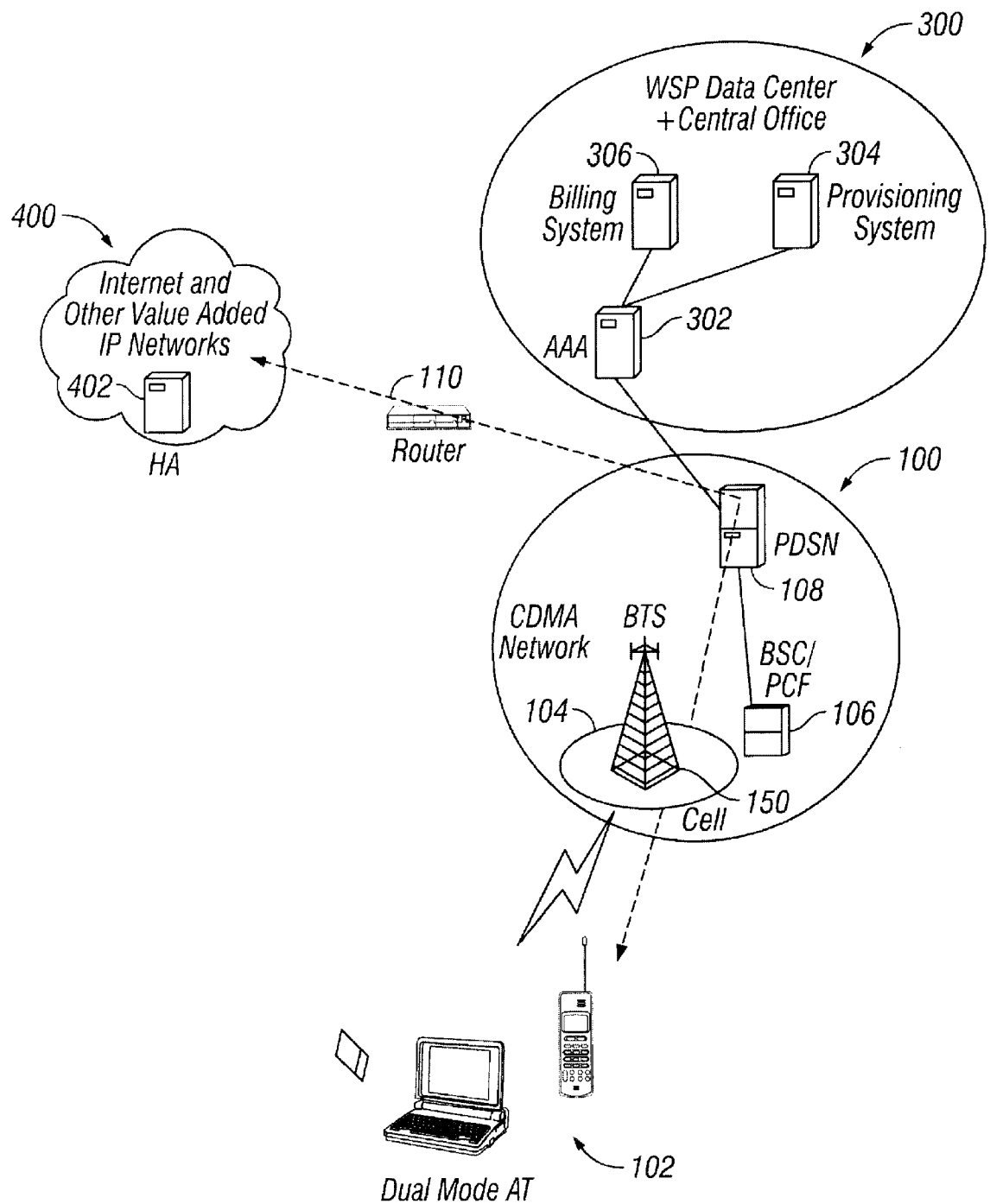
FIG. 13 depicts an example of a CDMA based (WWAN) wireless data communications environment.

FIG. 13 illustrates an exemplary architecture of wireless CDMA2000 wide area network (WWAN) 100. The WWAN 100 includes a plurality of wireless ATs 102 that are capable of radio contact with one or more CDMA technology based systems called the Base Transceiver System (BTS) 104. The wireless ATs may send and receive communication signals through BTSs over electromagnetic waves in the air, e.g. WWAN radio links. Air links for the WWAN are generally different from the air links for the WLAN. Hence, for communications with the CDMA WWAN only, it would be sufficient for the AT 102 to provide only a single network access adaptor or access port that is capable of communicating over the WWAN air link. The BTSs are distributed in a service area with multiple spatially divided cells to form a radio access network for the WWAN (WWAN Cell 150). Each cell may have one BTS. Alternatively and more commonly for some CDMA systems, each BTS may be designed to have directional antennas and may be placed at a location on edges of multiple cells in a sectorized arrangement to cover these cells. Multiple BTSs communicate with a controller called the Base Station Controller (BSC) 106 via fixed links using a variety of protocols and techniques such as TDM, ATM, IP etc. A hardware and software based functional entity called Packet Control Function (PCF) is also needed for providing CDMA packet data services. The PCF provides the capability to maintain information about ongoing user data sessions. In the present illustration of the WWAN 100, the BSC and the PCF are co-located as shown as a composite BSC/PCF entity 106. In another embodiment of the WWAN deployment, the BSC and PCF could be separate entities, connected via fixed links using a variety of protocols and techniques such as TDM, ATM, IP etc.

The WWAN 100 system FIG. 13 connects to two types of communications networks: one or more public switched telephone network (PSTN) and one or more packet data networks 400 (e.g., IP network such as a private IP network or the public Internet). In order to connect to the PSTN, the basic wireless system hardware for WWAN includes at least one Mobile Switching Center (MSC) as a control interface between the BSCs and the PSTN. The MSC essentially manages regular voice calls and low speed data calls also to and from the ATs of subscribed users. Services such as Short Message Service (SMS) may also be provided through the MSC. As the focus of the descriptions for this invention is on packet data services, the MSC functional entity and corresponding voice centric PSTN network are not shown in FIG. 13. Packet data services are provided through the IP network 400. In order to provide packet data services, the WWAN system provides for a plurality of BSC/PCFs 106 communicating with a plurality of Packet Data Serving Nodes (PDSN) 108 using protocols and procedures as specified in CDMA specifications. BSC/PCF 106 and PDSN 108 connection is also referred to as an RP Connection. The PDSN provides capabilities and protocol stacks (including IETF PPP protocol) for the subscribers connected to the ATs 102 for accessing packet data services over the radio access network. Specifically, the A10/A11 interface protocol as specified in the CDMA specifications can be used for user data transport and signaling over the BSC/PCF and PDSN RP Connection. The PDSN 108 forms the demarcation point for the WWAN 100 and performs all necessary protocol conversions so that the entities within the WWAN 100 can communicate with the entities coupled to external IP network 400. The PDSN 108 also performs all necessary protocol conversions for allowing WWAN 100 entities and the ATs 102 to communicate with the authentication, authorization and accounting (AAA) capabilities provided by the Wireless Service Provider (WSP) Data Center+Central Office Network 300. Typically, a plurality of WWANs 100 connect to a WAP Data Center+Center Office Network 300, and connectivity between the WWAN 100 and WAP Data Center+Center Office Network 300 may be provided over private or public Internet.

The WWAN network in FIG. 13 can provide two types of packet data services to subscribed users: Simple IP Services (SIP) and Mobile IP Services (MIP). Simple IP supports limited mobility of the ATs. As an AT 102 moves across the serving area of WWAN Cells 150, the point of logical connectivity of the mobile AT 102 to the serving PDSN 108 may remain the same or change, depending on the hierarchy of connectivity between the serving BTS 104, the BSC/PCF 106 and the PDSN 108. As long as the mobile AT is able to access services from the WWAN Cell 150 whose BTS 104 connects to the same PDSN (via the BSC/PCF) with which the subscriber data sessions was initially established, the subscriber data session continues uninterrupted. In case the mobile AT moves far enough so as to cause the serving BTS 104 to connect to a PDSN (via the BSC/PCF) other than the one with which the packet data sessions was initially established, the ongoing packet data session is terminated and a new session is established.

Mobile IP provides the capability of continuing the subscriber packet data session even if the serving BTS 104 is not able to connect to the PDSN 108 (via the BSC/PCF) with which the packet data session was initially established. In order to provide MIP services, the WWAN 100 network and IP Network 400 support mobility agents called the Foreign Agent (FA) and the Home Agent (HA). The functional capabilities and protocol support provided by the HA, the FA and the AT for MIP services have been described in detail in Perkins, C., "IP Mobility Standard", RFC 2002, October 1996 available from the Internet Engineering Task Force (IETF), and the follow up MIP related IETF RFCs. Enhancements to CDMA specific MIP related capabilities are described in CDMA specifications. In one implementation, the Foreign Agent (FA) functions are provided by the PDSN 108. In another implementation, the IP Network 400 provides the Home Agent (HA) 402 functions. In yet another implementation, the HA function may be built in the WWAN 100 network, or in the PDSN 108.

For MIP services, the HA serves as the anchor point for routing of user data packets as the AT moves across the coverage area of one or more FAs hosted by the PDSNs. As the HA is usually located in subscriber's Home Network, MIP supports uninterrupted subscriber packet data session as the mobile AT moves across the coverage areas of WWAN Cells 150. Different Wireless Service Providers (WSP) could have service level agreements to allow mobile ATs to roam across WSP network boundaries and still be able to access uninterrupted packet data services under the MIP framework.

The authentication, authorization and accounting (AAA) functions for the AT's use of packet data services can be provided by the hardware devices and software control embedded in the functional entities in the WSP Data Center+ Central Office 300. The AAA Server 302, in conjunction with the Provisioning System 304 is the repository for subscriber profile, policy and security related information. This information is used for user authentication and authorization of the services. The AAA Server 302, in conjunction with the Billing System 306 provides for accounting of the user's use of WWAN 100 network resources. The AAA Server 302 located in subscriber's home WSP network is called the Home AAA. Corresponding Local AAA capabilities are provided in the service provider WWAN Network 100. In one implementation for CDMA WWANs, the Local AAA communicates with the Home AAA 302 using IETF specified RADIUS protocol for accessing subscriber provisioned profile and policies. Such information is used for authenticating the users during system access, for the authorizing of services and for accounting purposes as well. In addition to the other information, such profile and policies may include details on user account balances (for pre-paid services), and service level guarantees (Platinum, Gold, Bronze etc). Such service level guarantees may be used for the appropriate allocation of the limited WWAN air link resources to the AT's subscribed users. Various entities in the WWAN network 100, including the BSC/PCF 106 and the PDSN 108 collect network usage details. In one implementation for the CDMA WWANs, the accounting related information collected by the BSC/PCF 106 includes four types of Airlink Records termed as R-P Connection Setup Record, Active Start Airlink Record, Active Stop Airlink Record and Short Data Burst Airlink Record. For postpaid accounting, the WWAN airlink usage information derived from these Airlink Records is merged with user session specific uplink and downlink packet data and/or byte count information collected by the PDSN 108 and forwarded to the Home AAA at system defined trigger-events. Pre-paid accounting functions may be realized by the PDSN 108 based on the pre-paid details received from the Home AAA/Provisioning System during initial service authorization.

Figure 14:
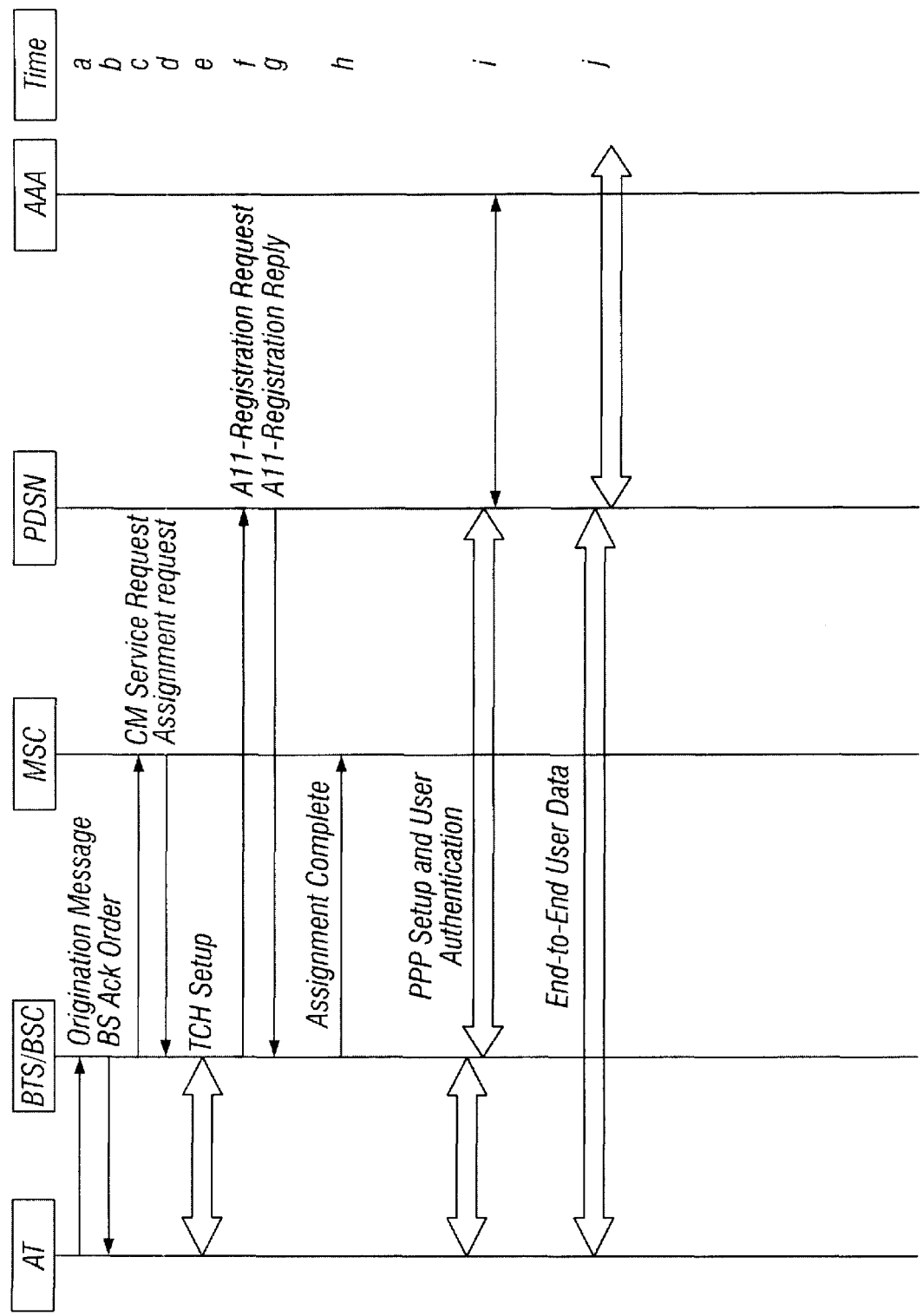
FIG. 14 shows an example of packet data call setup logic for the WWAN system shown in FIG. 13.

FIG. 14 illustrates a call setup logic for accessing packet data services from the WWAN network, the AT 102 initiates CDMA wireless radio link setup procedures by determining the best available WWAN Cell 150 in the area. In various deployments of CDMA WWAN networks, it is likely that the CDMA WWAN network specific adaptor or the access port in the AT 102 receives Pilot signals from a plurality of WWAN Cells 150. In one implementation, the AT chooses a WWAN Cell based on the strongest Pilot signal strength as measured by its WWAN network adaptor or access port, and synchronizes with the radio signal being transmitted by the BTS 104 of the chosen WWAN Cell 150. AT protocol layer functions may be implemented in hardware devices and software logic at the AT or the host computer system.

Figure 15:
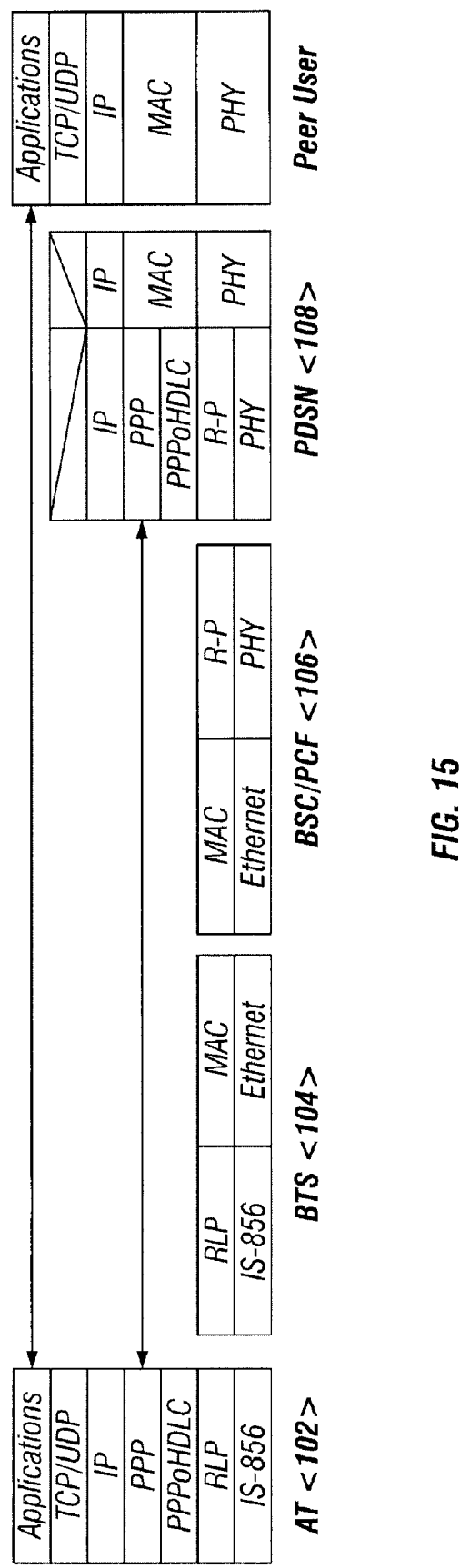
FIG. 15 illustrates an example of a Protocol Stack implementation at various functional entities for CDMA WWAN system shown in FIG. 13.

FIG. 15 shows radio link specific WWAN network adaptor or access port functions of the AT that are characterized by the lowest two layers of the AT Protocol Stack. Having synchronized with the radio link of the chosen BTS 104, the AT and various functional entities in the WWAN network perform follow a signaling logic for the assignment of radio link resources and WWAN network resources for this call and result in the setting up of a Traffic Channel between the AT 102 and the BTS 104. In one embodiment of the CDMA WWANs, this signaling logic is illustrated by steps (a-e) in the call setup logic of FIG. 14. On successful establishment of the radio traffic channel, the BSC/PCF 106 initiates establishment of an R-P Connection with the PDSN 108. For CDMA WWANs, this R-P Connection is also called the A10/A11 connection, and the signaling logic for the setting up of the A10/A11 connection is defined in the specifications developed by the 3GPP2 standards organization. Successful setup of the A10/A11 connection results in the BSC/PCF sending R-P Connection Setup Record and the Active Start Airlink Record to the PDSN. These airlink records are used for accounting purposes, as described in the following descriptions.

In operation, a radio traffic channel that has been assigned for the call may not be ready for the bi-directional transport of IP Packets related to the Applications running at the AT and the Peer User device. In one implementation of the CDMA WWANs, IETF defined Point-to-Point Protocol (PPP) can be used for the framing of Application IP Packets at the AT 102 and the PDSN 108. Such PPP frames are encapsulated in the CDMA radio link specific RLP layer for transmission over the radio traffic channel. The AT 102 and the BTS 104 perform RLP encapsulation. IETF PPP-over-HDLC (PPPoHDLC) protocol is used as a shim-layer for the encapsulation of PPP frames in the RLP frames.

Notably, the PPP protocol can be used for the framing of Application IP packets, and PPPoHDLC protocol can be used as the shim-layer for encapsulation of PPP frames for transmission over the CDMA radio link of WWAN 100. The AT 102 and the PDSN 108 are the peer entities providing PPP and PPPoHDLC protocol functions.

FIG. 15 shows an exemplary protocol implementation at various functional entities in the WWAN 100 network. After the radio traffic channel has been established, the PDSN initiates establishment of the PPP link with the AT by the use of LCP/NCP negotiation procedures as defined in related IETF RFCs. On successful establishment of the PPP link between the AT and the PDSN, the PDSN Challenges the AT User to identify itself. Such challenge procedures are termed as authentication procedures. In one embodiment of the CDMA WWANs, user authentication can be performed by the use of CHAP/PAP protocols as defined in related IETF RFCs. When asked to provide its identity, the user at the AT can provide identification to CHAP/PAP protocol and passes its identifying information to the PDSN over the PPP link. The PDSN 108 provides protocol conversion functions to repackage the authentication related information in IETF RADIUS protocol and forwards such information in RADIUS message(s) to the Home AAA 302 located in User's home WSP Data Center+Central Office 300. The Home AAA authenticates the User based on information stored in the Provisioning System 304. Successful user authentication results in the Provisioning System 304 returning User's subscribed profile (authorization information) to the Home AAA, for onward transmission to the PDSN 108. For pre-paid users, the authentication process may include verification of users account balance etc. also, and such information may be homed in the Provisioning System 304 or the Billing System 306. In some implementations, the RADIUS message exchange between the Home AAA 302 and the PDSN 108 could be via the Local AAA located in the WWAN network.

Assignment of an IP address to the user at the AT can be implemented in various configurations. In one implementation, for Simple IP services, the IP address assignment may be performed from the pool of IP addresses maintained in the domain of the Local AAA in WWAN 100 network. Such address assignment can be done as part of the IPCP negotiation procedures during setup of the PPP connection. Once the user is authenticated and authorized, the AT and the PDSN are ready for the bi-directional exchange of Application IP packets over the PPP link. Such PPP link establishment and user authentication and authorization functions etc. are illustrated by step (i) in the call logic flow of FIG. 14.

For Mobile IP services, the Foreign Agent function in the PDSN sends an Agent Advertisement message as per the IETF MIP RFCs, to the AT over the just established PPP connection. Such Agent Advertisement message may contain further Challenge information to ensure security of services. In response, the user at the AT sends MIP Registration Request message to the FA. MIP Registration Request message from the user at the AT may include challenge response information also, as may be required. The FA in the WWAN 100 network and the Home Agent 402 in user's home network perform necessary MIP message exchange and actions for authenticating the user and assigning a Home IP Address to the user at the AT. In one embodiment of the implementation, such Home IP Address is assigned from the pool of the IP addresses maintained in the domain of the Home AAA.

The assigned IP address is used by the user Application for communicating with the peer user. Notably, the user application can continue without being interrupted as long as the assigned IP address is maintained. For Simple IP services, the assigned address is from the domain of the PDSN 108 in the WWAN network where the user session was initiated. Hence, mobility for Simple IP services is limited to the WWAN coverage area of such PDSN. For Mobile IP services, the assigned IP address is from the domain of the Home AAA. Hence, the domain of mobility for Mobile IP services is much larger, as long as the FA located in the currently serving PDSN 108 is able to route the IP packets to the Home Agent.

Once the user has been authenticated, authorized and an IP address has been assigned, the user application is ready to be launched. For providing packet data services on the uplink, the PDSN routes Application related IP Packets to the remote peer-User based on the destination IP address contained in the IP packets received from the user at the AT, thereby enabling peer-to-peer communication between the AT and the remote user over the Internet 400. On the downlink, the PDSN maps the destination IP address (address assigned to the user at the AT) to an RP Connection and forwards the IP packet to the serving BSC/PCF 106. The BSC/PCF maps the RP Connection to the radio Traffic Channel for delivering the IP packet to the user at the AT. Such peer-to-peer IP communication is illustrated by packet-flow 110 in FIG. 13. The PDSN keeps track of user bi-directional IP packet/byte count also. This information, coupled with the information in airlink records received from the BSC/PCF 106 is used for the generation of User Data Records (UDRs). The PDSN forwards such UDRs to the Home AAA 302 at defined trigger-events, which in turn passes the information to the Billing System 306.

Parallel to the deployments of WWANs, wireless local area networks (WLAN) are becoming increasingly popular for wireless data applications. In such networks, reasonable bandwidth is available to enterprise-wide wireless clients, or in hot spots e.g., by the use of IEEE 802.11 based WLANs. High wireless bandwidth provided by WLANs at reasonable cost is driving up the use of this technology for wirelessly accessing the Internet.

Figure 16:
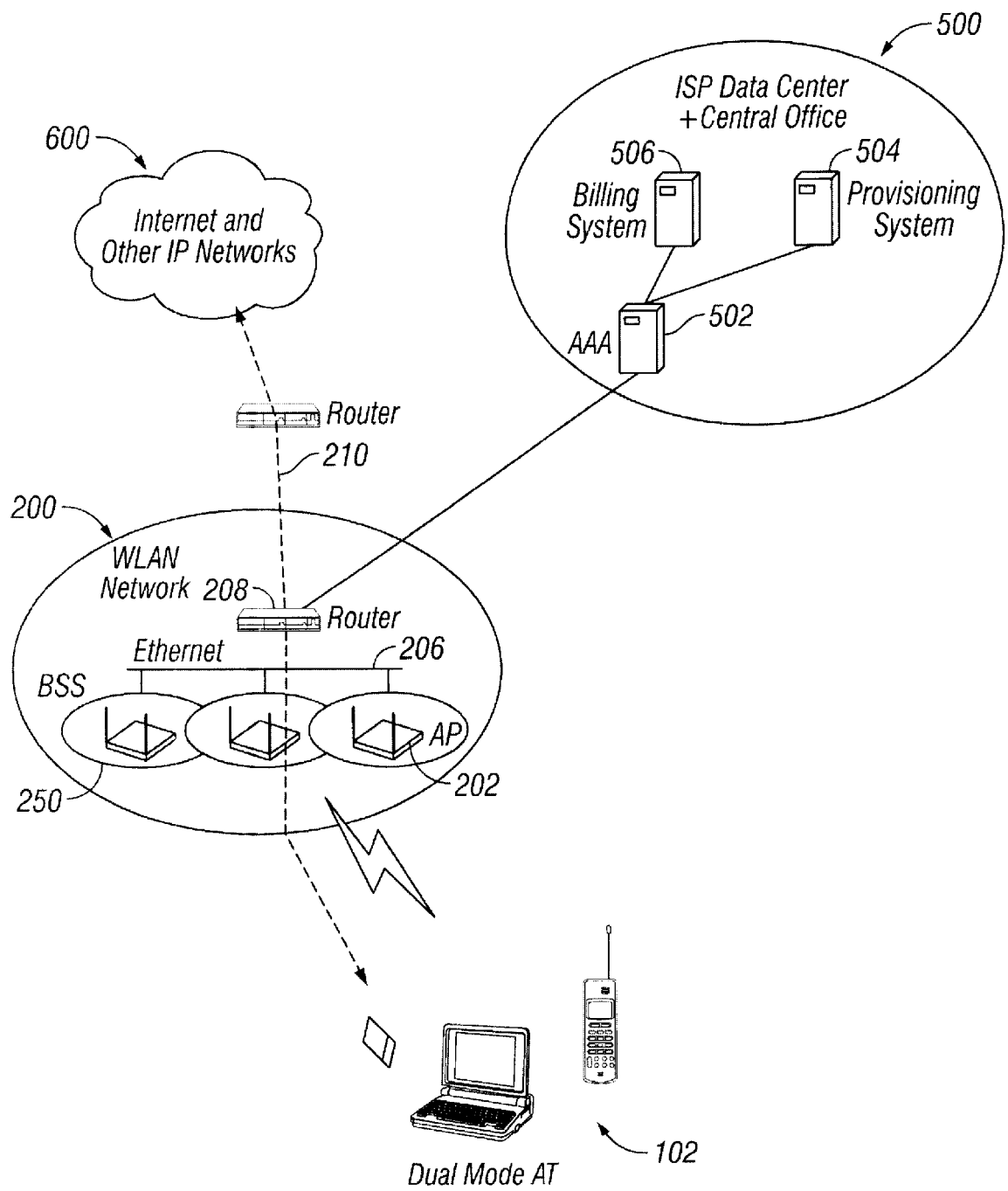
FIG. 16 shows an example of an IEEE 802.11 based Wireless-LAN (WLAN) wireless data communications environment.

FIG. 16 is an illustration of an exemplary architecture of a wireless local are network (WLAN 200) based on IEEE 802.11 specifications. In one implementation of the WLAN 200 as in this illustration, the PHYsical layer and the MAC layer implementations are based on the specification defined by IEEE 802.11 standards committee and the WLAN 200 includes a plurality of geographic areas (cells) called Basic Service Set (BSS) 250. A cell is controlled by a system called an Access Point 202. Typically a WLAN includes a plurality of BSSs, each with its associated AP. The APs are interconnected usually with a wireline network 206 typically using Ethernet in 802.x technologies. The APs communicate with an enterprise Router 208 that typically routes traffic within and out of the enterprise-network/hot-spot 200. The wireless data clients (ATs) 102 may send and receive communication signals to the APs over electromagnetic waves in the air, e.g., WLAN radio links. Air links for the WLAN are generally different from the air links for the WWAN. Hence for communications with the 802.11 WLAN only, it would be sufficient for the AT 102 to provide only a single network access adaptor or access port that is capable of communicating over the WLAN air link. Such ATs 102 are allowed to roam within a defined BSS and across the BSSs 250 with handoff of AT from one AP to the adjoining AP in accordance with the known procedures.

The WLAN system 200 in FIG. 4 connects to an IP network such as a private IP Network or Public Internet 600. The enterprise Router 208 forms the demarcation point between the WLAN 200 and the IP Network 600. The Router 208 provides connectivity to the Internet Service Provider (ISP) Data Center+Central Office 500 also. Typically a plurality of WLANs 200 connect to ISP Data Center+Central Office 500, and connectivity between the WLANs and the ISP Data Center+Central Office may be provided over private or public Internet.

The ISP Data Center 500 can manage AT user authentication, authorization and possibly accounting functions. Various known accounting capabilities for WLAN networks are rather limited to the airlink connection time only.

Various deployed WLANs provide only Simple IP type of services to the users at the ATs. Simple IP services are limited to the geographic coverage area of an enterprise-wide/hot-spots 200. Typically this coverage area would be of the order of a few hundred square yards; compared to city-wide or even nation wide coverage provided by WWANs 100 illustrated in FIG. 13.

Figure 17:
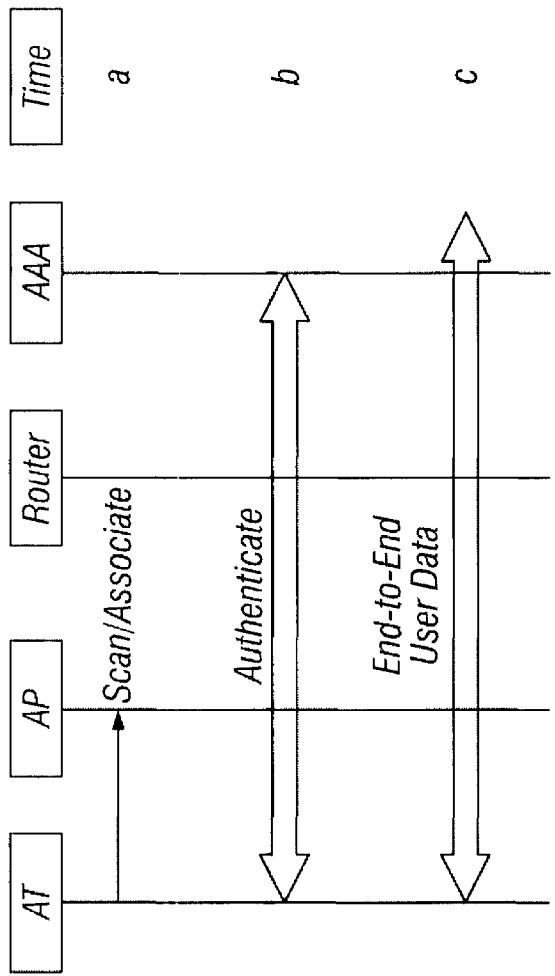
FIG. 17 shows an example of the WLAN call setup logic for the WLAN system shown in FIG. 16.
Figure 18:
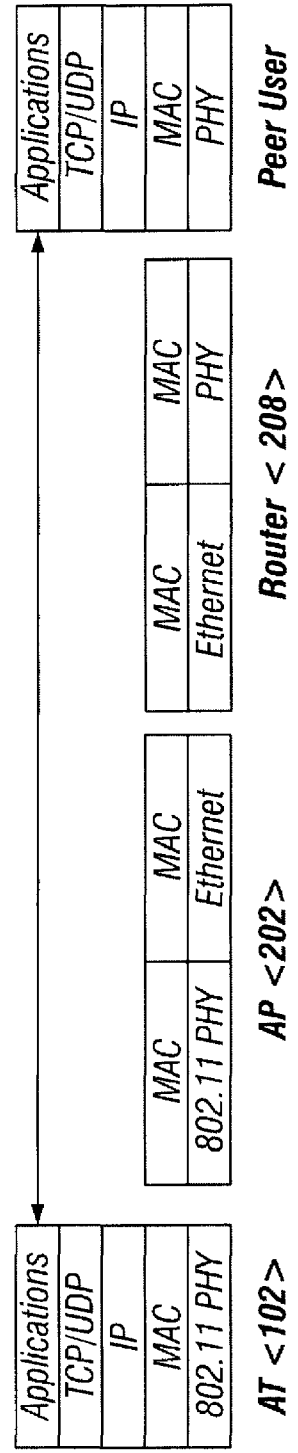
FIG. 18 illustrates an example of a Protocol Stack implementation at various functional entities for the WLAN system shown in FIG. 16.

FIG. 17 shows an example of the call setup logic. In this example, the AT needs to get synchronization information from the AP controlling the BSS to access services from the WLAN network (either on power up or when entering the serving area of a BSS). The AT uses WLAN specific adaptor or the access port for scanning the radio signals from the APs. WLAN protocol layer functions may be implemented in the hardware devices and software logic at the AT and the AP. The radio link specific WLAN network adaptor or access port functions of the AT are characterized by the lowest two layers of the AT Protocol Stack shown in FIG. 18 (PHY layer and the MAC layer). On successful scan and synchronization with the AP's radio link, the AT associates with the AP. The signaling logic for the scanning and association between the AT and the AP are illustrated by step (a) in FIG. 17. Once the AT synchronizes and Associates with an AP, the user needs to be authenticated before being able to access services via the IP Network 600. One approach for such authentication uses IEEE 802.1x specified procedures, wherein the AP acts as the Authenticator, AT is the Supplicant and the AAA Server 502 in the ISP Data Center 500 provides Authentication Server functions. The AP challenges the user, and the user provides its identity to the AP. The AP, in turn encapsulates such information in RADIUS messages for onward transmission to the Authentication Server AAA 502. In one implementation, the AAA 502 authenticates the User based on the information stored in the Provisioning System 504. Successful user authentication results in the Provisioning System 504 returning User's subscribed profile (authorization information) to the Home AAA, for onward transmission to the AP 202. Such authorization information may include security keys for secure communications over the WLAN airlink. Successful authentication also results in an IP address being allocated to the User at the AT. In one implementation, such IP address allocation is from the IP Address domain of the enterprise Router 208. Successful authorization may also result in the Provisioning System 504 communicating with the Billing System 506 for providing airlink connection time based prepaid billing services to the User. The signaling logic for the 802.1x based authentication and authorization of the AT users is illustrated by step (b) in FIG. 17.

Once the user has been authenticated, authorized and an IP address has been assigned, the user application is ready to be launched. The enterprise Router 208 routes Application related IP packets between the AT and the remote peer-User based on the destination IP address contained in the IP packets, thereby enabling peer-to-peer communications between the AT and the remote user over the Internet 600. Such peer-to-peer IP communication is illustrated by packet-flow 210 in FIG. 16.

The interworking between the WWANs and WLANs described in this application be used to effectively unify these two disparate technologies. Consequently the users are able to roam between the coverage areas of WWANs and WLANs with seamless continuity of user sessions. As will be explained below, an AP Gateway function (APGW) of the WLAN network, and with some associated modifications to the PDSN of the WWAN network, may be configured to provide the logic for this interworking.

In one implementation, AT user initiates a packet data session either in the WWAN 100 network or in the WLAN 200 network. AT user can then roam freely within and across the WWAN and WLAN networks without disruption to the ongoing packet data sessions and without any manual intervention required from the subscriber. Both Simple IP and Mobile IP services, as provided by the WWAN network, can be supported while accessing wireless services from the interworked WLAN network as well. Simple IP and Mobile IP services can be provided by the WWAN network shown in FIG. 13. With this interworking model, the users need only a single subscription with WWAN Wireless Service Provider (WSP) and obtain authentication, authorization, security and common accounting and billing support of WWAN WSP even when accessing wireless services from the interworked WLAN. In addition, any value added IP services provided by the WWAN network, such as location and presence aware services, or IMS services etc., are accessible from the interworked WLAN as well.

Figure 19:
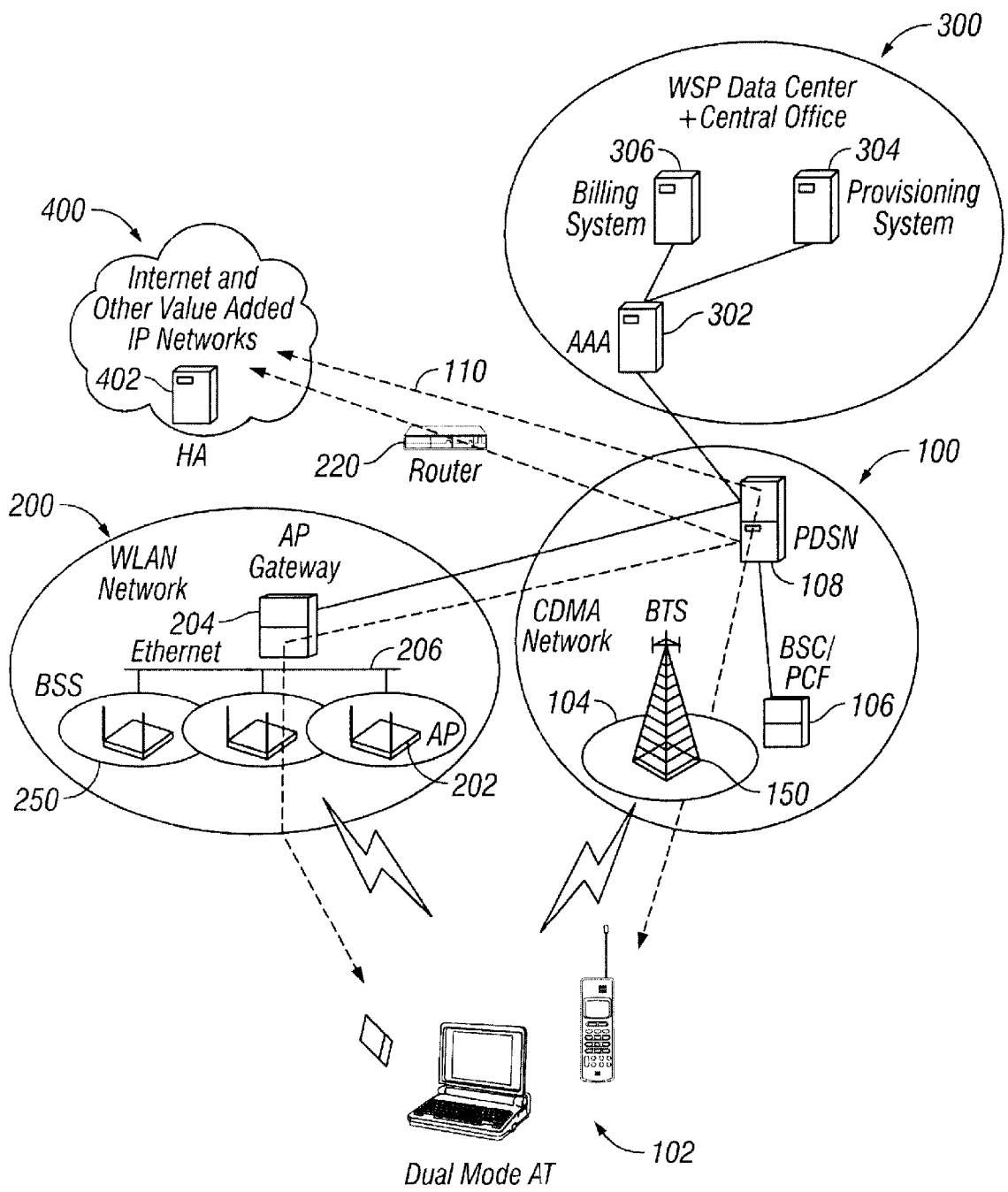
FIG. 19 shows an example of interworking between the WWAN and WLAN networks that effectively unifies these two disparate technologies.

FIG. 19 illustrates one example of a WWAN and a WLAN that are interworked. Various features and components of this WWAN network described in conjunction with FIG. 13. The PDSN 108 in FIG. 19 includes additional interworking logic to handle the interworking of the WWAN and the WLAN as a macro network under the interworking design in FIG. 19. The WLAN network now includes a new functional entity called the AP Gateway (APGW) 204 that includes logic to enhance the functionality provided by the enterprise Router 208 in the WLAN network depicted in FIG. 16. The new PDSN interworking logic and the capabilities and functions provided by the APGW are detailed in the following sections.

The WWAN and the WLAN can be effectively connected over public or private IP networks via an IP interface between their respective demarcations points viz. the PDSN 108 and the APGW 204. This link between the PDSN and the APGW is analogous to the RP Connection between the BSC/PCF and PDSN entities of the WWAN 100 network. This link between the PDSN 108 and the APGW 204 is called the AP Connection in this application. In certain implementations, the methods and signaling for managing the AP Connection may be similar to the A10/A11 signaling procedures used for managing the RP Connection, with additional or different Information Elements (IEs) described as part of the present invention. Some additional IEs are also used over the AP Connection for the proper accounting of the usage of network resources while accessing wireless services from the WLAN network. IP traffic to and from the AT users over the WLAN network, along with the associated signaling and control messages are now carried over the AP Connection. Other WLAN components in the WLAN 200 network are not changed, and are like those described in conjunction with FIG. 16, except that the ATs 102 for wireless access of WLAN and WWAN networks includes two network adaptors or two access ports, along with some enhanced interworking logic, as will be explained below.

The link layer encapsulation between the AT and the PDSN can be made via a PPP connection. In one implementation, PPPoE framework as described in IETF RFC 2516 can be used to facilitate PPP encapsulation while accessing services from the interworked WLANs. The AP Gateway (APGW) 204 provides the Access Concentrator functions for PPPoE procedures. The AP 202 forwards PPPoE frames transparently between the AT and the APGW.

Figure 20:
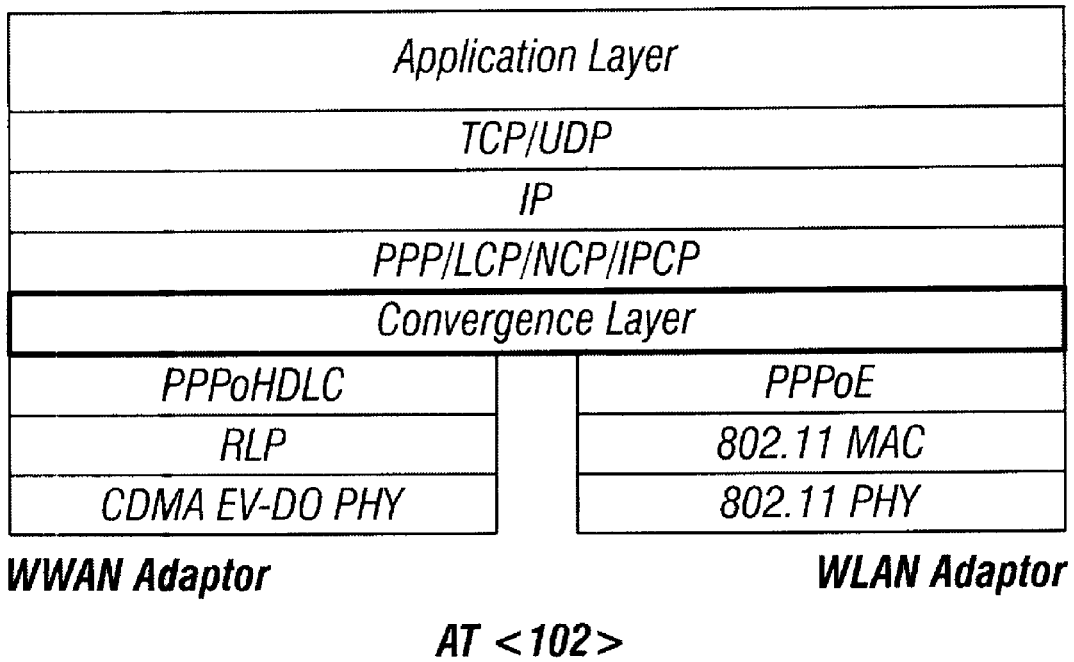
FIG. 20 shows an example of the Protocol Stack implementation at the AT for the interworked system shown in FIG. 19.

WWAN and WLAN interworking in certain implementations can be facilitated by using dual-mode ATs 102 that may operate in WWAN or WLAN environment. FIG. 20 shows an example of the control structure for a dual-mode AT 102. The AT supports two network adaptors or access ports, and at any time would automatically be capable of accessing the CDMA WWAN radio network or the 802.11 WLAN radio network. The AT may select to use one of the air interface adaptors, based on its sensing of relevant radio spectrum, and any other selection criterion. If desirable, the capability to perform PPPoHDLC or PPPoE protocol framing over the respective wireless network adaptor can be provided.

The radio link specific WWAN network access adaptor or access port functions can be provided by the lowest two layers viz. CDMA PHY and RLP. PPPoHDLC protocol provides for the framing of the link layer PPP frames over the WWAN adaptor. Also, the radio link specific WLAN network access adaptor or access port functions can be provided by the lowest two layers viz. 801.11 PHY and MAC. In one implementation, the PPPoE protocol is used for the framing of the upper layer PPP frames for transmission over the WLAN adaptor MAC and PHY. Also, the Convergence Layer logic in the AT can route PPP framed Application IP packets to the wireless network adaptor or access port that has been selected.

Figure 21:
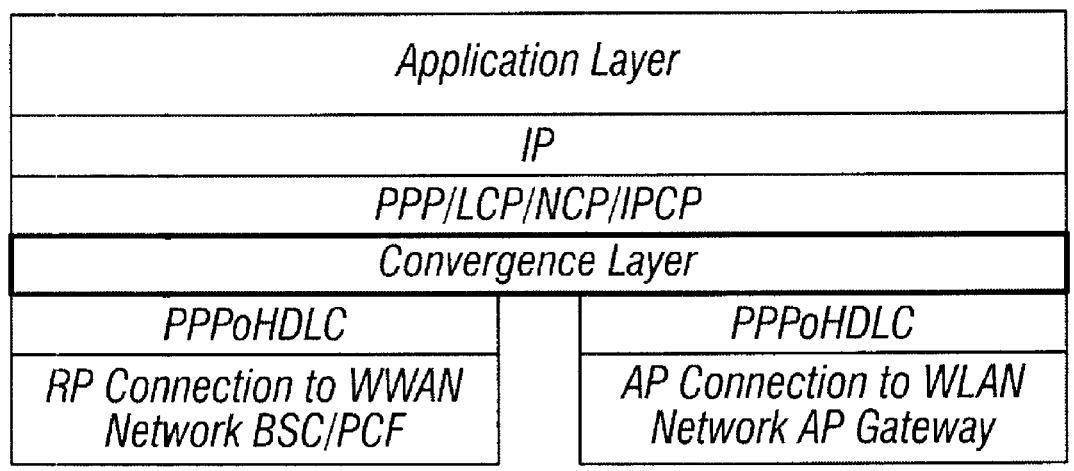
FIG. 21 shows an example of the Protocol Stack implementation at the PDSN for the interworked system shown in FIG. 19.

FIG. 21 shows an example of the protocol stack at the PDSN 106. The PDSN supports signaling and data transport links from both the WWAN and WLAN networks. The RP Connection can be the link to the BSC/PCF entity in the WWAN network. In one implementation, the new AP Connection to the APGW sitting at the edge of the WLAN network, is the link that supports signaling and data transport for the WLAN network. Based on the selection criterion embedded in the new Convergence Layer logic, the PDSN selects the appropriate lower layer RP Connection or the AP Connection for the transport of data frames to either the WWAN or the WLAN.

Figure 22:
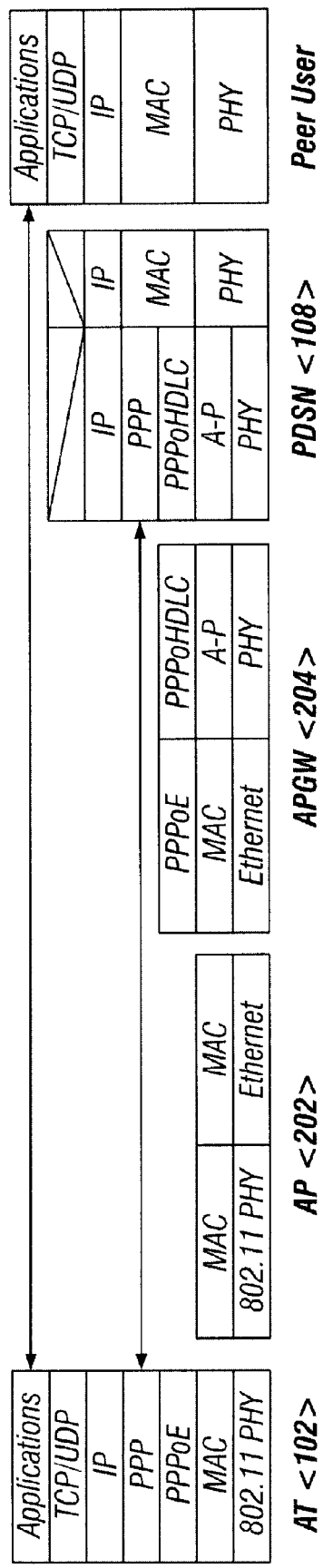
FIG. 22 shows an example of the Protocol Stack implementation at various functional entities for the interworked system shown in FIG. 19.

FIG. 22 illustrates another example of the protocol stack at various functional entities in the interworked WLAN network as shown in FIG. 19. The APGW 204 supports two protocol stacks, one for communications with the AT on the downlink and another for communications with the PDSN on the uplink. Downlink communications with the AT uses PPPoE as the protocol for framing of user IP data packets embedded in the PPP frames. Uplink communications with the PDSN uses PPPoHDLC as the framing for the user IP data packets embedded in the PPP frames. The APGW maintains a dynamic database with mapping information for each PPPoE and PPPoHDLC connection. This allows for the mapping of the PPPoE framed packets received from the AT via the WLAN APs 202 and the forwarding of the received packets to the PDSN over the AP connection with framing changed to PPPoHDLC and vice versa. In one implementation, the APGW database includes identifiers such as the identifying information of the AT, the PPPoE Session Identifier, PDSN Session Identifier, PDSN IP address etc.

Figure 23:
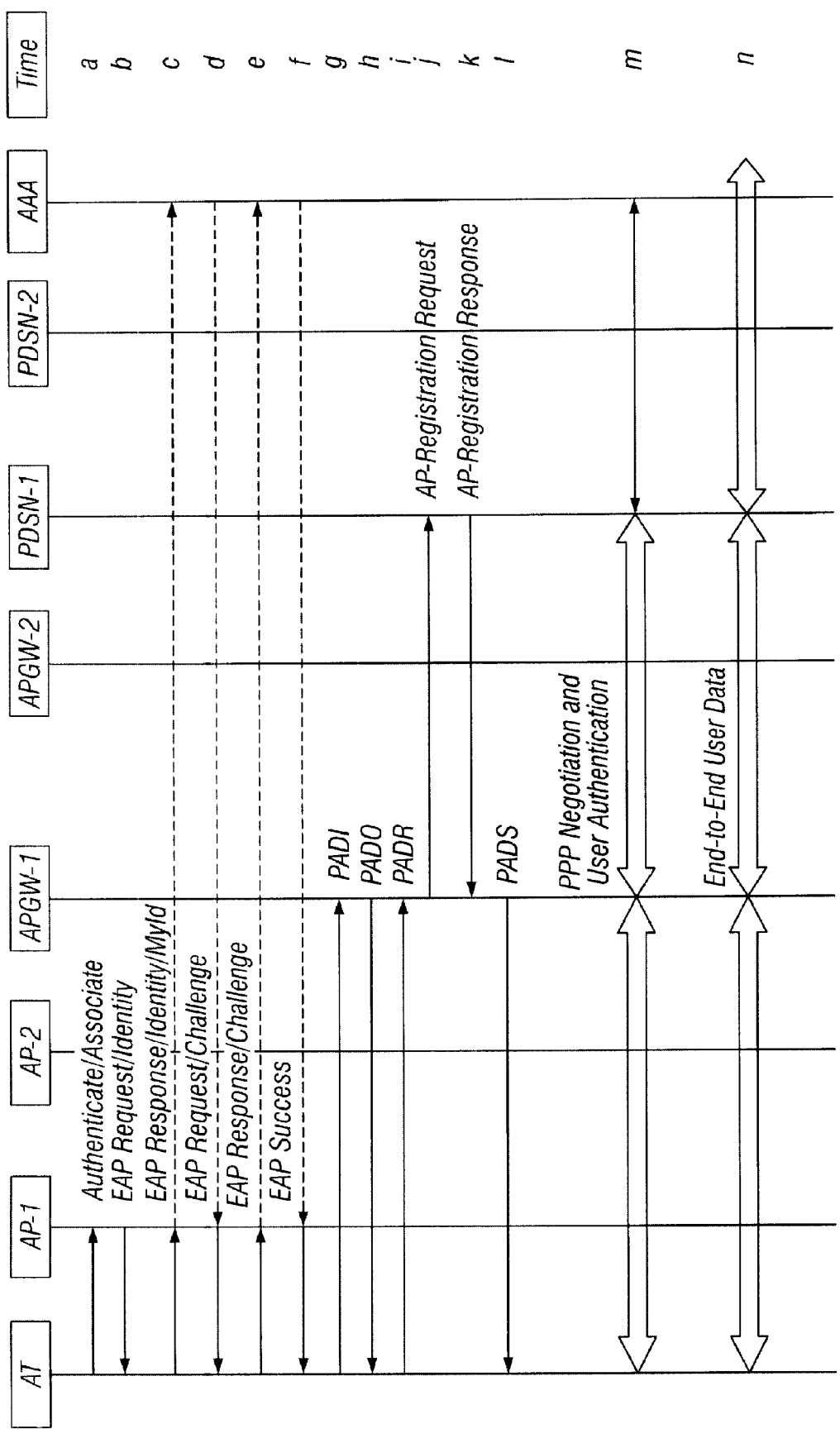
FIG. 23 shows an example of packet data call setup logic in the WLAN system according to this invention, for the interworked system shown in FIG. 19.

FIG. 23 shows an example of the logic for the setup of a packet data call initiated in an interworked WLAN network. The AT can infer the presence of a WLAN network by detecting radio signal energy in the spectrum permitted by 802.11 specifications. After successful radio energy detection, the AT can detect if a valid WLAN is present. The WLAN adaptor in the AT scans the radio link by active or passive scanning procedures, and on successful scan the AT acquires the SSID that identifies the AP 202 transmitting the 802.11 radio signals. The AT compares the SSID with a list of configured SSIDs, and if there is a match, infers that the WLAN 200 is valid network to gain access to. On SSID match, the AT goes through an authentication process. If the authentication succeeds, the AT proceeds with Association process, whereby the AT joins the WLAN network as a valid client node. The signaling logic for the scanning, authentication and association between the AT and the AP are illustrated by step (a) in FIG. 23.

In one implementation, the AT 102 can be implemented as a priori provisioned with a valid list of SSIDs and SSID ranges. The SSID comparison avoids the AT from entering into authentication and association processes in unauthorized WLAN networks in which it could never be authenticated. Such provisioning of authorized SSIDs could be done by well known methods such as by using over the air provisioning procedures (OTASP/OTASPA) or CDMA Short Message Service etc.

Once the AT synchronizes and associates with an AP, the user needs to be authenticated before being able to access services via the IP Network 400. In case so configured, one approach for such authentication uses the 802.1x specified procedures, as was illustrated in the description of the WLANs shown in FIGS. 16, 17 and 18. In that approach, the AP acts as an authenticator. AT is the Supplicant and the AAA Server 302 in the WSP Data Center 300 provides Authentication Server functions. As may be noted here, the WSP Data Center 300 provides authentication, authorization and accounting services for access from both the WWANs and the WLANs. The AP challenges the user, and the user provides its identity to the AP. The AP, in turn encapsulates such information in RADIUS messages for onward transmission to the Authentication Server AAA 302. In one embodiment of the implementation, the AAA 302 authenticates the user based on the information stored in the Provisioning System 304. Successful user authentication results in the Provisioning System 304 returning User's subscribed profile (authorization information) to the Home AAA 302 for onward transmission to the AP 202. Typically authorization information would include security keys for secure communications over the WLAN airlink. The signaling logic for the 802.1x based authentication and authorization of the AT uses is illustrated by steps (b-f) in FIG. 23.

The 802.11 airlink, when being established between the AT and the AP, may not be ready for the bi-directional transport of IP packets related to the Applications running at the AT and the Peer User device. In one implementation of the CDMA WWANs, IETF defined PPP protocol is used for the framing of Application IP Packets between the AT and the PDSN. For the interworked WLANs of this invention, a similar PPP link is needed for the framing of Application IP packets between the AT and the PDSN. Unlike the dedicated Traffic Channel of the CDMA wireless airlink and the associated RP connection between the BSC/PCF 104 and the PDSN 106, the 802.11 wireless airlink is contention based and does not provide point-to-point connectivity between the AT and the PDSN. PPPoE protocol procedures between the AT and the APGW, and the AP Connection setup procedures between the APGW and the PDSN as described below, provide for such point-to-point connectivity between the AT 102 and the PDSN 106 via the APGW 204 over the 802.11 based WLAN 200.

The Convergence Layer of the dual-mode AT 102 illustrated in FIG. 20 can be used to initiate the PPPoE procedures with the APGW upon detection of successful acquisition of the WLAN airlink and successful Association with an AP 202, and, if so configured, upon successful 802.1x based authentication. PPPoE procedures between the AP and APGW consist of Discovery and Session states. As an exemplary implementation, the AT broadcasts PPPoE Initiation (PADI) packets as part of the Discovery state. The AP forwards this packet to the connected APGW which serves as the PPPoE Access Concentrator. The APGW responds with a PPPoE Offer packet (PADO) which is forwarded by the AP to the AT. The PADO packet includes the address of the APGW by which the APGW can be reached on link 206. The AT now sends a unicast Session Request (PADR) packet to the APGW. This Request message includes AT's identifying information, which the APGW uses to build its dynamic database for the appropriate mapping of the user packets between the AT and the PDSN. On receipt of the PADR packet, the APGW selects a PDSN, if so required, and initiates AP Connection setup procedures with the selected PDSN. AP Connection setup procedures use signaling similar to the signaling procedures for RP Connection setup, and result in the APGW sending an AP-Registration Request message to the selected PDSN. As per one embodiment of this invention, the APGW passes AT's identifying information within a Session Specific Extension of the AP-Registration Message to the PDSN, whereby the Convergence Layer logic in the PDSN (FIG. 16) could forward user packets to the appropriate AT.

In another implementation, the Protocol Type filed in the above stated Session Specific Extension can be set to a unique value, whereby the PDSN knows if the underlying connection relates to an AP Connection or an RP Connection and enables the Convergence Layer logic in the PDSN to forward the user packets to the WLAN or the WWAN, as appropriate. As part of AP Connection setup procedures, the APGW and the PDSN exchange their respective PPPoE Session Identifier and PDSN Session Identifier information also. This information gets stored in the APGW dynamic database as well for the appropriate mapping of the user packets on the APGW uplink and downlink. On successful establishment of the AP Connection, the APGW responds to the AT with PPPoE Confirmation (PADS) packet that includes the PPPoE Session Identifier information. This allows the AT to map user PPP frames to the appropriate PPPoE connection. The PPPoE signaling logic between the AT and the APGW, and the AP Connection setup logic between the APGW and the PDSN are illustrated by steps (g-l) in FIG. 23. This message exchange between the AT, the APGW and the PDSN marks successful completion of PPPoE Discovery procedure.

The following describes enhanced accounting capabilities while accessing services from the interworked WLAN network. On successful setup of the AP connection, the APGW sends AP Connection Setup WLANlink Record and Active Start WLANlink Record to the PDSN. In one exemplary implementation, the AP Connection Setup WLANlink Record contains information that includes AT's Identity. The Active Start WLANlink Record contains information such as SSID, BSSID etc. of the AP 202 that is providing WLAN access to the AT. Once the WLAN airlink is lost and the AT Associates with another AP, the APGW sends and Active Stop WLANlink Record identifying the previous AP with which the WLAN airlink has been lost, followed by an Active Start WLANlink Record identifying the newly Associated AP. As described later, this information coupled with the uplink and downlink packet count information processed by the PDSN provides enhanced accounting capabilities for the interworked WLAN access.

Once the AP Connection has been established, the PDSN initiates establishment of the PPP link with the AT connected to the WLAN network by using LCP/NCP negotiation procedures. PPP packets sent by the PDSN over the AP Connection use PPPoHDLC framing. The APGW transparently maps the PPPoHDLC mapped PPP frames received from the PDSN to PPPoE framed PPP frames towards the AT, and vice versa. The APGW performs such mapping based on the PPPoE Session Identifier and the PDSN Session Identifier maintained in its dynamic database.

Similar to the call setup signaling logic of FIG. 14, the PDSN Challenges the AT User to identify itself. The PDSN proposes CHAP/PAP authentication to the AT during LCP configuration phase. Depending on the authentication option acceptable to the user at the AT, the PDSN receives the identifying information from the AT. The PDSN 108 performs protocol conversion functions to repackage the authentication related information in IETF RADIUS protocol, and forwards such information in RADIUS message(s) to the Home AAA 302 located in User's home WSP Data Center+Central Office 300. From here onwards, authentication and authorization procedures between the PDSN 108 and various entities in the WSP Data Center 300 are similar to the authentication and authorization procedures between an AT accessing a WWAN network and establishing a packet data call, and detailed in the descriptions of the signaling logic in FIG. 14. Such authentication and authorization via WSP Data Center 300 allows both the pre-paid and post-paid accounting for the AT accessing services from the WLAN access as well. Another function performed at this stage relates to the assignment of an IP address to the user at the AT. Similar to the WWAN access illustration in FIG. 14, for Simple IP services, such address assignment may be performed from the pool of addresses maintained in the domain of the Local AAA in the WWAN 100 network. Such address assignment is done as part of the IPCP negotiation procedures during setup of the PPP connection. Once the user is authenticated and authorized, the AT and the PDSN are ready for the bi-directional exchange of Application IP packets over the PPP link. Such PPP link establishment and user authentication and authorization functions etc. are illustrated by step (m) in the call logic flow of FIG. 23.

Mobile IP procedures can be made similar to the procedures in FIG. 14. In one implementation, successful execution of Mobile IP procedures result in a Home IP Address being assigned to the AT users from the pool of IP addresses maintained in the domain of Home AAA. MIP signaling and associated message exchange takes place over the just established PPP connection and is illustrated by step (n) in FIG. 23.

In one implementation, the assigned IP address can be used by the user Application for communicating with the peer user. Notably, the user application can continue without being interrupted as long as the assigned IP address is maintained. For Simple IP services, the assigned address is from the domain of the PDSN 108 in the WWAN network where the user session is initiated. In the embodiment of prior-art WLAN network as described in relation to discussion on FIG. 16, such mobility had been limited to the domain of the enterprise Router 208 only. The typical coverage area of an enterprise Router 208 would be of the order of a few hundred square yards compared to a much larger metropolitan coverage area of a PDSN 106 for this interworked WLAN. For Mobile IP services, the assigned IP address is from the domain of the Home AAA. Hence, the domain of mobility for Mobile IP services is much larger as long as the FA located in the currently serving PDSN 108 is able to route the IP packets to the Home Agent.

Once the user has been authenticated, authorized and an IP address has been assigned, the user application is ready to be launched. On the uplink, the APGW forwards PPPoE framed PPP frames containing Application IP Packets received from the AT to the PDSN over the AP connection. Based on the information in the dynamic database, the APGW performs mapping from PPPoE framing to PPPoHDLC framing before forwarding PPP frames over the appropriate AP Connection. The PDSN routes Application related IP Packets to the remote peer-User based on the destination IP address contained in the IP packets received from the user at the AT, thereby enabling peer-to-peer communication between the AT and the remote user over the Internet 400. On the downlink, the PDSN maps the destination IP address (address assigned to the user at the AT) to an AP Connection and forwards the PPPoHDLC framed PPPP frame containing Application IP Packet to the APGW. Based on the information in the dynamic database, the APGW performs mapping from PPPoHDLC framing to PPPoE framing before forwarding PPP frames to the appropriate AT.

Such peer-to-peer IP communication is illustrated by packet-flow 220 in FIG. 19. The PDSN keeps track of user bi-directional IP packet/byte count also. This information, coupled with the information in WLAN Airlink Records received from the APGW 204 is used for the generation of User Data Records (UDRs). The PDSN forwards such UDRs to the Home AAA 302 at defined trigger-events, which in turn passes the information to the Billing System 306.

FIGS. 24 through 30 are exemplary illustrations of signaling logic resulting from the handover of packet data calls due to the mobility to the AT in the interworked WWANs and WLANs. Signaling logic relating to handovers resulting from mobility of the AT within the WWAN network can be implemented in various configurations, including some known procedures from CDMA WWAN specifications.

Figure 24:
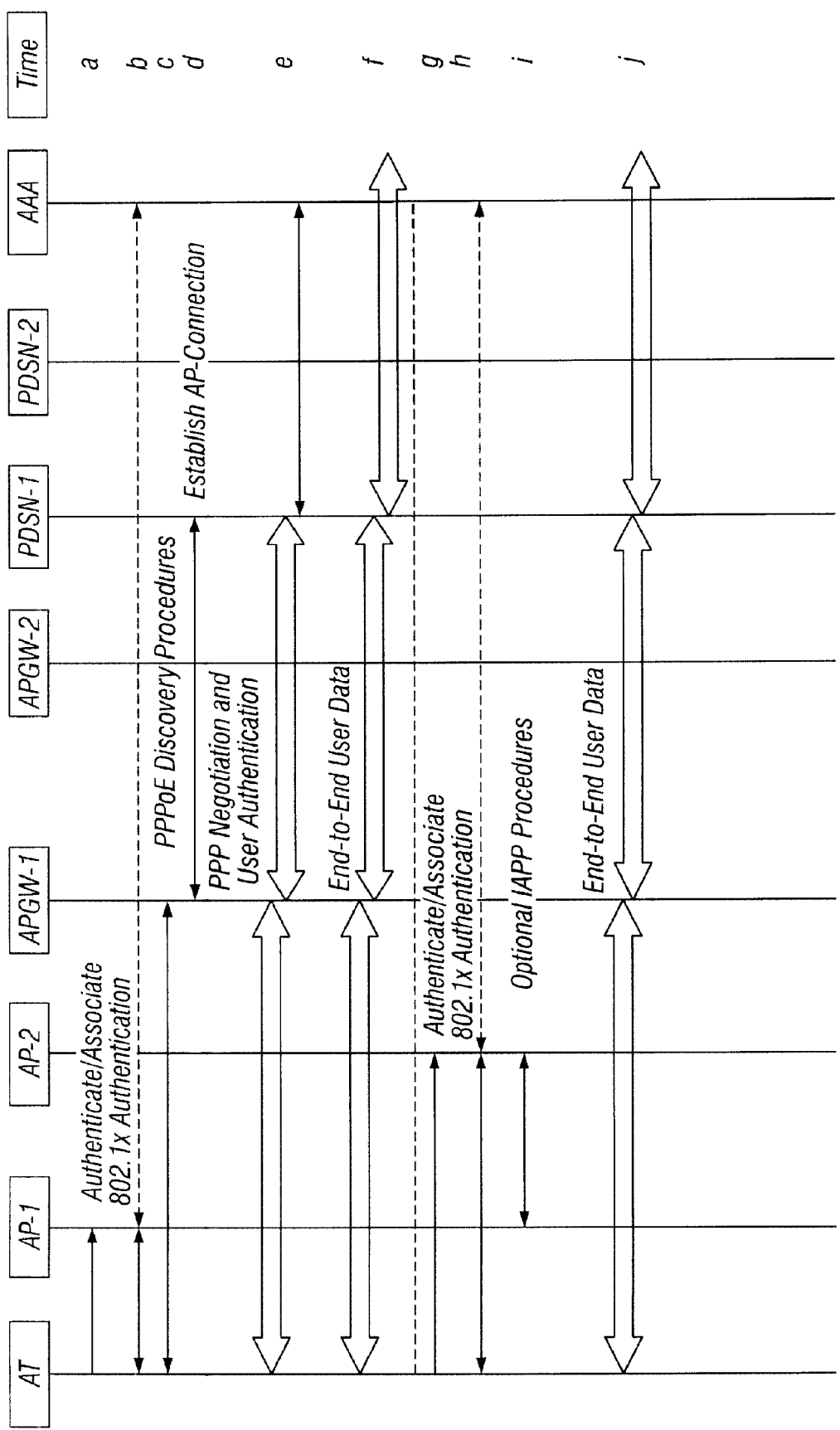
FIGS. 24 through 30 show examples of the signaling logic resulting from the handover of packet data calls between the interworked WWAN and WLAN communication networks shown in FIG. 19.

FIG. 24 illustrates an example of the signaling logic for handover of a call from AP-1 with which the AT is currently Associated, to another AP-2 within the same WLAN network 200. AP-2 202 connects to the same APGW 204 with which AP-1 has been connected. Once the AT Associates with the AP-2 and IEEE 802.1x based authentication has been completed, if so configured, the call continues over the existing PPPoE and PPP connections. The logic relating to the Optional IAPP procedures illustrated at step (i) in FIG. 24 relates to the IAPP specifications developed by IEEE 802.11 standards organization.

Figure 25:
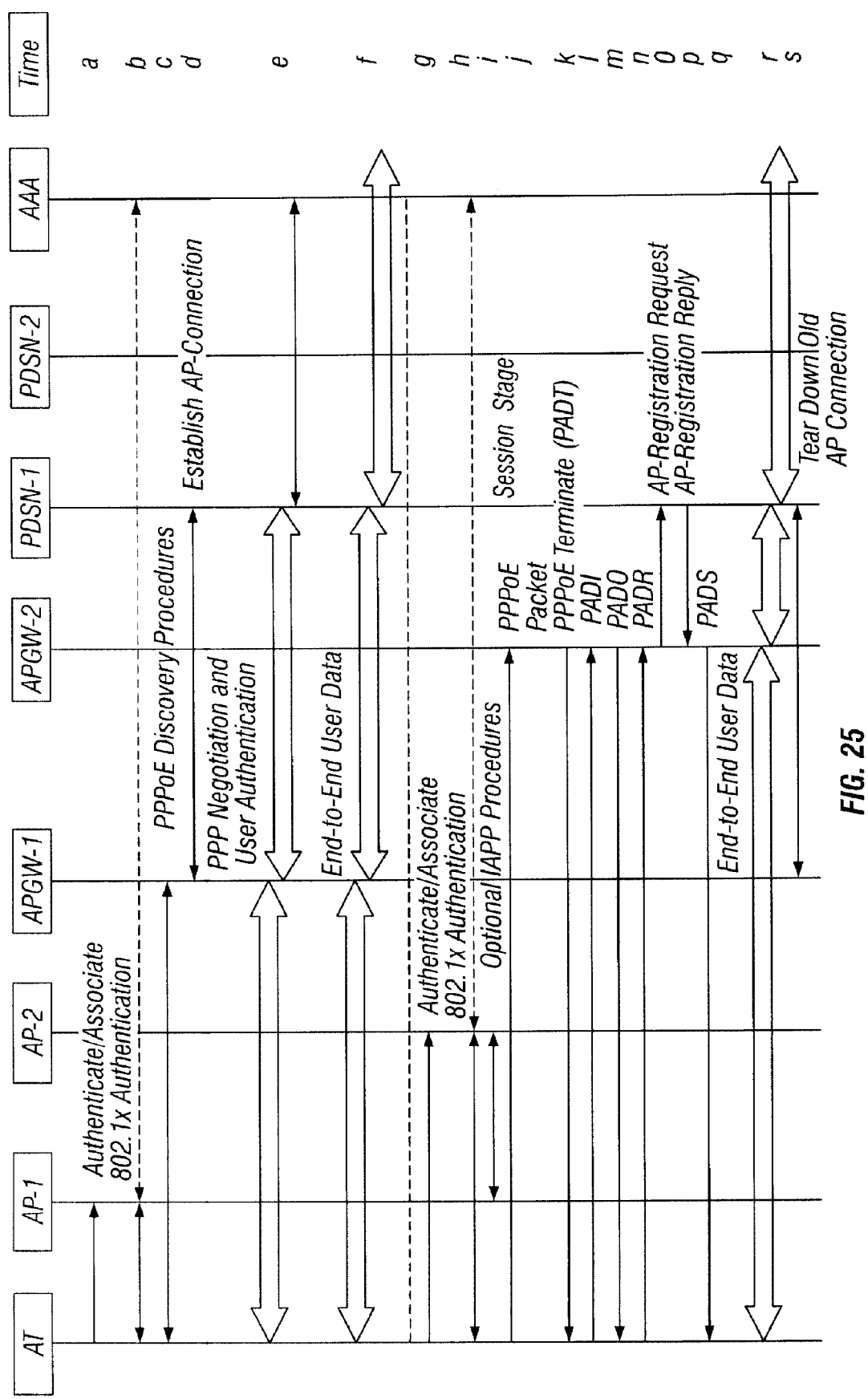

FIG. 25 illustrates an example of the signaling logic for handover of a call from AP-1 with which the AT is currently associated, to another AP-2 within the same WLAN network 200. AP-2 202 now connects to a different APGW-2 204. Resulting from Association with AP-2, the PPPoE framed user packets arrive at APGW-2 which has no knowledge about this call. This results in APGW-2 sending a PADT (PPPoE Terminate) packet to the AT. The AT now initiates PPPoE Discovery procedures with APGW-2. This results in setting up of new AP Connection between APGW-2 and the PDSN. The PPP session at the PDSN is maintained and the call continues over this PPP connection. In time, the PDSN terminates the old AP Connection with the APGW-1.

Figure 26:
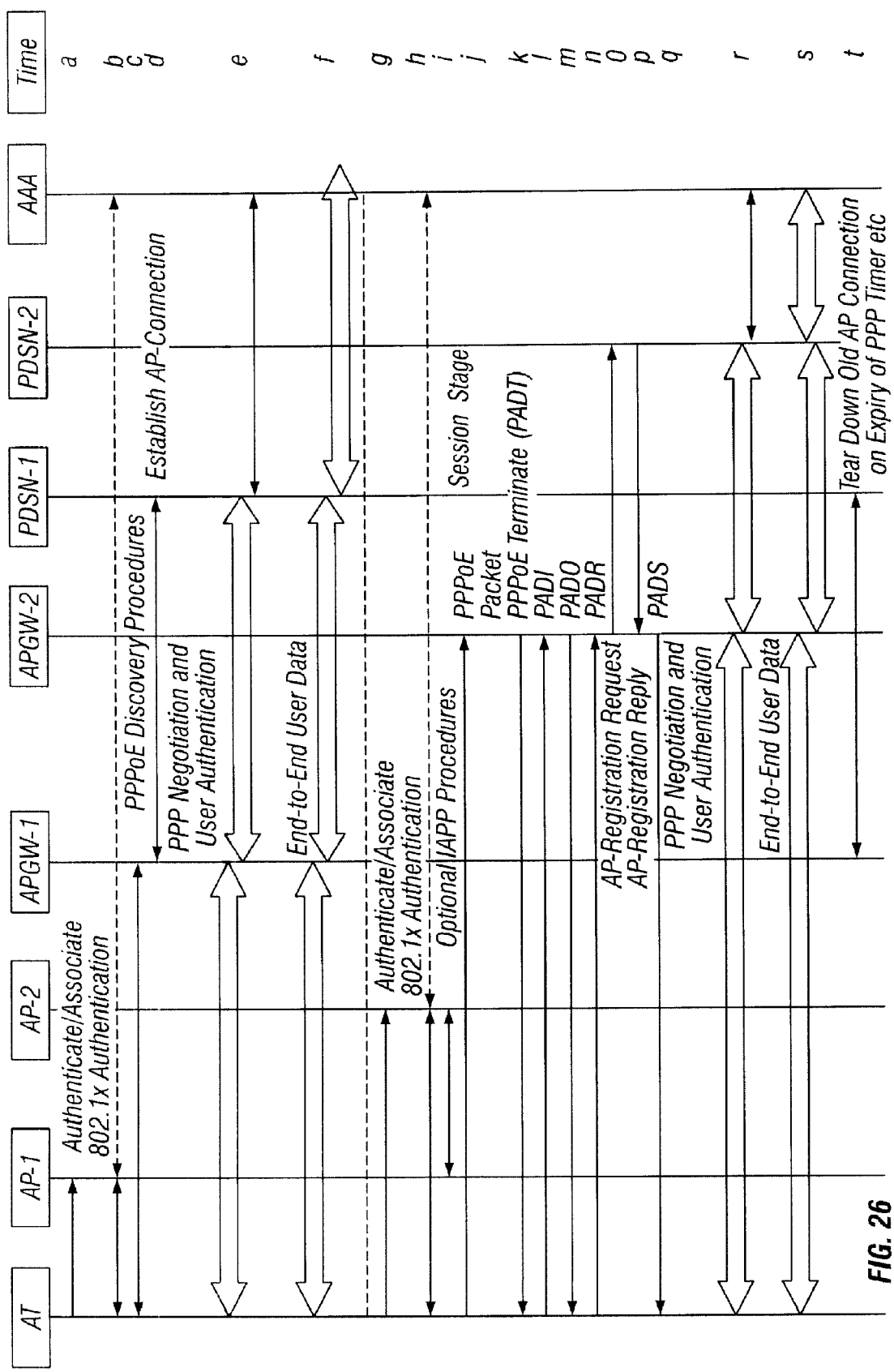

FIG. 26 illustrates an example of the signaling logic for handover of a call from AP-1 with which the AT is currently associated, to another AP-2 within the same WLAN network 200. It may be noted that AP-2 now connects to a different APGW-2, which in turn connects to a different PDSN-2. Resulting from association with AP-2, the PPPoE framed user packets arrive at APGW-2 which has no knowledge about this call. This results in APGW-2 sending a PADT (PPPoE Terminate) packet to the AT. The AT now initiates PPPoE Discovery procedures with APGW-2. This results in setting up of new AP Connection between APGW-2 and the PDSN-2. PDSN-2 does not have any knowledge about this call, hence it initiates establishment of a new PPP connection with the AT. In time, the PDSN-1 terminates the AP Connection with the APGW-1. For calls using Mobile IP, Mobile IP related signaling happens between the AT, the Foreign Agent function located in PDSN-2 and the Home Agent in the Home Network 400. On successful completion of MIP procedures, the packet data session continues from the point at which it was interrupted. For calls using Simple IP, the call would not be able to continue in case the old IP address cannot be assigned to the call by the new PDSN-2.

Figure 27:
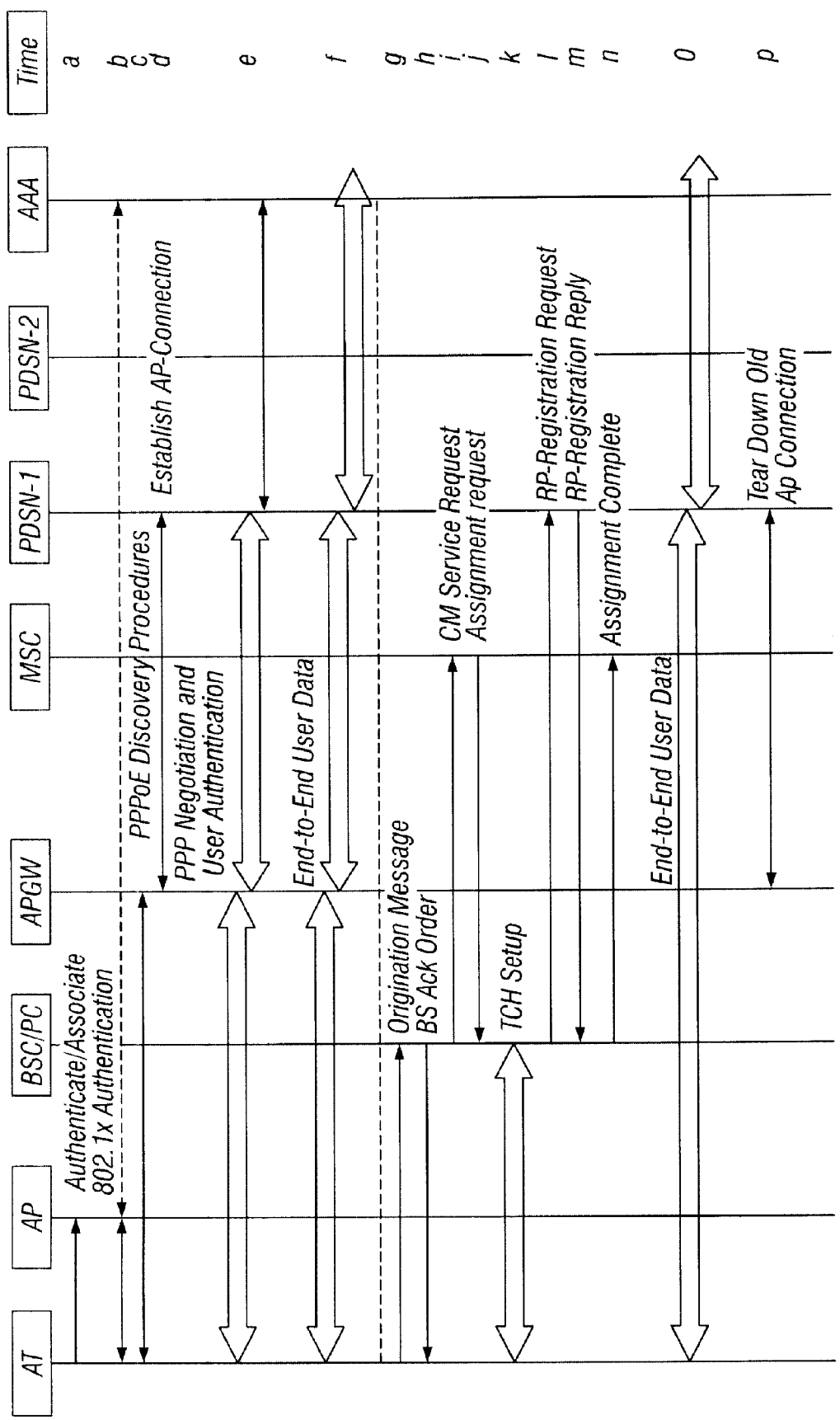

FIG. 27 illustrates an example of the signaling logic for handover of a call from the WLAN network to CDMA WWAN 100 network. The call was originally handled by APGW-1 which connects to PDSN-1. On handover of the call to the CDMA WWAN network, the AT is authenticated and Traffic Channel assigned to it. The AT connects to a BSC/PCF which interfaces with the PDSN-1. BSC/PCF establishes an RP Connection with the PDSN-1 for this call. PDSN-1 recognizes this AT's identity, and the PPP connection at the PDSN-1 is maintained. The call now continues between the AT and the PDSN-1 via the WWAN network. In time, the PDSN-1 terminates the old AP Connection with the APGW-1, which in turn removes dynamic database information related to this call.

Figure 28:
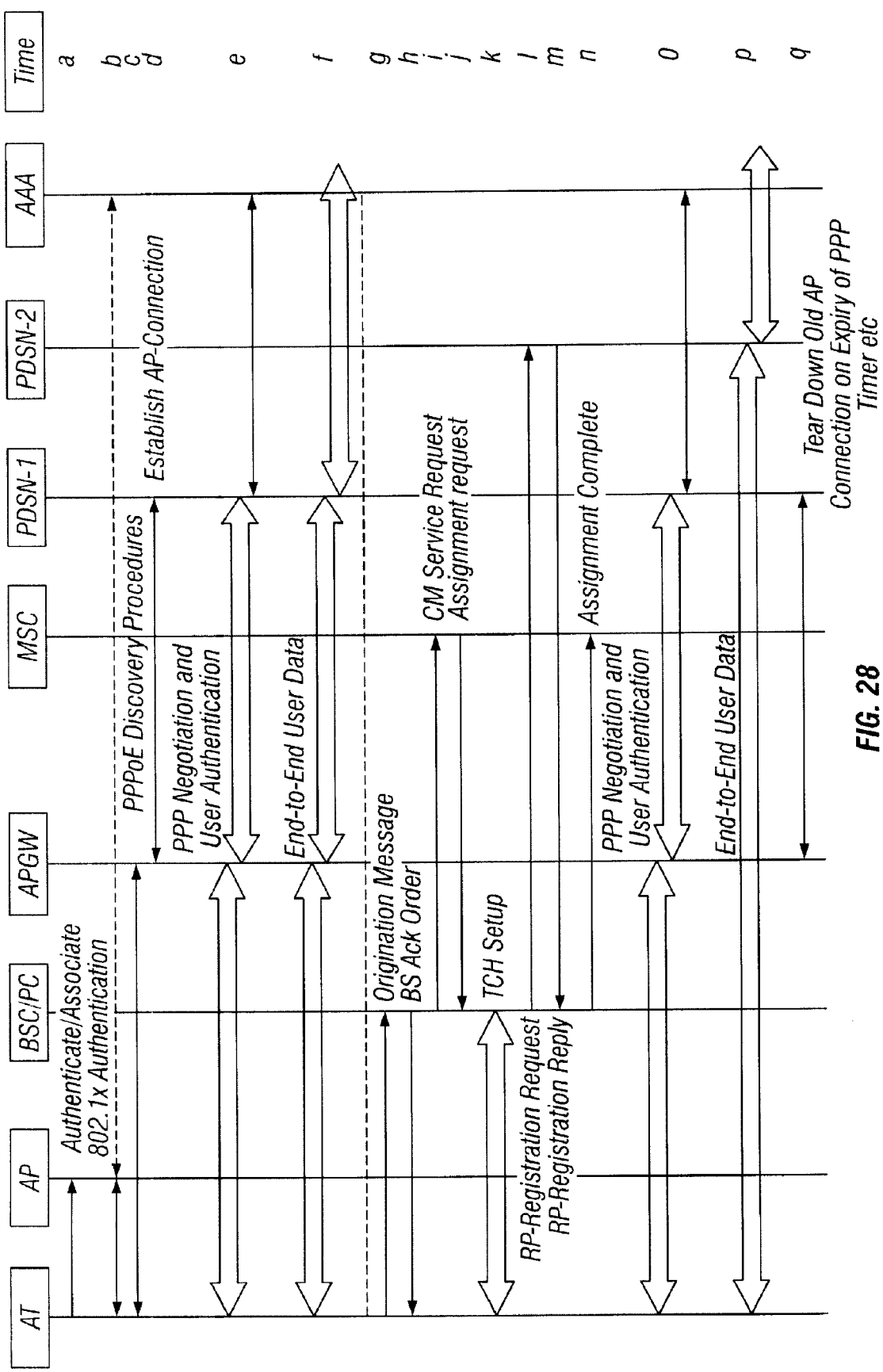

FIG. 28 illustrates an example of the signaling logic for handover of a call from the WLAN network to CDMA WWAN 100 network. The call is originally handled by APGW-1 which connects to PDSN-1. On handover of the call to the CDMA WWAN network, the AT is authenticated and Traffic Channel assigned to it. The AT connects to a BSC/PCF which interfaces with a different PDSN-2. The BSC/PCF establishes an RP Connection with PDSN-2 for this call. PDSN-2 does not have any knowledge about this call, hence it initiates establishment of a new PPP connection with the AT. In time the PDSN-1 terminates the AP Connection with APGW-1, which in turn removes dynamic database information related to this call. For calls using Mobile IP, Mobile IP related signaling happens between the AT, the Foreign Agent function located in PDSN-2 and the Home Agent in the Home Network 400. On successful completion of MIP procedures, the packet data session continues from the point at which it was interrupted. For calls using Simple IP, the call would not be able to continue in case the old IP address cannot be assigned to the call by the new PDSN-2.

Figure 29:
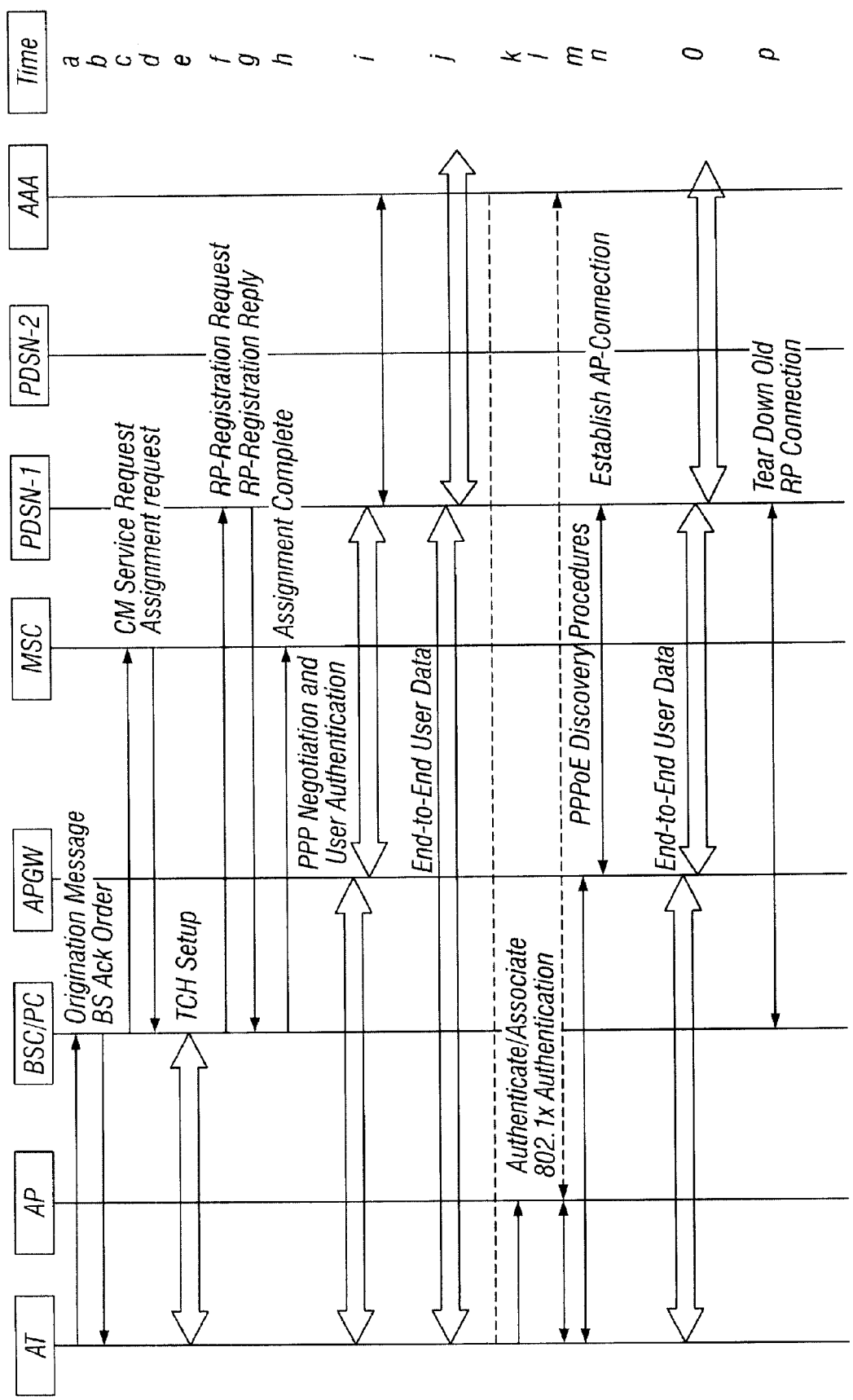

FIG. 29 illustrates an example of the signaling logic for handover of a call from the WWAN network to the WLAN 200 network. The call was originally handled by PDSN-1. On handover of the call to the WLAN network, the AT Associates with an AP in WLAN network 200 and is authenticated based on IEEE 802.1x procedures, if so configured. The AP connects to an APGW in WLAN network, which interfaces with the same PDSN-1. After Associating with the AP, the AT performs PPPoE Discovery procedures and establishes a PPPoE connection with the APGW. APGW establishes an AP Connection with PDSN-1. PDSN-1 recognizes this AT's identity, and the PPP connection at the PDSN-1 is maintained. The call now continues between the AT and the PDSN-1 via the APGW in the WLAN network. In time, the PDSN-1 terminates the old RP Connection.

Figure 30:
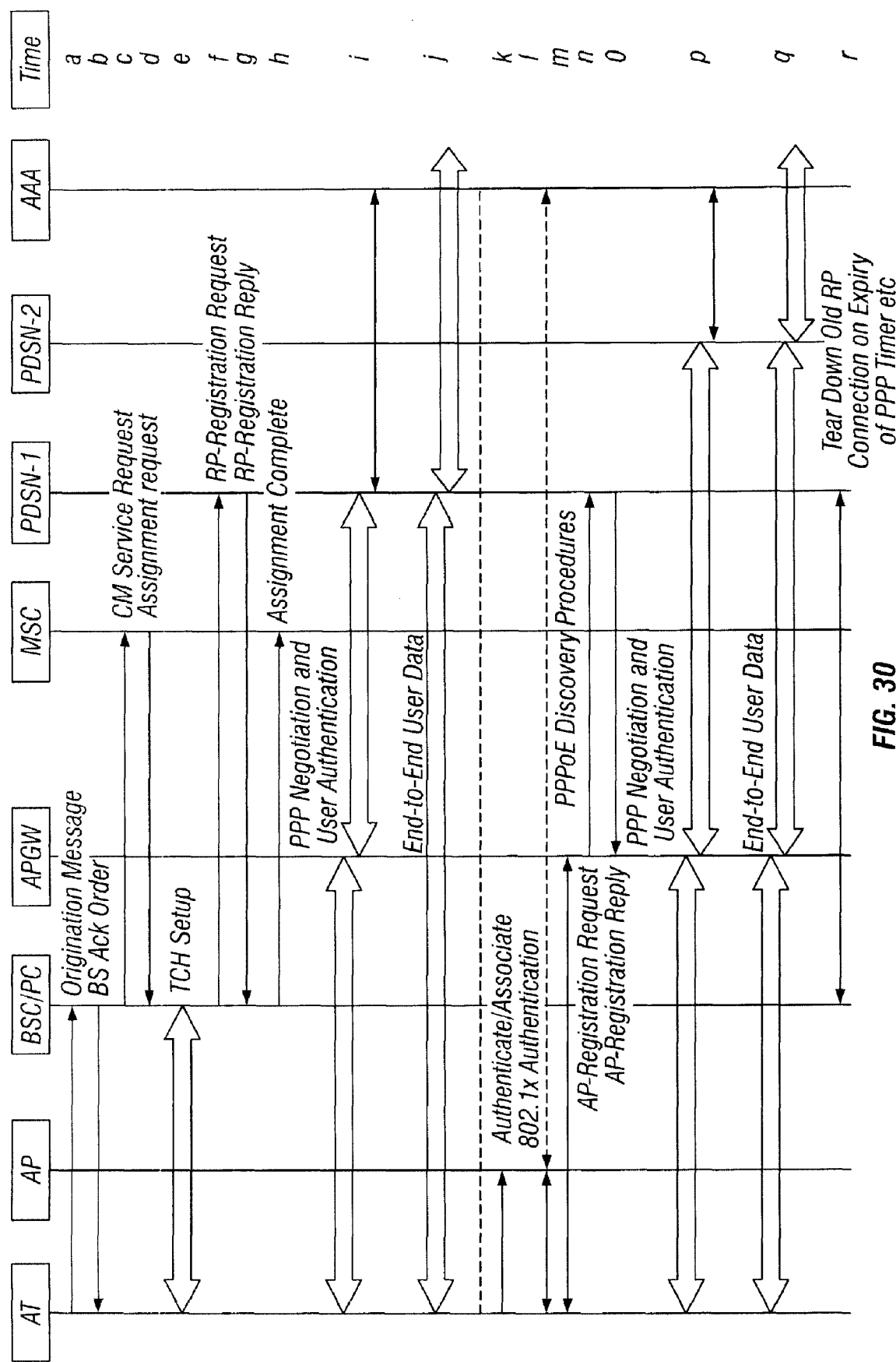

FIG. 30 illustrates an example of the signaling logic for handover of a call from the WWAN network to the WLAN 200 network. The call was originally handled by PDSN-1. On handover of the call to the WLAN network, the AT Associates with an AP in the WLAN network 200 and is authenticated based on IEEE 802.1x procedures, if so configured. The AP connects to an APGW in WLAN network, which interfaces with a different PDSN-2. After associating with the AP, the AT performs PPPoE Discovery procedures and establishes a PPPoE connection with the APGW. APGW establishes an AP Connection with PDSN-2. PDSN-2 does not have any knowledge about this call, hence it initiates establishment of a new PPP connection with the AT. In time the PDSN-1 terminates the RP Connection with BSC/PCF. For calls using Mobile IP, Mobile IP related signaling happens between the AT, the Foreign Agent function located in PDSN-2 and the Home Agent in the Home Network 400. On successful completion of MIP procedures, the packet data session continues from the point at which it was interrupted. For calls using Simple IP, the call would not be able to continue in case the old IP address cannot be assigned to the call by the new PDSN-2.

Figure 31:
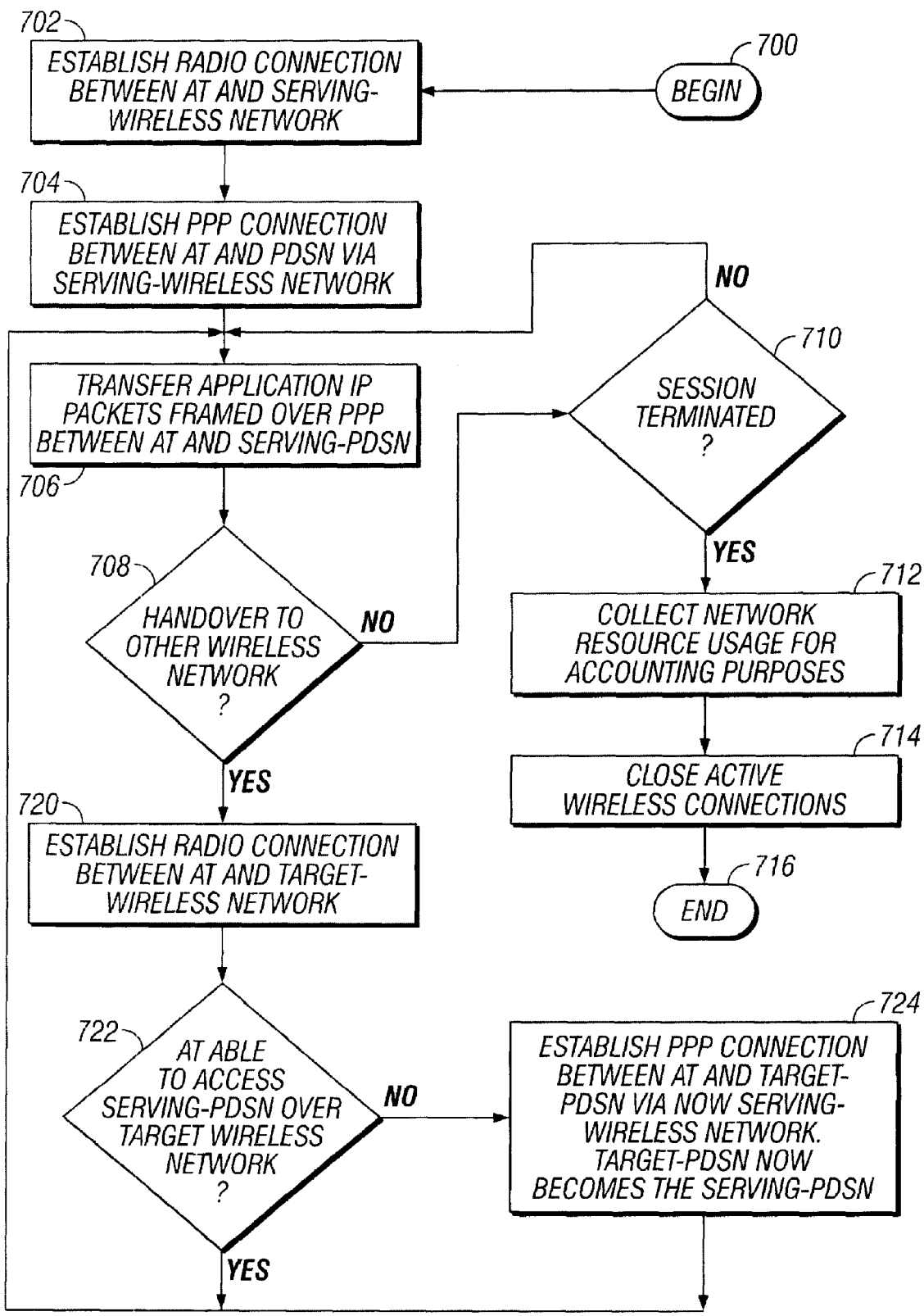
FIG. 31 shows a high level flow-chart depicting an exemplary method of handover of packet data calls between the interworked WWAN and WLAN communication networks shown in FIG. 19.

FIG. 31 shows a high level logical flow-chart of a method of wireless data communications in which a packet data call is seamlessly handed over between wireless data communication networks. For illustrative purposes, the process is described with respect to the exemplary interworked WLAN 200 and WWAN 100 wireless networks of FIG. 19.

In the example in FIG. 31, the process begins at block 700 and thereafter proceeds to block 702, which illustrates a dual-mode AT 102 establishing radio connection with either a WWAN or a WLAN communication network. Such wireless connection can be established, for example, as a part of the power-on procedures at the AT 102 or in response to a user input while interacting with User applications. The signaling logic at the AT makes the selection between available WWAN or WLAN communication networks based on criterion such as relative radio signal strengths, bandwidth and cost For the purpose of the following descriptions, the selected wireless network is termed as the serving-wireless network. The radio signals are transmitted via the selected adapter or port of the dual-mode AT 102, with either the AP 202 or the BTS 104 of the selected network responding to the signal by establishing a wireless data connection with the AT utilizing conventional techniques. Further signaling between the AT and the PSDN 106 via the intervening wireless network entities viz. APGW or BSC/PSF results in a PPP connection being established between the AT 102 and the PDSN 106. Such actions are indicated in block 704. The PDSN with which the PPP connection is initially established is termed as the serving-PDSN. As indicated in block 706, User Application IP Packets framed over PPP, may thereafter be transferred between the AT 102 and the PDSN 106 over the serving-wireless network.

As depicted in block 708, a determination can be made at any time following block 706 whether or not a handover to another wireless communications network is needed. Criterion for determination of handover would be based on factors such as relative radio signal strengths, bandwidth, cost etc. If a determination is made at block 708 that no handover is necessary, the process passes on to block 710, which illustrates whether the session has been terminated by the user. If not, the process simply returns to block 706. If however, a determination is made that the session has been terminated, the process passes to block 712 in which the PDSN, in conjunction with the connected wireless-network entities collect network-resource usage related information before terminating active radio connections, The process then ends at block 716.

Returning to block 708, in response to a determination that handover to another wireless network is needed, the process proceeds to block 720. For the purpose of these descriptions, the wireless network selected for the AT to handover to is termed as the target-wireless network. Block 720 depicts the AT establishing radio connection with the target wireless network performing well known handover procedures. In block 722 a determination is made if the AT is able to access services from the current serving-PDSN, when moving to the target-wireless network. In a well engineered network, it is likely that as the AT hands over to a neighboring target-wireless network, the APGW/BSC entities in the target-wireless network connect to the same serving-PDSN. As an embodiment of this invention, procedures for the determination performed in block 722 have been enunciated in the foregoing descriptions. If a determination is made that the AT is able to obtain services via the serving-PDSN after handover, the process returns to block 706 and the user packet data session continues seamlessly over the existing PPP connection between the AT and the serving-PDSN. If however, a determination is made that the AT is not able to access services from the current serving-PDSN after handover to the target-wireless network, the process passes to block 724. Signaling between the AT and the PDSN accessible via the target-wireless network results in a PPP connection being established between the AT 102 and the target-PDSN 106. The target-PDSN now takes the role of the serving-PDSN and the process then returns to block 706. PPP framed User data IP Packets continue to be seamlessly transferred between the AT and the new serving-PDSN. The PPP connection between the AT and the old serving-PDSN is terminated on expiry of PPP session-timers.

The above described features in connection with networking between WWAN and WLAN can be used in various internetworking implementations. Some examples are provided below.

As a first example, a wireless communication system can be configured to include a wireless wide area network (WWAN) having base transceiver stations (BTSs) spatially distributed to communicate with mobile communication devices via WWAN radio links, base station controllers (BSCs) each coupled to a plurality of base transceiver stations, and a data communication system comprising (1) packet control function devices respectively connected to the base station controllers to transmit data packets to and from the mobile communication devices via the base transceiver stations, and (2) a packet data serving node (PDSN) connected to the packet control function devices and a packet data network to provide packet data services to the mobile communication devices; a wireless local area network (WLAN) having at least one access point (AP) that communicates with a mobile communication device located in an access area via WLAN radio links, and an access point gateway (APGW) connected between the AP and the packet data serving node (PDSN) to allow for continuity of a packet data service to the mobile communication device by switching a packet data service connection for the mobile communication device between the WLAN and the WWAN; and a mechanism for authentication, authorization, and accounting (AAA) common to the WWAN and the WLAN.

Additional features may be implemented in the above system. For example, this system may include a mechanism for IP address allocation. For another example, each dual-mode mobile communication device includes a WWAN adaptor or port operable to communicate with a base transceiver station via the WWAN radio links and a WLAN adaptor or port operable to communicate with an access point via the WLAN radio links. For another example, the WWAN and the WLAN can be configured to enable each mobile communication device to switch a communication link from one of the WWAN and WLAN to another in response to a link status parameter in the communication link where the link status parameter includes at least one of (1) a strength of a signal received from each of the WWAN and WLAN, (2) data error rate received from each of the WWAN and WLAN, or (3) data transmission rate received from each of the WWAN and WLAN. For another example, the WWAN and the WLAN can be configured to enable a handoff between the WWAN and the WLAN using a handoff module in each mobile communication device. This handoff can be implemented in various configurations, including (1) the handoff module can control the communication between the mobile communication device and APGW over the PPPoE protocol, (2) the handoff module controls the communication between the mobile communication device and PDSN over the PPPo-HDLC protocol, (3) the handoff module (convergence layer)

of the mobile communication device is used to connect the same upper layer protocol stack (e.g., PPP/LCP/NCP/IPCP, IP, TCP/UDP etc,) to multiple data links during the handoff while maintaining a continuous connection of a packet data service, (4) the PPPoE protocol can be used to initiate A10-like connection establishment using A11-like link, (5) the hand off can be handed based on a DHCP protocol which is used to get IP address for the dual-mode mobile communication device when connecting to WLAN, and (6) the handoff interrupts a data link layer during the handoff while maintaining a continuous connection of a packet data service and is achieved via the common PPP/IP protocol stack in both mobile station and PDSN across both WWAN and WLAN for intra-PDSN handoff between WWAN and WLAN on the PPP and IP layer. For another example, the access point gateway (APGW) contains two protocol stacks: one of the protocol stacks is used for communicating with the AT and the other protocol stack is used for communicating with the PDSN, where the APGW uses an A10/A11-like interface with the PDSN, and Ethernet interface with the AP, the A10-like connection between the APGW and the PDSN carries user data packets embedded in PPP framing via PPPoHDLC protocol, the connection between the dual-mode mobile communication device and APGW is over PPPoE, the user data packets embedded in PPP framing are carried via PPPoE protocol, and the APGW maintains a dynamic database with keys such as PPPoE Session ID and PPPoHDLC Session ID to keep mapping of PPP framed user data packets between the two protocol stacks. For yet another example, at least one Packet Data Serving Node (PDSN) is provided to include two protocol stacks: one of the the protocol stacks is used for communicating with the BSC/PCF of the WWAN network over the RP Connection, and the other protocol stack is used for communicating with the APGW of the WLAN network over the AP Connection. Under this example, a convergence layer can be included to handle the switching between the WWAN and WWLAN networks; and the convergence layer encapsulates the user data packets embedded in PPP frames over PPPoHDLC while communicating with the BSC/PCF or the APGW, thereby making the upper layer protocol stack, such as IP/PPP/LCP/NCP/IPCP, transparent to the underlying communication with the WWAN or the WLAN networks. In addition, an interface to the AAA server, based on either RADIUS or DIAMETER protocol, can be provided and used by the PDSN to send authentication, authorization and accounting information to the AAA server. Further more, while accessing services from the WLAN network, the dual-mode access terminal device may be configured to perform authentication using IEEE 802.1x based procedures. If so configured, the interface to the AAA server can include a new field in the form of PPP Vendor Specific Extension which carries the identifying information of the dual-mode mobile device such as NAI and/or MSID in the EAP authentication messages. The AAA server can thereby perform unified authentication, authorization and accounting for access from the WWAN or the WLAN communication network. For yet another example, at least one AAA server that provides authentication, authorization, and accounting services to the WWAN and WLAN can be used to include a single account for each subscriber irrespective of whether the dual-mode mobile accesses the network through the WLAN or WWAN network.

As a second example, a communication system can include a CDMA network coupled to an IP network to provide packet data service to mobile communication devices; a wireless local area network (WLAN) having at least one access point (AP) that communicates with a mobile communication device located in an access area of the AP, and an access point gateway (APGW) connected between the AP and one packet data serving node in the CDMA network to allow for continuity of a packet data service to the mobile communication device by switching a packet data service connection for the mobile communication device between the WLAN and the CDMA network; and a mechanism for authentication, authorization, and accounting (AAA) common to the CDMA network and the WLAN.

In this second example, various features may be implemented. For example, a common PPP/IP protocol stack on both the access terminal and the PDSN across both the WWAN and WLAN can be used to control the switching. For another example, the system can be operated to use a single subscription with WWAN Wireless Service Provider and obtain authentication, authorization, security, accounting and billing support for both the WWAN and WLAN access networks. For another example, the APWG records the packet data session starting time and stop time and sends this time information associated with other air link information in the A11-like message to the PDSN for User Data Records (UDR). For another example, the modified A11-like message sent by the APGW to the PDSN includes various Airlink Records including the Setup WLANlink Record, Active Start WLANlink Record and the Active Stop WLANlink Record and These Airlink records include identifying information of the Access Point that provides WLAN services (ESSID, BSS and BSSID), identifying information of the User data sessions (NAI, MSID), and information about start and stop times of user data session. For yet another example, the PDSN keeps track of user bi-directional IP packet/byte count information when the PDSN receives the message containing user data session start and stop time information from the APWG and the byte count information, coupled with the information in the WWAN air link records triggered by BSC/PCF, or the WLAN air link records triggered by the APGW, is used for the generation of User Data Record (UDR) for the same user account when the dual-mode mobile communication device accesses the network through either WWAN or WLAN, where the PDSN forwards the UDR to the Home AAA and the system at the defined trigger-event in turn passes to the Billing System.

In a third example, a method can be implemented to include providing an access point gateway between an access point (AP) in a WLAN and a packet data service node (PDSN) in a CDMA2000 WWAN to interconnect the WLAN and the WWAN; using an access terminal that has both a WLAN interface and a WWAN interface to communicate with the WLAN and the WWAN; using a control mechanism in the access terminal to determine which of the WLAN and the WWAN is to be used for a packet data service according to a signal parameter detected by the access terminal; authenticating, authorizing, and accounting the communication to the WLAN and the WWAN by a mechanism common to the WLAN and the WWAN; and controlling switching between a communication between the WLAN and the WWAN to allow for the access terminal to roam in the WLAN and the WWAN without an interruption to the packet data service.

The method in the third example can be implemented to include various features. For example, a common PPP/IP protocol stack on both the access terminal and the PDSN across both the WWAN and WLAN can be used to control the switching. For another example, the signal parameter is at least one of (1) a signal strength of signals respectively received by the access terminal from the WLAN and the WWAN, (2) a signal error rate in signals respectively received by the access terminal from the WLAN and the WWAN, and (3) a data transmission rate in the signals respectively received by the access terminal from the WLAN and WWAN. For another example, the common PPP/IP protocol stack in both the mobile device and the PDSN across WWAN and WLAN can be used to maintain a single IP address for the mobile device during intra-PDSN handoff between WWAN and WLAN. For another example, the switching includes a handoff between the WWAN and the WLAN based on the PPPoE protocol and the PPPoE protocol is used to carry the data over the connection between the mobile communication device and APGW. In this regard, the handoff can rely on PPPoE protocol in APGW to trigger the establishment of the A10-like link between APGW and PDSN through messaging over A11-like link. A specific field can be included in messages over A11-like link and is used by the PDSN to maintain the same session and IP address for the dual-mode mobile communication device over WLAN during the intra-PDSN WWAN to WLAN handoff. For another example, the control mechanism can be used to provide mobile device authentication based on the IEEE 802.1x framework and the mobile device authentication can be operated by the common AAA service of claim 15 or a separate AAA server. For another example, the control mechanism can be used to make the mobile device maintain its assigned IP address when the mobile device handoffs between WWAN and WLAN networks, where the mobile device contains PPP protocol layer, which is terminated at the same PDSN, when accessing services either via the WWAN or the WLAN network. In this regard, when the mobile device enters the access network connecting to the PDSN first time, it may request a new IP address from the PDSN via PPP/LCP/NCP/IPCP protocol. If the mobile device handoff from either WWAN or WLAN to another network, and ends up connecting to the same PDSN, the PPP connection between the mobile device and the PDSN is maintained and the same IP address is used of continuing user data session seamlessly. For another example, the PDSN can be used to maintain the IP address database to make IP address allocation uniquely to the dual-mode mobile device from both WWAN and WLAN network and the handoff is based on the PPPoE protocol. For yet another example, the IP address allocation can be based on the Mobile IP (MIP) protocol where the IP address allocation is performed through Home Agent (HA). For yet another example, the handoff is within the CDMA network and the WLAN configured to enable a Layer 2 handoff between the CDMA network and the WLAN (Inter-Network) using a handoff module in each mobile communication device and the Inter-Network Layer 2 handoff operates within the PDSN connecting to WWAN and WLAN. In this regard, the handoff module in the dual-mode mobile device encapsulates the lower layer network interfaces and makes them transparent to upper layer protocol layers. In the PDSN, the convergence layer and PPP layer provide the Layer 2 session continuity to the Core network connecting to the PDSN. The handoff module and convergence layer guarantee the Inter-Network layer 2 handoff within the PDSN boundary. For yet another example, the handoff can be based on Layer 3 Mobile IP (MIP) handoff and the Layer 3 MIP handoff is used in the handoff across the PDSN boundary and terminated at Home Agent (HA) in the Core network. For yet another example, a handoff interrupts a data link layer during the handoff while maintaining a continuous connection of a packet data service and the lower layer network interfaces are encapsulated to be transparent to upper layer protocol layers in the mobile device, where the convergence layer and PPP layer in the PDSN encapsulate the Layer 2 connections over A10 in WWAN and A10-like in WLAN. Due to the common PPP/IP protocol stack in the mobile device and PDSN across the WWAN and WLAN, the upper layer protocol will maintain unchanged during intra-PDSN handoff, which keeps the data service continuity for the inter-network handoff.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few implementations are disclosed. However, it is understood that variations and enhancements may be made.

What is claimed is:

1. A wireless communication system, comprising:
    a wireless wide area network (WWAN) having base transceiver stations (BTSs) spatially distributed to communicate with mobile communication devices via WWAN radio links, base station controllers (BSCs) each coupled to a plurality of base transceiver stations, and a data communication system comprising (1) packet control function (PCF) devices respectively connected to said base station controllers to transmit data packets to and from the mobile communication devices via said base transceiver stations, and (2) a packet data serving node (PDSN) connected to said packet control function devices and a packet data network to provide packet data services to the mobile communication devices;
    a wireless local area network (WLAN) having at least one access point (AP) that communicates with a mobile communication device located in an access area via WLAN radio links, and an access point gateway (APGW) connected between said AP and said packet data serving node (PDSN) to allow for continuity of a packet data service to said mobile communication device by switching a packet data service connection for said mobile communication device between said WLAN and said WWAN during a handoff;
    a mechanism for authentication, authorization, and accounting (AAA) common to said WWAN and said WLAN and to assist the handoff; and
    a mechanism for IP address allocation,
    wherein a convergence layer is implemented in the PDSN, the convergence layer including logic configured to encapsulate user data packets and to determine whether to forward the encapsulated user data packets to the WLAN or the WWAN.

2. The system as in claim 1, wherein the handoff is based on the PPPoE protocol.

3. The system as in claim 2, wherein the PPPoE protocol is used to initiate an A10-like connection establishment using an A11-like link.

4. The system as in claim 1, wherein the handoff is based on the DHCP protocol.

5. The system as in claim 4, wherein the DHCP protocol is used to get IP address for the mobile communication device when connecting to WLAN.

6. The system as in claim 1, wherein the handoff interrupts a data link layer during the handoff while maintaining a continuous connection of a packet data service.

7. The system as in claim 6, wherein the handoff is achieved through a common PPP/IP protocol stack in both mobile station and PDSN across both WWAN and WLAN for intra-PDSN handoff between WWAN and WLAN on the PPP and IP layer.

8. The system as in claim 1, wherein the access point gateway (APGW) includes an A10/A11-like interface with the PDSN.

9. The system as in claim 8, wherein the A10/A11-like interface between the APGW and the PDSN carries user data packets embedded in PPP framing via PPPoHDLC protocol, and the connection between the mobile communication device and the APGW is over PPPoE.

10. The system as in claim 1, wherein the logic configured to encapsulate user data packets is further configured to encapsulate user data packets embedded in PPP frames over PPPoHDLC when communicating with the WLAN or the WWAN.

11. A wireless communication system, comprising:
a wireless wide area network (WWAN) having a base transceiver station (BTS) for communicating with a mobile communication device via a WWAN radio link, a base station controller (BSC) coupled to the BTS, and a data communication system comprising:
(1) a packet control function (PCF) device connected to the BSC to transmit data packets to and receive data packets from the mobile communication device via the BTS, and
(2) a packet data serving node (PDSN) connected to the PCF device and a packet data network, the PDSN providing packet data services to the mobile communication device and performing IP address allocation;
a wireless local area network (WLAN) having at least one access point (AP) that communicates with the mobile communication device located in a corresponding access area via WLAN radio links, and an access point gateway (APGW) connected between the AP and the PDSN to allow for continuity of packet data service to the mobile communication device by switching a packet data service connection for the mobile communication device between the WLAN and the WWAN during a handoff; and
a server common to the WWAN and the WLAN, the server being configured to perform authentication, authorization, and accounting (AAA) functions and to assist the handoff;
wherein the mobile communication device includes a handoff module configured to control the handoff and the PDSN further includes convergence layer logic configured to determine whether to forward user data packets to the WLAN or within the WWAN.

12. The system as in claim 11, wherein the handoff module controls communication between the mobile communication device and the PDSN via the PPPoHDLC protocol.

13. The system as in claim 11, wherein the handoff module is configured to connect an upper layer protocol stack to multiple data links during the handoff while maintaining a continuous packet data service connection.

14. The system as in claim 11, wherein the APGW includes:
a mobile communication device connection and a mobile communication device protocol stack for communicating with the mobile communication device, the mobile communication device connection being adapted to transfer user data packets embedded in PPP framing via the PPPoE protocol; and
a PDSN connection and a PDSN protocol stack for communicating with the PDSN, the PDSN connection being adapted to transfer user data packets embedded in PPP framing via the PPPoHDLC protocol.

15. The system as in claim 14, wherein the APGW is adapted to maintain a database of keys used to map user data packets between the mobile communication device protocol stack and the PDSN protocol stack.

16. The system as in claim 11, wherein the PDSN includes:
a WWAN protocol stack for communicating with either or both of the BSC and the PCF; and
a WLAN protocol stack for communicating with the APGW.

17. The system as in claim 11, wherein the mobile communication device is configured to determine whether to use the WWAN or the WLAN for packet data service based on a respective strength of signals received by the mobile communication device from the WWAN and the WLAN.

18. The system as in claim 11, wherein the APGW is configured to record, for a user packet data session, a session start time and a corresponding session stop time.

19. The system as in claim 18, wherein the APGW is further configured to transmit the session start time and the corresponding session stop time to the PDSN.

20. The system as in claim 19, wherein the PDSN is further configured to store bi-directional IP packet/byte count information corresponding to the mobile communication device.

* * * * *

UNITED STATES PATENT AND TRADEMARK OFFICE
CERTIFICATE OF CORRECTION

PATENT NO. : 7,965,693 B2  Page 1 of 1
APPLICATION NO. : 11/835414
DATED : June 21, 2011
INVENTOR(S) : James Jiang et al.

It is certified that error appears in the above-identified patent and that said Letters Patent is hereby corrected as shown below:

IN THE SPECIFICATIONS:

In Column 3, Line 32, please delete "DCHP" and insert -- DHCP --, therefor.

In Column 10, Line 8, please delete "DCHP" and insert -- DHCP --, therefor.

In Column 14, Line 44, please delete "[20]" and insert -- [30] --, therefor.

In Column 29, Line 25, please delete "PSDN" and insert -- PDSN --, therefor.

In Column 31, Line 31, please delete "the protocol" and insert -- protocol --, therefor.

Signed and Sealed this
Thirtieth Day of August, 2011

David J. Kappos
*Director of the United States Patent and Trademark Office*